United States Patent [19]

Schira et al.

[11] 4,142,493
[45] Mar. 6, 1979

[54] CLOSED LOOP EXHAUST GAS RECIRCULATION CONTROL SYSTEM

[75] Inventors: John J. Schira, Westland; Alvin D. Toelle, Fenton; Jack R. Phipps, St. Clair Shores, all of Mich.

[73] Assignee: The Bendix Corporation, Southfield, Mich.

[21] Appl. No.: 837,657

[22] Filed: Sep. 29, 1977

[51] Int. Cl.² ............................................. F02M 25/06
[52] U.S. Cl. ................................................ 123/119 A
[58] Field of Search ................................... 123/119 A

[56] References Cited

U.S. PATENT DOCUMENTS

| | | | |
|---|---|---|---|
| 3,799,133 | 3/1974 | Frank | 123/119 A |
| 3,872,846 | 3/1975 | Taplin et al. | 123/119 A |
| 3,915,134 | 10/1975 | Young et al. | 123/119 A |
| 3,963,011 | 6/1976 | Saito et al. | 123/119 A |
| 3,969,614 | 7/1976 | Moyer et al. | 123/119 A |
| 3,982,395 | 9/1976 | Hasegawa et al. | 123/119 A |
| 4,024,847 | 5/1977 | Koganemaru | 123/119 A |
| 4,044,738 | 8/1977 | Williams et al. | 123/119 A |
| 4,052,968 | 10/1977 | Hattori et al. | 123/119 A |
| 4,071,003 | 1/1978 | Aono | 123/119 A |

*Primary Examiner*—Wendell E. Burns
*Attorney, Agent, or Firm*—Gaylord P. Haas, Jr.; Russel C. Wells

[57] ABSTRACT

A closed loop exhaust gas recirculation (EGR) control system for an internal combustion engine having an intake system, an exhaust system, a throttle disposed within the intake system for controlling air flow therein, a conduit coupling the exhaust system to the intake system for supplying exhaust gas back to the intake system for controlling the generation and emission of oxides of nitrogen and for improving drivability and avoiding engine roughness. The EGR control system of the present invention includes a first memory pre-programmed with a look-up table of optimal EGR values indicative of EGR valve position or the like determined as a function of engine speed and throttle position and a second memory pre-programmed with the look-up table of optimal EGR values determined as a function of engine speed and absolute manifold pressure. The actual operating parameters of engine speed, throttle position and absolute manifold pressure are accurately sensed and stored as multi-bit binary numbers or words indicative thereof. The most significant bits (MSB) of the words are used to address the first and second memory while the least significant bits (LSB) of the words are used to perform a double linear interpolation of the accessed values to compute accurate first and second EGR values. The second EGR value is substracted from the first EGR value to determine a difference indicative of the current EGR valve error. A previously computed and stored EGR error value used to determine the last valve position adjustment is then substracted from the current EGR error value to determine the total change in error value required to correct the EGR valve position at the next adjustment. A fractional portion of the total change in EGR error value is then applied to the previously stored EGR error value to update same so as to avoid rapid or abrupt adjustments in the valve position so as to avoid engine roughness etc. The updated EGR error value is converted into a control signal which is used to adjust the position of the EGR valve at the next scheduled valve adjustment time so as to regulate EGR flow as desired.

65 Claims, 18 Drawing Figures

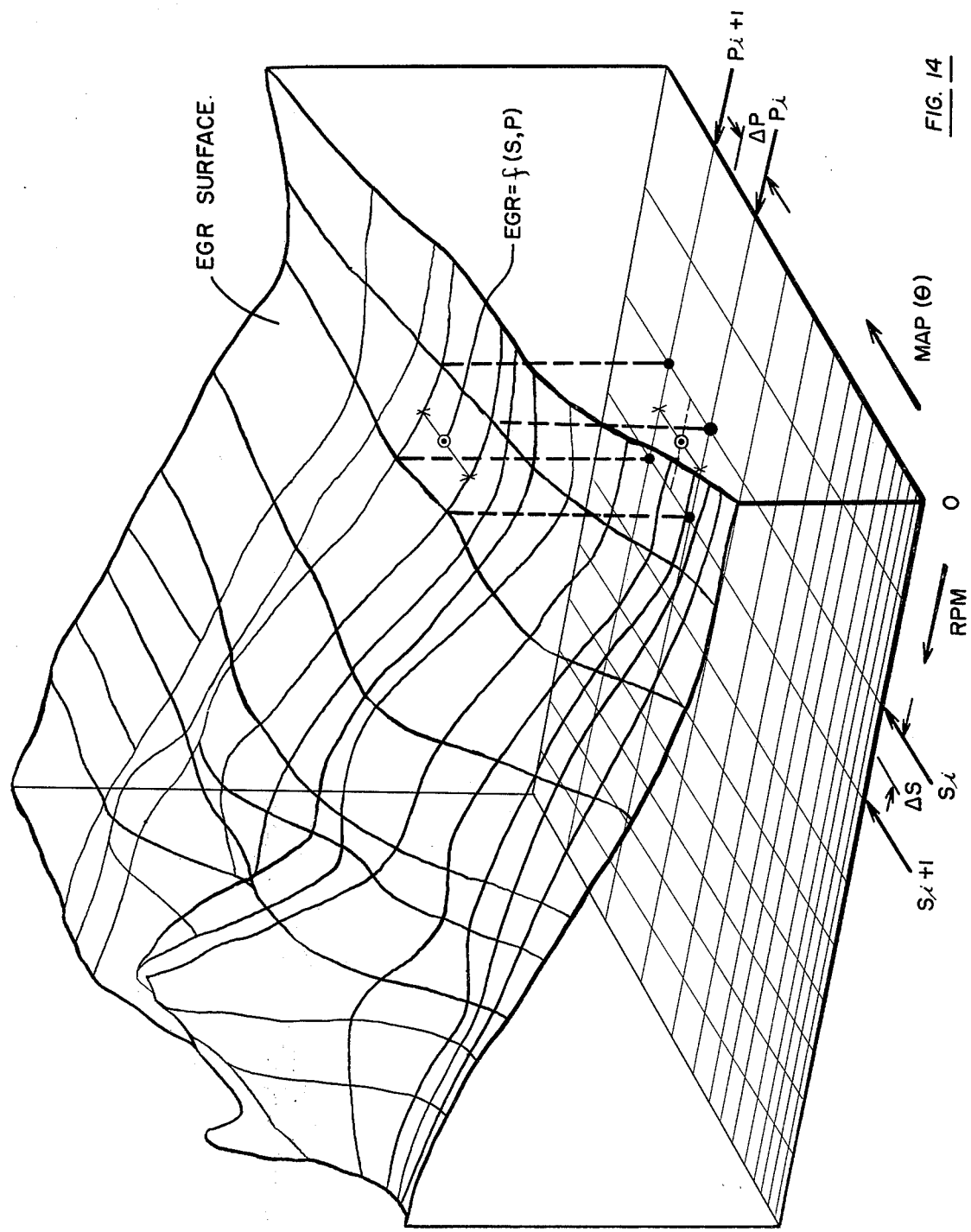

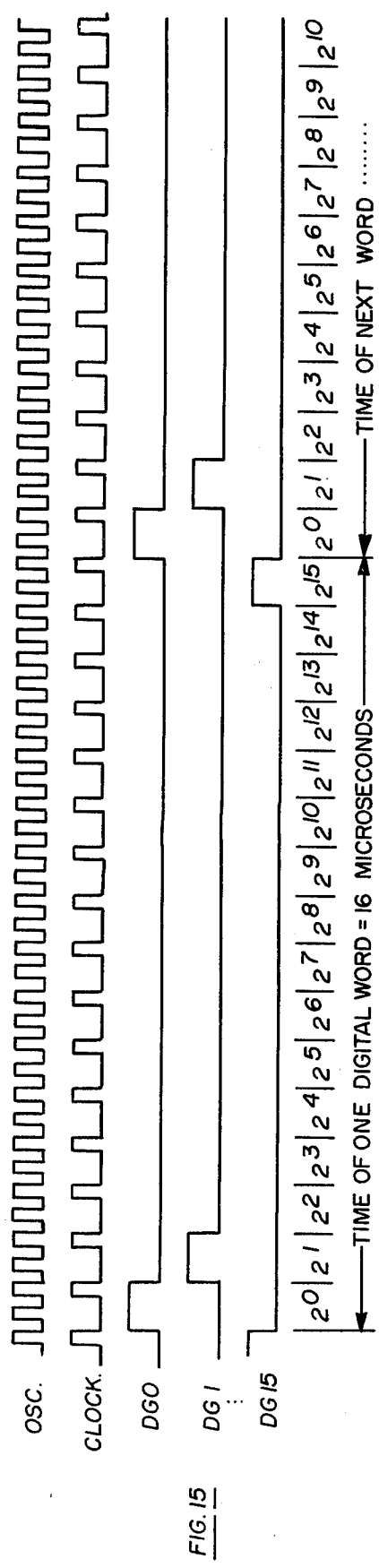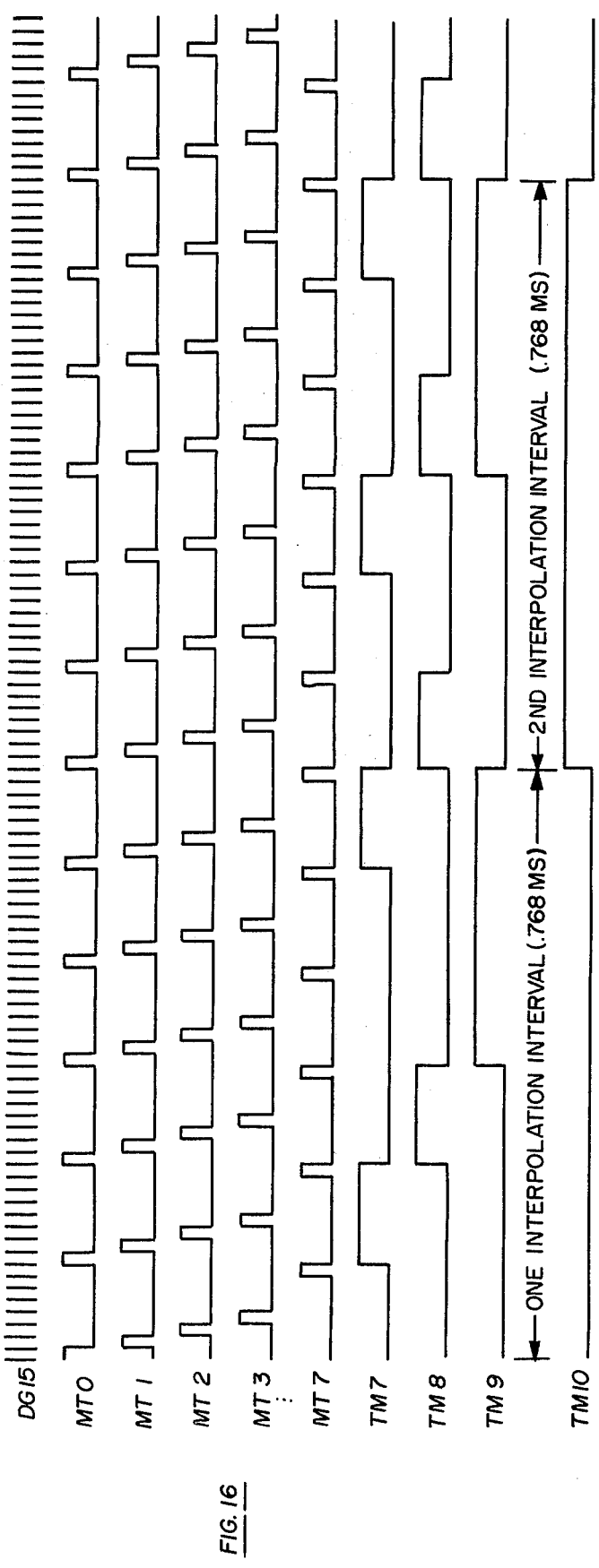
FIG. 15
FIG. 16

| WORD COUNT | | | | | | "A" REG. | | | | "B" REG. | | | | "C" REG. | | "D" REG. | | OPERATIONS |
|---|---|---|---|---|---|---|---|---|---|---|---|---|---|---|---|---|---|---|
| TM 0-7 | TM7 | TM8 | TM9 | TM10 | | RCA | ADD MDR | ADD A | ADD 4A | RCB | ADD A | SUB C | SHIFT B | RCC | ADD B | RCD | TIME OUT LOAD D | |

RPM Word (MSB) ⊠⊠⊠⊠⊠⊠⊠⊠ (LSB)   $S_i$ — $\Delta S$
θ Word (MSB) ⊠⊠⊠⊠⊠⊠⊠⊠ (LSB)   $T_j$ — $\Delta T$
MAP Word (MSB) ⊠⊠⊠⊠⊠⊠⊠⊠ (LSB)   $P_K$ — $\Delta P$

| # | TM7-10 | RCA/ADD | RCB/ADD | C | D | OPERATIONS |
|---|---|---|---|---|---|---|
| 0 | 0 0 0 0 | 0 0 0 0 | 0 0 0 0 | 1 0 | 1 1 0 | MDR = $f(S_i, T_j)$ |
| 1 | 0 0 0 0 | 0 1 0 0 | 0 0 0 0 | 1 0 | 1 1 0 | A = MDR |
| 2 | 0 0 0 0 | 1 1 0 0 | 0 0 0 0 | 1 0 | 1 1 0 | $A = A + MDR \circ \overline{\Delta S_0}$ |
| 3 | 0 0 0 0 | 1 1 0 0 | 0 0 0 0 | 1 0 | 1 1 0 | $A = A + 2 MDR \circ \overline{\Delta S_1}$ }  $(16-\Delta S) \circ f(S_i, T_j)$ |
| 4 | 0 0 0 0 | 1 1 0 0 | 0 0 0 0 | 1 0 | 1 1 0 | $A = A + 4 MDR \circ \overline{\Delta S_2}$ |
| 5 | 0 0 0 0 | 1 1 0 0 | 0 0 0 0 | 1 0 | 1 1 0 | $A = A + 8 MDR \circ \overline{\Delta S_3}$ |
| 6 | 0 0 0 0 | 1 0 0 0 | 0 0 0 0 | 1 0 | 1 1 0 | |
| 7 | 0 0 0 0 | 1 0 0 0 | 0 0 0 0 | 1 0 | 1 1 0 | |
| 0 | 1 0 0 0 | 1 0 0 0 | 0 0 0 0 | 1 0 | 1 1 0 | MDR = $f(S_i+1, T_j)$ |
| 1 | 1 0 0 0 | 1 0 0 0 | 0 0 0 0 | 1 0 | 1 1 0 | $A = A + MDR \cdot \Delta S_0$ |
| 2 | 1 0 0 0 | 1 1 0 0 | 0 0 0 0 | 1 0 | 1 1 0 | $A = A + 2 MDR \cdot \Delta S_1$ }  $\Delta S \cdot f(S_i+1, T_j)$ |
| 3 | 1 0 0 0 | 1 1 0 0 | 0 0 0 0 | 1 0 | 1 1 0 | $A = A + 4 MDR \cdot \Delta S_2$ |
| 4 | 1 0 0 0 | 1 1 0 0 | 0 0 0 0 | 1 0 | 1 1 0 | $A = A + 8 MDR \cdot \Delta S_3$ |
| 5 | 1 0 0 0 | 1 1 0 0 | 0 0 0 0 | 1 0 | 1 1 0 | |
| 6 | 1 0 0 0 | 1 0 0 0 | 0 0 0 0 | 1 0 | 1 1 0 | |
| 7 | 1 0 0 0 | 1 0 0 0 | 0 0 0 0 | 1 0 | 1 1 0 | |
| 0 | 0 1 0 0 | 0 0 0 1 | 0 0 0 0 | 1 0 | 1 1 0 | $A = A/16 \cdot \overline{DG12-15}$  SHIFT A 4 PLACES. |
| 1 | 0 1 0 0 | 1 0 0 0 | 1 1 0 0 | 1 0 | 1 1 0 | B = A |
| 2 | 0 1 0 0 | 1 0 1 0 | 1 1 0 0 | 1 0 | 1 1 0 | $B = B + A \cdot \overline{\Delta T_0}$   $A = A + A$ |
| 3 | 0 1 0 0 | 1 0 1 0 | 1 1 0 0 | 1 0 | 1 1 0 | $B = B + A \cdot \overline{\Delta T_1}$   $A = A + A$ }  $A \cdot (32 \Delta T)$ |
| 4 | 0 1 0 0 | 1 0 1 0 | 1 1 0 0 | 1 0 | 1 1 0 | $B = B + A \cdot \overline{\Delta T_2}$   $A = A + A$ |
| 5 | 0 1 0 0 | 1 0 1 0 | 1 1 0 0 | 1 0 | 1 1 0 | $B = B + A \cdot \overline{\Delta T_3}$   $A = A + A$ |
| 6 | 0 1 0 0 | 1 0 0 0 | 1 1 0 0 | 1 0 | 1 1 0 | $B = B + A \cdot \overline{\Delta T_4}$ |
| 7 | 0 1 0 0 | 1 0 0 0 | 1 0 0 0 | 1 0 | 1 1 0 | |
| 0 | 0 0 1 0 | 0 0 0 0 | 1 0 0 0 | 1 0 | 1 1 0 | MDR = $f(S_i, T_j+1)$ |
| 1 | 0 0 1 0 | 0 1 0 0 | 1 0 0 0 | 1 0 | 1 1 0 | A = MDR |
| 2 | 0 0 1 0 | 1 1 0 0 | 1 0 0 0 | 1 0 | 1 1 0 | $A = A + MDR \cdot \overline{\Delta S_0}$ |
| 3 | 0 0 1 0 | 1 1 0 0 | 1 0 0 0 | 1 0 | 1 1 0 | $A = A + 2 MDR \cdot \overline{\Delta S_1}$ }  $(16 \Delta S) \cdot f(S_i, T_j+1)$ |
| 4 | 0 0 1 0 | 1 1 0 0 | 1 0 0 0 | 1 0 | 1 1 0 | $A = A + 4 MDR \cdot \overline{\Delta S_2}$ |
| 5 | 0 0 1 0 | 1 1 0 0 | 1 0 0 0 | 1 0 | 1 1 0 | $A = A + 8 MDR \cdot \overline{\Delta S_3}$ |
| 6 | 0 0 1 0 | 1 0 0 0 | 1 0 0 0 | 1 0 | 1 1 0 | |
| 7 | 0 0 1 0 | 1 0 0 0 | 1 0 0 0 | 1 0 | 1 1 0 | |
| 0 | 1 0 1 0 | 1 0 0 0 | 1 0 0 0 | 1 0 | 1 1 0 | MDR = $f(S_i, T_j+1)$ |
| 1 | 1 0 1 0 | 1 0 0 0 | 1 0 0 0 | 1 0 | 1 1 0 | $A = A + MDR \cdot \Delta S_0$ |
| 2 | 1 0 1 0 | 1 1 0 0 | 1 0 0 0 | 1 0 | 1 1 0 | $A = A + 2 MDR \cdot \Delta S_1$ }  $\Delta S \cdot f(S_i+1, T_j+1)$ |
| 3 | 1 0 1 0 | 1 1 0 0 | 1 0 0 0 | 1 0 | 1 1 0 | $A = A + 4 MDR \cdot \Delta S$ |
| 4 | 1 0 1 0 | 1 1 0 0 | 1 0 0 0 | 1 0 | 1 1 0 | $A = A + 8 MDR \cdot \Delta S$ |
| 5 | 1 0 1 0 | 1 1 0 0 | 1 0 0 0 | 1 0 | 1 1 0 | |
| 6 | 1 0 1 0 | 1 0 0 0 | 1 0 0 0 | 1 0 | 1 1 0 | |
| 7 | 1 0 1 0 | 1 0 0 0 | 1 0 0 0 | 1 0 | 1 1 0 | |
| 0 | 0 1 1 0 | 0 0 0 1 | 1 0 0 0 | 1 0 | 1 1 0 | $A = A/16 \cdot \overline{DG12-15}$  SHIFT A 4 PLACES. |
| 1 | 0 1 1 0 | 1 0 0 0 | 1 0 0 0 | 1 0 | 1 1 0 | $B = B + A \cdot \Delta T_0$   $A = A + A$ |
| 2 | 0 1 1 0 | 1 0 1 0 | 1 1 0 0 | 1 0 | 1 1 0 | $B = B + A \cdot \Delta T_1$   $A = A + A$ }  $A = \Delta T$ |
| 3 | 0 1 1 0 | 1 0 1 0 | 1 1 0 0 | 1 0 | 1 1 0 | $B = B + A \cdot \Delta T_2$   $A = A + A$ |
| 4 | 0 1 1 0 | 1 0 1 0 | 1 1 0 0 | 1 0 | 1 1 0 | $B = B + A \cdot \Delta T_3$   $A = A + A$ |
| 5 | 0 1 1 0 | 1 0 1 0 | 1 1 0 0 | 1 0 | 1 1 0 | $B = B + A \cdot \Delta T_4$ |
| 6 | 0 1 1 0 | 1 0 0 0 | 1 1 0 0 | 1 0 | 1 1 0 | $B = B + A \cdot \Delta T_5$ |
| 7 | 0 1 1 0 | 1 0 0 0 | 1 0 0 0 | 1 0 | 1 1 0 | |

FIG. 17A

| WORD COUNT | | | | | "A" REG | | | | "B" REG | | | "C" REG | | "D" REG | | OPERATIONS |
|---|---|---|---|---|---|---|---|---|---|---|---|---|---|---|---|---|
| TM0-7 | TM7 | TM8 | TM9 | TM10 | RCA | ADD MDR | ADD A | ADD 4A | RCB | ADD A | SUB C | SHIFT B | RCC | ADD B | RCD | TIME OUT | LOAD D | |
| 0 | 0 | 0 | 0 | 1 | 0 | 0 | 0 | 0 | 1 | 0 | 0 | 0 | 1 | 0 | 1 | 1 | 0 | MDR = $f(S_i, P_K)$ |
| 1 | 0 | 0 | 0 | 1 | 0 | 1 | 0 | 0 | 1 | 0 | 0 | 0 | 1 | 0 | 1 | 1 | 0 | A = MDR |
| 2 | 0 | 0 | 0 | 1 | 1 | 1 | 0 | 0 | 1 | 0 | 0 | 0 | 1 | 0 | 1 | 1 | 0 | $A = A + MDR \circ \overline{\Delta S_0}$ ⎫ |
| 3 | 0 | 0 | 0 | 1 | 1 | 1 | 0 | 0 | 1 | 0 | 0 | 0 | 1 | 0 | 1 | 1 | 0 | $A = A + 2MDR \circ \overline{\Delta S_1}$ ⎬ $(16-\Delta S) \circ f(S_i, P_K)$ |
| 4 | 0 | 0 | 0 | 1 | 1 | 1 | 0 | 0 | 1 | 0 | 0 | 0 | 1 | 0 | 1 | 1 | 0 | $A = A + 4MDR \circ \overline{\Delta S_2}$ |
| 5 | 0 | 0 | 0 | 1 | 1 | 1 | 0 | 0 | 1 | 0 | 0 | 0 | 1 | 0 | 1 | 1 | 0 | $A = A + 8MDR \circ \overline{\Delta S_3}$ ⎭ |
| 6 | 0 | 0 | 0 | 1 | 1 | 0 | 0 | 0 | 1 | 0 | 0 | 0 | 1 | 0 | 1 | 1 | 0 | |
| 7 | 0 | 0 | 0 | 1 | 1 | 0 | 0 | 0 | 1 | 0 | 0 | 0 | 1 | 0 | 1 | 1 | 0 | |
| 0 | 1 | 0 | 0 | 1 | 1 | 0 | 0 | 0 | 1 | 0 | 0 | 0 | 1 | 0 | 1 | 1 | 0 | MDR = $(S_{i+1}, P)$ |
| 1 | 1 | 0 | 0 | 1 | 1 | 0 | 0 | 0 | 1 | 0 | 0 | 0 | 1 | 0 | 1 | 1 | 0 | $A = A + MDR \cdot \Delta S_0$ ⎫ |
| 2 | 1 | 0 | 0 | 1 | 1 | 1 | 0 | 0 | 1 | 0 | 0 | 0 | 1 | 0 | 1 | 1 | 0 | $A = A + 2MDR \cdot \Delta S_1$ ⎬ $\Delta S \cdot f(S_{i+1}, P_K)$ |
| 3 | 1 | 0 | 0 | 1 | 1 | 1 | 0 | 0 | 1 | 0 | 0 | 0 | 1 | 0 | 1 | 1 | 0 | $A = A + 4MDR \cdot \Delta S_2$ |
| 4 | 1 | 0 | 0 | 1 | 1 | 1 | 0 | 0 | 1 | 0 | 0 | 0 | 1 | 0 | 1 | 1 | 0 | $A = A + 8MDR \cdot \Delta S_3$ ⎭ |
| 5 | 1 | 0 | 0 | 1 | 1 | 1 | 0 | 0 | 1 | 0 | 0 | 0 | 1 | 0 | 1 | 1 | 0 | |
| 6 | 1 | 0 | 0 | 1 | 1 | 0 | 0 | 0 | 1 | 0 | 0 | 0 | 1 | 0 | 1 | 1 | 0 | |
| 7 | 1 | 0 | 0 | 1 | 1 | 0 | 0 | 0 | 1 | 0 | 0 | 0 | 1 | 0 | 1 | 1 | 0 | |
| 0 | 0 | 1 | 0 | 1 | 0 | 0 | 0 | 1 | 0 | 0 | 0 | 0 | 1 | 0 | 1 | 1 | 0 | $A = A/16 \cdot \overline{DG \, 12-15}$  SHIFT A 4 PLACES. |
| 1 | 0 | 1 | 0 | 1 | 1 | 0 | 0 | 0 | 0 | 1 | 0 | 0 | 1 | 0 | 1 | 1 | 0 | B = A |
| 2 | 0 | 1 | 0 | 1 | 1 | 0 | 1 | 0 | 1 | 1 | 0 | 0 | 1 | 0 | 1 | 1 | 0 | $B = B + A \cdot \overline{\Delta P_0}$    $A = A + A$ ⎫ |
| 3 | 0 | 1 | 0 | 1 | 1 | 0 | 1 | 0 | 1 | 1 | 0 | 0 | 1 | 0 | 1 | 1 | 0 | $B = B + A \cdot \overline{\Delta P_1}$    $A = A + A$ ⎬ $A \cdot (32 - \Delta P)$ |
| 4 | 0 | 1 | 0 | 1 | 1 | 0 | 1 | 0 | 1 | 1 | 0 | 0 | 1 | 0 | 1 | 1 | 0 | $B = B + A \cdot \overline{\Delta P_2}$    $A = A + A$ |
| 5 | 0 | 1 | 0 | 1 | 1 | 0 | 1 | 0 | 1 | 1 | 0 | 0 | 1 | 0 | 1 | 1 | 0 | $B = B + A \cdot \overline{\Delta P_3}$    $A = A + A$ ⎭ |
| 6 | 0 | 1 | 0 | 1 | 1 | 0 | 0 | 0 | 1 | 1 | 0 | 0 | 1 | 0 | 1 | 1 | 0 | $B = B + A \cdot \overline{\Delta P_4}$ |
| 7 | 0 | 1 | 0 | 1 | 1 | 0 | 0 | 0 | 1 | 0 | 0 | 0 | 1 | 0 | 1 | 1 | 0 | |
| 0 | 0 | 0 | 1 | 1 | 0 | 0 | 0 | 0 | 1 | 0 | 0 | 0 | 1 | 0 | 1 | 1 | 0 | MDR = $f(S_i, P_{K+1})$ |
| 1 | 0 | 0 | 1 | 1 | 0 | 1 | 0 | 0 | 1 | 0 | 0 | 0 | 1 | 0 | 1 | 1 | 0 | A = MDR |
| 2 | 0 | 0 | 1 | 1 | 1 | 1 | 0 | 0 | 1 | 0 | 0 | 0 | 1 | 0 | 1 | 1 | 0 | $A = A + MDR \cdot \overline{\Delta S_0}$ ⎫ |
| 3 | 0 | 0 | 1 | 1 | 1 | 1 | 0 | 0 | 1 | 0 | 0 | 0 | 1 | 0 | 1 | 1 | 0 | $A = A + 2MDR \cdot \overline{\Delta S_1}$ ⎬ $(16 \Delta S) \cdot f(S_i, P_{K+1})$ |
| 4 | 0 | 0 | 1 | 1 | 1 | 1 | 0 | 0 | 1 | 0 | 0 | 0 | 1 | 0 | 1 | 1 | 0 | $A = A + 4MDR \cdot \overline{\Delta S_2}$ |
| 5 | 0 | 0 | 1 | 1 | 1 | 1 | 0 | 0 | 1 | 0 | 0 | 0 | 1 | 0 | 1 | 1 | 0 | $A = A + 8MDR \cdot \overline{\Delta S_3}$ ⎭ |
| 6 | 0 | 0 | 1 | 1 | 1 | 0 | 0 | 0 | 1 | 0 | 0 | 0 | 1 | 0 | 1 | 1 | 0 | |
| 7 | 0 | 0 | 1 | 1 | 1 | 0 | 0 | 0 | 1 | 0 | 0 | 0 | 1 | 0 | 1 | 1 | 0 | |
| 0 | 1 | 0 | 1 | 1 | 1 | 0 | 0 | 0 | 1 | 0 | 0 | 0 | 1 | 0 | 1 | 1 | 0 | MDR = $f(S_{i+1}, P_{K+1})$ |
| 1 | 1 | 0 | 1 | 1 | 1 | 0 | 0 | 0 | 1 | 0 | 0 | 0 | 1 | 0 | 1 | 1 | 0 | $A = A + MDR \cdot \Delta S_0$ ⎫ |
| 2 | 1 | 0 | 1 | 1 | 1 | 1 | 0 | 0 | 1 | 0 | 0 | 0 | 1 | 0 | 1 | 1 | 0 | $A = A + 2MDR \cdot \Delta S_1$ ⎬ $\Delta S \cdot f(S_{i+1}, P_{K+1})$ |
| 3 | 1 | 0 | 1 | 1 | 1 | 1 | 0 | 0 | 1 | 0 | 0 | 0 | 1 | 0 | 1 | 1 | 0 | $A = A + 4MDR \cdot \Delta S_2$ |
| 4 | 1 | 0 | 1 | 1 | 1 | 1 | 0 | 0 | 1 | 0 | 0 | 0 | 1 | 0 | 1 | 1 | 0 | $A = A + 8MDR \cdot \Delta S_3$ ⎭ |
| 5 | 1 | 0 | 1 | 1 | 1 | 1 | 0 | 0 | 1 | 0 | 0 | 0 | 1 | 0 | 1 | 1 | 0 | |
| 6 | 1 | 0 | 1 | 1 | 1 | 0 | 0 | 0 | 1 | 0 | 0 | 0 | 1 | 0 | 1 | 1 | 0 | |
| 7 | 1 | 0 | 1 | 1 | 1 | 0 | 0 | 0 | 1 | 0 | 0 | 0 | 1 | 0 | 1 | 1 | 0 | |
| 0 | 0 | 1 | 1 | 1 | 0 | 0 | 0 | 1 | 1 | 0 | 0 | 0 | 1 | 0 | 1 | 1 | 0 | $A = A/16 \cdot \overline{DG \, 12-15}$  SHIFT A 4 PLACES. |
| 1 | 0 | 1 | 1 | 1 | 1 | 0 | 0 | 0 | 1 | 0 | 0 | 0 | 1 | 0 | 1 | 1 | 0 | $B = B + A \cdot \Delta P_0$    $A = A + A$ ⎫ |
| 2 | 0 | 1 | 1 | 1 | 1 | 0 | 1 | 0 | 1 | 1 | 0 | 0 | 1 | 0 | 1 | 1 | 0 | $B = B + A \cdot \Delta P_1$    $A = A + A$ ⎬ $A \cdot \Delta P$ |
| 3 | 0 | 1 | 1 | 1 | 1 | 0 | 1 | 0 | 1 | 1 | 0 | 0 | 1 | 0 | 1 | 1 | 0 | $B = B + A \cdot \Delta P_2$    $A = A + A$ |
| 4 | 0 | 1 | 1 | 1 | 1 | 0 | 1 | 0 | 1 | 1 | 0 | 0 | 1 | 0 | 1 | 1 | 0 | $B = B + A \cdot \Delta P_3$    $A = A + A$ ⎭ |
| 5 | 0 | 1 | 1 | 1 | 1 | 0 | 1 | 0 | 1 | 1 | 0 | 0 | 1 | 0 | 1 | 1 | 0 | $B = B + A \cdot \Delta P_4$ |
| 6 | 0 | 1 | 1 | 1 | 1 | 0 | 0 | 0 | 1 | 1 | 0 | 0 | 1 | 0 | 1 | 1 | 0 | |
| 7 | 0 | 1 | 1 | 1 | 1 | 0 | 0 | 0 | 1 | 0 | 0 | 0 | 1 | 0 | 1 | 1 | 0 | |

FIG. 17B

CLOSED LOOP EXHAUST GAS RECIRCULATION CONTROL SYSTEM

REFERENCE TO RELATED APPLICATIONS

This application is related to application Ser. No. 855,493 filed Nov. 28, 1977 by Alvin Dan Toelle on a "Closed Loop Exahust Gas Recirculation System" and which is assigned to the Assignee of the present invention.

BACKGROUND OF THE INVENTION

1. Field of the Invention

This invention relates generally to exhaust gas recirculation (EGR) systems for controlling emissions in vehicles and more particularly to a closed loop exhaust gas recirculation system which senses the actual engine operating parameters of engine speed, throttle position, and absolute manifold pressure and accurately controls EGR flow by adjusting the position of an EGR control valve in accordance with pre-programmed optimal positions stored in a first memory as a function of engine speed and throttle position and in a second memory as a function of engine speed and absolute manifold pressure.

2. Statement of the Prior Art

It is generally recognized that the production of noxious oxides of nitrogen ($NO_x$) which pollute the atmosphere are undesirable and in many cases are controlled by limits established by local, state and federal governmental regulations. The formation of $NO_x$ constituents in the exhaust gas products on an internal combustion engine must therefore be eliminated, minimized or at least maintained below some predetermined limit or level.

It is generally understood that the presence of $NO_x$ in the exhaust of internal combustion engines is determined by combustion temperature and pressure. An increase in combustion temperature causes an increase in the amount of $NO_x$ present in the engine exhaust. It is, therefore, desirable to control the combustion temperature in order to limit the amount of $NO_x$ present in the exhaust of an internal combustion engine.

One method suggested by the prior art for limiting or controlling the combustion temperature has been to recirculate a portion of the exhaust gas back to the engine air intake. Since the exhaust gas is low in oxygen, this will result in a dilute combustion mixture which will burn at a lower temperature. The lower combustion temperature will, in turn, reduce the amounts of $NO_x$ produced during combustion.

Similarly, it has, until recently, been common practice to run an internal combustion engine at or near a spark timing which produces maximum peak combustion pressures. Unfortunately, however, unacceptably high levels of $NO_x$ are produced in the combustion chambers when the engine operates at or near spark timings which produce maximum peak combustion pressure. In order to inhibit the formation and emission of $NO_x$ it is therefore desirable to limit the peak combustion pressure to a selected value.

One technique suggested by the prior art for limiting combustion pressure involves the recirculation of exhaust gases through the induction passage of the combustion chamber since it is well-known that an increase in recirculation of exhaust gases will reduce peak combustion pressure and thus the attendant levels of undesirable $NO_x$. Similar results may be achieved by retarding the spark.

Therefore, it is generally well-known that the formation of undesirable oxides of nitrogen may be reduced by recirculating a portion of the exhaust gas back to the engine air/fuel intake passage so as to dilute the incoming air/fuel mixture with inert $N_2$, $H_2O$, and $CO_2$. The molar specific heat of these gases and especially of $CO_2$ absorbs substantial thermal energy so as to lower peak cycle temperatures and/or pressures to levels conductive to reducing $NO_x$ formation.

While $NO_x$ formation is known to decrease as the exhaust gas recirculation (EGR) flow increases to where it represents about twenty percent of the exhaust gas constituents, it is also known that this is accompanied by a deterioration in engine performance including, but not limited to, an increase in engine roughness with increasing EGR. Therefore, one factor limiting the magnitude of EGR is the magnitude of EGR-induced performance deterioration or roughness that can be tolerated before vehicle drivability becomes unacceptable.

Most of the prior art attempts at solving these problems have employed various mechanical schemes for directly controlling the position of the EGR control valve which may be operated by sensing a single parameter such as throttle position, intake manifold pressure, exhaust back pressure, the air/fuel ratio, oxygen content, etc.

Such prior attempts to control EGR by sensing and shaping signals indicative of a single parameter of engine performance or sensing engine flow as a function of venturi vacuum or exhaust back pressure are not conducive to accuracy or programability.

Closed loop control systems for controlling various parameters of an internal combustion engine are known in the art, as are the above-identified EGR control systems, even though the prior art does not include many EGR control systems employing the closed loop mode of operation. U.S. Pat. No. 3,872,846 issued to L. B. Taplin et al on Mar. 25, 1975 for an Exhaust Gas Recirculation (EGR) Internal Combustion Engine Roughness Control System and is assigned to the assignee of the present invention. This patent teaches a closed loop internal combustion engine control system provided for controlling the exhaust gas recirculation flow so as to regulate engine roughness at a predetermined level. The closed loop control system of this patent receives input signals indicative of the engine roughness and generates therefrom an EGR valve command signal for varying the position of an EGR valve so as to effect the maximum possible EGR flow compatible with a predetermined maximum level of permissible engine roughness.

It is desirable to be able to control the generation and emission of noxious oxides of nitrogen during all modes of engine operation without causing vehicle drivability to reach an unacceptable level. It is also desirable to be able to accurately and programatically control $NO_x$ formation in a manner so as to allow a controllable trade-off between vehicle drivability and $NO_x$ formation, to suit the requirements of a given application.

It is, therefore, an object of the present invention to provide a new and improved closed loop EGR control system for reducing the formation of certain exhaust constituents of an internal combustion engine.

It is another object of the present invention to provide a closed loop EGR control system for preventing deterioration of engine performance below a predetermined level, for regulating engine roughness, and the like.

It is another object of the present invention to provide a method and apparatus employing a closed loop EGR control system which will provide improved accuracy over the entire range of engine operating conditions, greater programability of the amount of EGR for various conditions of speed and load, and improved control during transient modes of operation while simultaneously allowing a tighter control of $NO_x$ emissions.

It is yet another object of the present invention to provide an economical, highly reliable, programable method and apparatus for accurately maintaining a predetermined balance between $NO_x$ formation and vehicle drivability while eliminating or at least substantially reducing engine roughness, particularly roughness resulting from overcorrecton and/or to large or rapid of EGR correction over too short a period of time.

These and other objects and advantages of the present invention will be accomplished by the method and apparatus for the closed-loop control of EGR utilizing engine speed, throttle position, and manifold pressure to attain program and levels of EGR flow while simultaneously controlling the rate at which EGR flow adjustments or correcting are made to avoid engine roughness and the like.

It is a further object to provide a highly accurate programmable EGR system which eliminates or reduces at least substantially noxious pollutants while simultaneously maintaining optimal drivability by controlling, via closed loop, not only the correction in EGR flow required to meet the pre-programmed schedule but also the rate at which the correction is applied.

SUMMARY OF THE INVENTION

The closed loop of EGR control system of the present invention may be employed in an internal combustion engine having an intake system, a throttle for controlling the flow of air into the intake system, and an exhaust system, some type of output shaft rotatably driven by the combustion of fuel and air within the engine, a conduit operatively coupling the exhaust system to the intake system for supplying exhaust gases thereto and an EGR valve disposed at least partially within the conduit for controlling the flow of exhaust gases therein. The EGR control system of the present invention utilizes a first memory for storing optimal EGR values indicative of the desired position of the EGR valve as a function of first and second engine operating parameters and a second memory for storing a second table of optimal EGR values indicative of the desired position of the EGR valve as a functon of first and third engine operating parameters. Means are provided for measuring the engine operating parameters and for generatin first, second and third numbers or words indicative thereof.

Means responsive to the first and second words address the first memory and compute a desired first EGR value corresponding to the first and second measured actual engine operating parameters and responsive to the first and third numbers for addressing the second memory and computing a second desired EGR value corresponding to the actual measured values of the first and third engine operating parameters.

Logic means compare the first and second EGR values and determine the current EGR error value indicative of the actual positional error of the EGR valve. This value is compared with a previously computed EGR error value used to determined the last position adjustment of the valve to obtain the total change in EGR error value required for correcting the positon of the valve at the next scheduled position adjustment.

Rate limiting means are provided for adding only a predetermined portion of the change in EGR error value to the previously computed EGR error value to update same so as to insure that the rate at which positional corrections are made to said valve does not produce engine roughness and the like. Means responsive to the updated EGR error value are used to generate an EGR valve position correcton signal and control means reponsive to the correction signal adjust the position of the valve to vary the EGR flow so as to optimize drivability while simultaneously reducing noxious emissions below some predetermined acceptable level.

The invention contemplates a method and apparatus for the closed loop control of EGR to maximize drivability while minimizing noxious emissions by not only calculating the change required to achieve a pre-programmed optimal EGR flow, but limiting the rate at which the corrections are applied so as to avoid engine roughness and the like.

The method and apparatus of the present invention further includes means for varying or controlling the rate at which counts are made between successive ignition reference-induced reset pulses so as to enable the stem to be able to operate over a dynamic range of from approximately 500 to 7,500 RPM while encoding engine period or speed as a fixed length (in the preferred embodiments 8 bits), multi-bit binary word.

The invention contemplates a unique method and apparatus whereby two different memories are pre-programmed with optimal EGR values indicative of the desired position of the EGR valve as a function of different sets of engine operating parameters, e.g., engine speed and throttle position for one memory and engine speed and absolute manifold pressure for the other memory to greatly improve accuracy and programmable control of the EGR flow to the engine.

The invention also contemplates a unique method and apparatus for addressing the two different memories or memory sections during different timing intervals and for performing and implementing a double linear interpolation to compute accurate first and second EGR values which can be compared to determine whether or not an actual valve positioned error exists and the magnitude thereof.

The functions of the method and apparatus of the present invention are implemented in relatively inexpensive, fast, accurate and easy to maintain hardware comprising standard off-the-shelf logic elements used as building blocks to achieve applicants unique system. Further means are provided for externally controlling the rate at which the positional corrections are applied which may be pre-programmed, set manually, or set as a function of one or measured actual engine operating parameters by means of comparators, look-up tables, or the like.

Further means are provided for closed loop control of the ultimate valve position control signal by allowing for a programmable means for varying the magnitude and/or rate at which a programmable constant is substrated from an error value count to generate the control signal. The magnitude of this constant and/or the rate at which it is substracted may be pre-set or may be dynamically altered by a further closed loop syst... using one or more measured engine operating parameters as known in the art. Furthermore, the invention contemplates a method of closed loop control including the steps of determining a first EGR value indicative of a desired EGR valve position for actual values of first and second engine operating parameters and determining a second EGR value indicative of the desired EGR valve position for actual values of third and fourth engine operating parameters. One of the EGR values is substracted from the other to obtain an EGR error or correction for valve position error. The current EGR correction is compared to the previously computed EGR correction used to make the last valve position adjustment to determine the total change in EGR correction required to accurately position the valve at the next adjustment time. A predetermined portion of the total change in EGR correction is algebraically added to the previously computed EGR correction to generate a new or updated rate-limited correction for controlling the rated which valve position corrections are made to avoid engine roughness and the like. The method then contemplates the step of adjusting the position of the EGR valve in response to the new or updated EGR correction for selectively varying EGR flow to maintain noxious emissions below a predetermined acceptable level while optimizing drivability. It will be realized, of course, that one of the second and third engine operating parameters may be equal to one of the first engine operating parameters, such as engine speed, as illustrated in the preferred embodiment of the present invention.

The method and apparatus contemplated by the present invention provides a means for operating an EGR system in a closed loop mode based upon the sensed engine parameters of engine speed, throttle position and absolute manifold pressure, although other engine operating parameters such as air flow and the like could also be used, and provides a mean of calibrating, through experimental testing, mathmatical models or the like, any desired EGR quantity merely by changing the optimal EGR values stored in the first and second memories. Further, the degree of engine smoothness required may be selectively varied by changing the rate at which the corrections are applied by internal or external controls.

Other advantages and meritorious features of the present invention will be more fully understood from the following detailed description of the drawings and the preferred embodiment, the appended claims and the drawings, which are briefly described hereinbelow.

BRIEF DESCRIPTION OF THE DRAWINGS

FIG. 14 is a graphical representation of a three dimensional EGR surface of values indicative of desired EGR valve positions as a function of engine speed and either throttle position or absolute manifold pressure;

FIG. 15 is a timing diagram illustating the relation of the oscillator, clock, and digit gate pulses used in the various timing controls of the EGR control system of the present invention;

FIG. 16 is a timing diagram on a different scale illustrating the relationship of the word times to the digit times and illustating the pulses which control the various computation cycles and interpolation intervals implemented by the EGR control system of the present invention; and FIG. 17 A & B is a table illustrating, for various time periods, the sequence of operation of the various registers etc. implementing the double linear interpolation and addition/substraction/shifting process for computing and comparing the first and second EGR values to determine current valve position error as contemplated in the preferred embodiment of the method and apparatus of the present invention.

DESCRIPTION OF THE PREFERRED EMBODIMENTS

Figure 1:
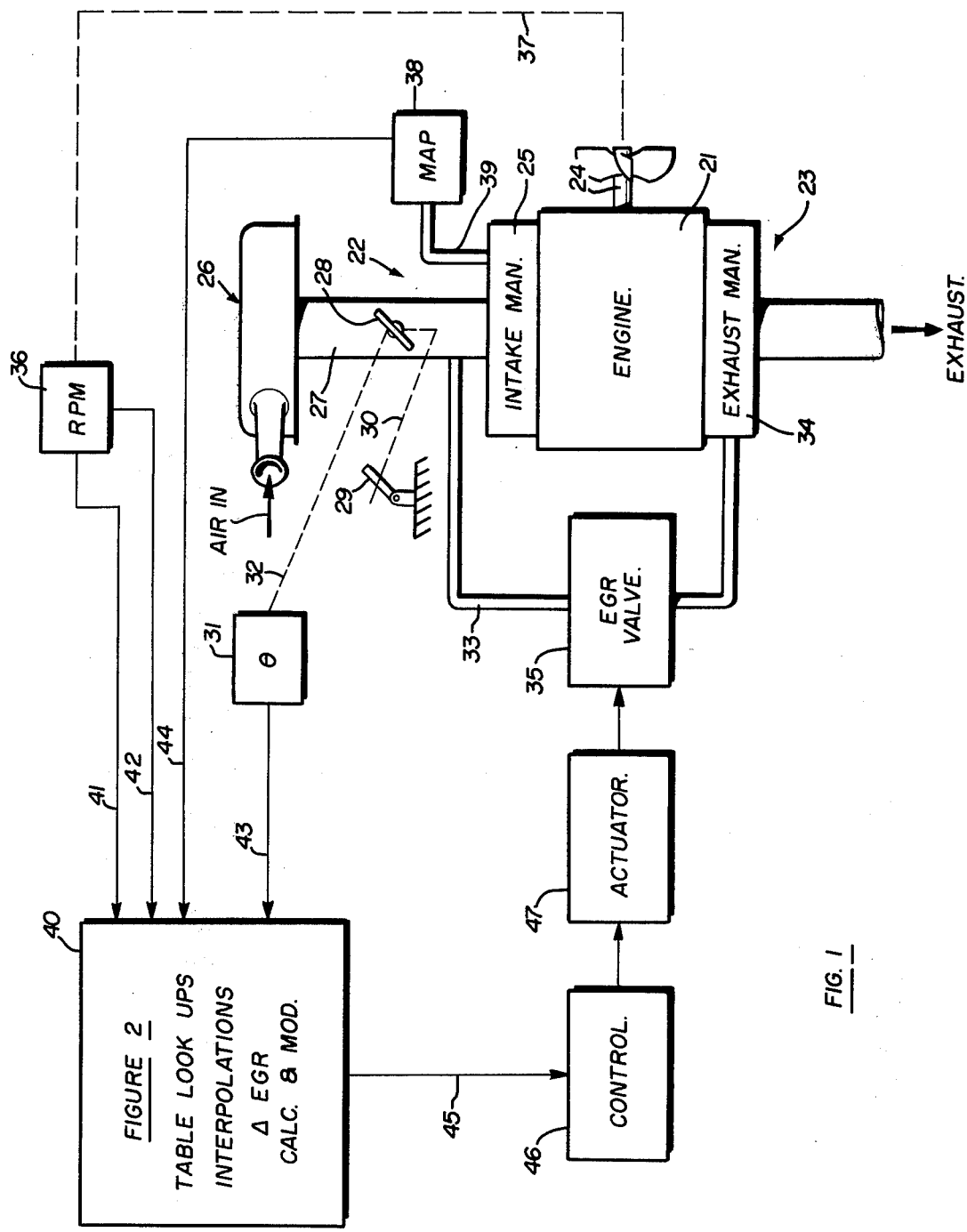
FIG. 1 is a block diagram illustrating the closed loop exhaust gas recirculation (EGR) control system of the present invention.

We can define optimal values of EGR flow or alternatively, optimal values representing the relative position of the EGR valve as a function of various engine operating parameters such as engine speed, throttle position or angle, absolute manifold pressure, air flow, oxygen sensing, temperatures, and the like. The present invention involves pre-programming a first memory look-up table with optimal EGR values indicative of the relative desired position of the EGR valve determined as a function of engine speed and throttle position or angle and pre-programming a second memory look-up table with second optimal EGR values indicative of the desired position of the EGR valve as a function of engine speed and absolute manifold pressure. A measurement of the actual operating values of engine speed, throttle position and absolute manifold pressure can be used to address the two memory tables and a comparison of the addressed EGR values can be used to determine whether or not more or less EGR flow is required at the time of the next valve position adjustment. In order to avoid engine roughness, only a portion of the error correction is made at a given adjustment cycle as hereinafter described.

It will be understood that there is no one ideal set of optimal EGR values but a look-up table of optimal EGR values may be determined as a function of engine speed and throttle position (or air flow or the like) for a given set of predetermined operating characteristics, such as a specified maximum limit to the generation and emission of the noxious oxides of nitrogen ($NO_x$) and a minimum level of deterioration in vehicle drivability for a given engine style in a given vehicle for use under given conditions, etc. Similarly, a look-up table of optimal EGR values may be generated as a function of engine speed and manifold absolute pressure or the like for operation under the same or substantially similar circumstances. The techniques for experimentally and/or mathmatically determining the set of optimal EGR values or any set of optimal values of a particular engine operating parameter as a function of two other engine operating parameters is well-known in the art.

The desired relationships between the control variables and the sensed conditions are determined generally by experimental methods. At every instant in the operation of an internal combustion engine and over its entire range of operation, there exists optimal settings for the controlled variables. The definition of what is optimal is not fixed but rather depends upon the use to which the engine is put and its state of operaton in that particular instance. For example, where the engine and its control system are to be employed in a passenger car, the overall goal for the engine control system may be maximizing efficiency, fuel economy and drivability while at the same time minimizing the generation and emission of noxious pollutants. Also, for a passenger car engine control system, optimal settings for the controlled variables are different, for example, when it is deaccelerating than when it is operating at a steady state speed or accelerating. To further complicate matters, the control variables are interdependent on one another, this interdependence of the controlled variables must be taken into consideration when preparing the given tables of optimal EGR values for a given range of engine speeds and either throttle position or absolute manifold pressures.

To experimentally determine the optimal EGR values to be stored in the two memory sections or read only memories (ROMs), a series of well-known and commonly used tests may be performed on a given engine type under the desired set of operating conditions to determine the optimal desired relationship between the EGR value indicative of the relative position of the EGR valve and the sensed parameters. Such tests and measurements are discussed in U.S. Pat. No. 3,969,614 which is incorporated by reference herein and are well-known in the art. Once an optimal set of values has been determined, the memory sections may be pre-programmed accordingly and if a new set of circumstances should exist in the future, the memory may simply be reprogrammed to provide a new set of optimal values, as desired.

FIG. 1 shows an internal combustion engine 21 having an intake system 22, an exhaust system 23, and an output shaft 24 which is operatively rotated by the combustion of fuel and air within the engine 21, as conventionally known.

The intake system 22 includes an intake manifold 25, an air inlet apparatus 26 and a throat 27 communicating the air inlet apparatus 26 with the intake manifold 25. A throttle valve 28, such as conventional butterfly valve or the like, is operatively disposed within the throat 26 to control the air flow between the inlet 26 and the intake manifold 25 for varying the air/fuel ratio and the like, as conventionally known. An accelerator pedal 29 is conventionally used to vary the position of the throttle valve 28, as indicated by the dotted line 30 from the accelerator pedal 29 to the throttle or throttle valve 28.

Transducer means generally represented by the block 31 is operatively coupled to or associated with the throttle valve 28, as indicated by the dotted line 32, for sensing or measuring the relative throttle angle or throttle position "$\theta$" of the throttle 28. Block 31 further includes A/D conversion means and other circuitry for generating a second number or multi-bit binary word indicative of throttle position, as hereinafter described with reference to FIGS. 2 and 4.

A conduit 33 is provided for operatively connecting the exhaust manifold 34 of the exhaust system 23 to the intake system 22 for supplying exhaust gases back to the intake system 22 for reducing the generation and emission of $NO_x$ and/or improving or at least preventing deterioration of vehicle drivability. An exhaust gas recirculation (EGR) valve, generally represented by block 35 is disposed in or at least partially within or operatively associated with the conduit 33 for regulating, controlling or metering the EGR flow.

Block 36 includes means such as a reactance transducer or a magnetic or optical pick-up or the like for sensing timing marks located on a rotating member of the engine such as the output shaft 24 or a pulley associated therewith, as represented by the dotted line 37, and circuitry for measuring the time interval between predetermined fixed timing marks and generating a first number or multi-bit binary word representative or indicative of the actual operating period or speed (RPM) of the engine 21.

Block 38 is operatively coupled to the intake system 22 of the engine 21 via conduit 39 and includes pressure transducer means for sensing the absolute manifold pressure exhisting within said intake system 22 and for converting an analog signal representative thereof into a third number or multi-bit binary indicative of the actual absolute manifold pressure (MAP) of the engine 21.

The first number indicative of engine speed is supplied from the RPM circuitry of block 36 to the circuit of block 40 via data path 41 and ignition reference pulses used for resets and the like may be supplied to the circuitry block 40 via data path 42. The second number indicative of throttle position is supplied from the circuitry of block 31 to block 40 via data path 43 and the third number indicative ov MAP is supplied from the output of block 38 to the circuitry of block 40 via data path 44.

Figure 2:
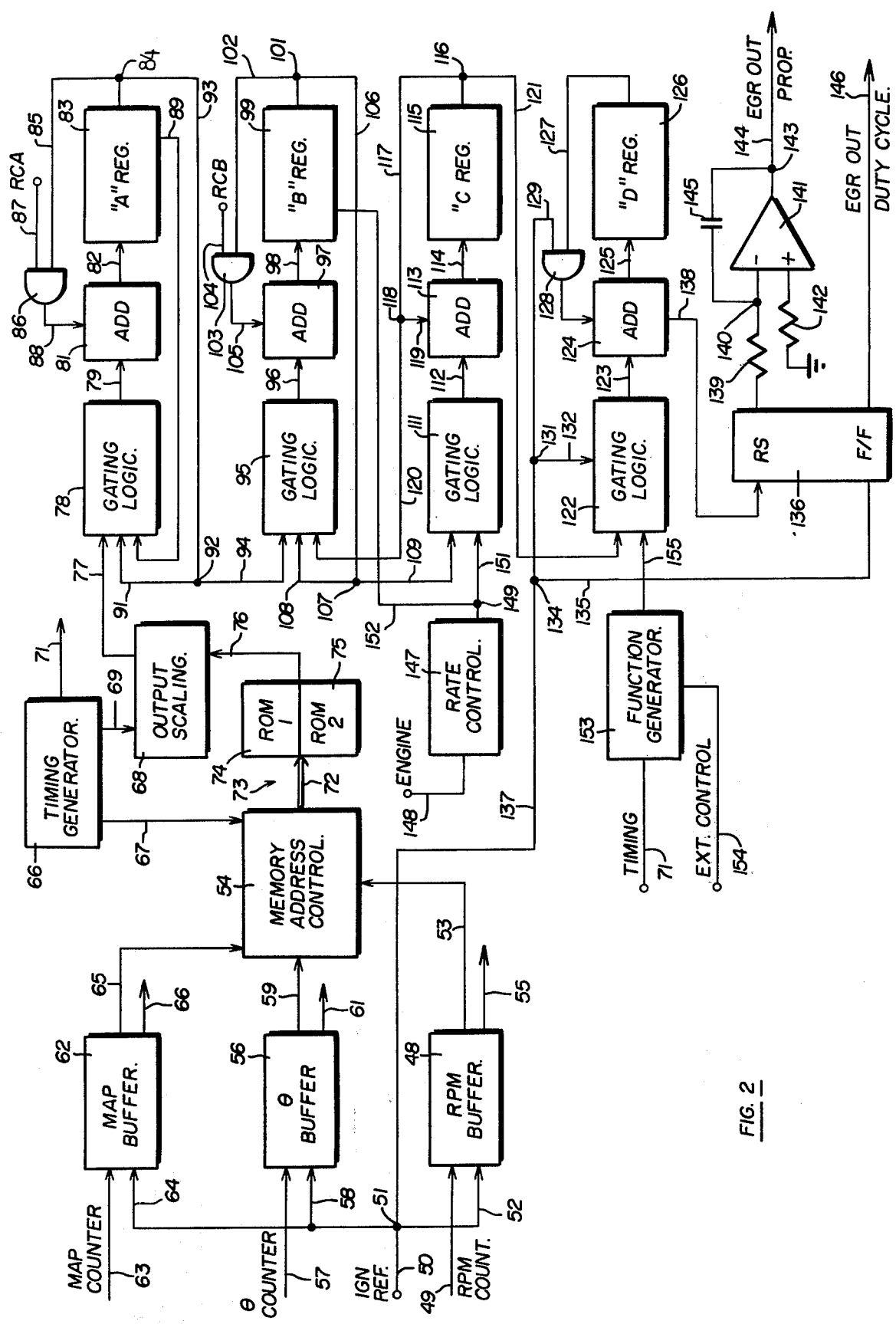
FIG. 2 is a more detailed block diagram of the circuitry contained generally within block 40 of FIG. 1 for implementing the buffer storage, timing, memory, memory addressing, interpolation, rate control, and control signal generation functions of the EGR control system of the present invention.

The circuitry of block 40 is shown in greater detail in the block diagram of FIG. 2 and includes means for performing the table look-ups of the first and second desired EGR values, interpolating between stored values when required, computing the change in EGR error signal needed to properly adjust the EGR valve position at the next position adjustment, calculating the predetermined portion of the change in EGR value error to be added to the previously used EGR error value for controlling the rate at which positional adjustments are made to avoid engine roughness and the like and generating a control signal responsive to the updated EGR error value for control purposes, as hereinafter described.

The output of the circuitry of block 40 generally represents a EGR valve position adjustment or control signal which is supplied via data path 45 to the control logic of block 46 which is responsive to the output of the circuitry of block 40 for controlling the operation of the actuator means of block 47. The actuator means of block 47 closes the EGR system loop and is used to selectively alter or adjust the position of the EGR valve 35 by opening or closing the EGR valve 35 by a predetermined amount dictated by the magnitude or duration of the currently outputted control signal so as to increase or decrease the amount of EGR supplied to the intake system 22 to allow the EGR control system of the present invention to optimize drivability while maintaining the generation and emission of noxious pollutants below a predetermined acceptable level while simultaneously avoiding engine roughness and the like.

FIG. 2 is a block diagram of the contents of block 40 of FIG. 1 and performs the major memory access and computation functions previously discussed for generating the desired EGV valve position control signals.

Briefly, the output from the engine speed counter to be hereinafter described in greater detail but which is included within block 36 of FIG. 1 supplies the multi-bit binary number or count or word indicative of engine speed to one input of the RPM buffer register 48 via data path 49. A source of predetermined ignition reference pulses used for reset purposes are supplied via lead 50 to a common reset node 51 and thence via lead 52 to the reset input of the RPM buffer 48. The first multi-bit binary number or word received from the RPM counter of block 36 of FIG. 1 is temporarily stored within the RPM buffer 48. A first data path 53 couples one set of outputs of the buffer 48 to a first set of inputs to the memory address control circuitry of block 54 so that the most significant bits (MSP) of the first multi-bit binary number indicative of engine speed and stored within the buffer 48 may be used for memory address purposes as hereinafter described.

A second set of outputs from the buffer 48 is supplied via data path 55 to output the least significant bits (LSB) of the first multi-bit binary number for use in performing the interpolation operation as hereinafter described.

The throttle position or throttle angle buffer 56 receives the second multi-bit binary number or word from the throttle position counter of block 31 via data path 57 and periodic reset pulses from the common reset node 51 via lead 58. One set of outputs of the throttle position buffer 56 is connected via data path 59 to the memory address control circuitry of block 54 for supplying the MSBs of the second multi-bit binary number indicative of throttle position thereto while a second set of outputs is coupled to data path 61 for outputting the LSBs of the second multi-bit binary number for use in the interpolation process as hereinafter described.

The MAP buffer 62 has one input adapted to receive the third multi-bit binary number or word from the MAP counter of block 38 via data path 63 and a second reset input adapted to receive the periodic ignition reference reset pulses from common reset node 51 via lead 64. One set of outputs of the MAP buffer 62 is coupled via data path 65 to another set of inputs of the memory address control circuitry of block 54 for supplying the MSBs thereto for memory address purposes while a second set of outputs is coupled to data path 66 for outputting the LSBs of the third multi-bit binary number or word for use in the interpolation process as hereinafter described.

A timing generator represented by block 66 supplies timing pulses to the memory address control circuitry of block 54 via data path 67, to the output scaling circuitry of block 68 via lead 69, and to other outputs represented generally by data path 71 for use in controlling the cycle of computations and operations of the present system as hereinafter described.

The various outputs from the memory address control circuitry of block 54 are represented generally by data paths 72 which are used to address the memory means 73 which include a first memory section or ROM 74 which is preprogrammed for storing a look-up table of optimal EGR values indicative of desired EGR valve positions determined as a function of engine speed or period and throttle position and a second memory section or ROM 75 which is preprogrammed with a look-up table or schedule of optimal EGR values indicative of desired valve positions determined as a function of engine speed and MAP.

The output of the memory means 73 is coupled via data path 76 to the circuitry of the output scaling block 68 whose output is coupled via data path 77 to one input of the gating logic of block 78. The output of the gating logic of block 78 is connected via data path 79 to the add circuitry of block 81 whose output is coupled via data path 82 to the input of a first "A" shift register 83 whose primary output is connected directly to the "A" register output node 84. Node 84 is connected via lead 85 to one input of an AND gate 86 whose other input is connected via lead 87 to a source of RCA (recirculate "A") pulses generated elsewhere in the circuitry as hereinafter described. The output of AND gate 86 is connected via lead 88 to the add circuitry of block 81. Furthermore, an intermediate stage output of the "A" register 83 is connected via lead 89 back to a second input of the gating logic of block 78. A third input to the gating logic circuitry of block 78 is connected via lead 91 to a node 92 which in turn is connected via lead 93 to the output node 84 of the "A" register 83 for recirculating the contents thereof upon command.

Node 92 which receives the output or contents of the "A" register 83 is also connected via lead 94 to one input of a second gating logic network 95 whose output is connected via data path 96 to one input of the add circuitry of block 97. The output of the add circuitry of block 97 is connected via data path 98 to the input of a second "B" register 99 whose primary output is taken directly from the "B" register output node 101. The output node 101 is connected via lead 102 to one input of an AND gate 103 whose other input is connected via a lead 104 to a source of RCB (recirculate "B") pulses which are generated as hereinafter explained. The output of AND gate 103 is coupled via lead 105 to another input of the add circuitry of block 97. Output node 101 is also connected via lead 106 to a node 107 and thence via lead 108 back to a second input of the second logic gating circuitry of block 95.

Node 107, which receives the output of the "B" register 99 via output node 101 and lead 106, is also connected via lead 109 to one input of a third gating logic network 111 whose output is connected via data path 112 to the input of third adding circuit 113 whose output is connected via data path 114 to the input of the third "C" register 115 whose primary output is taken directly from output node 116. Output node 116 is connected via lead 117 to a node 118 and node 118 is connected via lead 119 to another input of the add circuitry of block 113 and via lead 120 to another input of the second gating logic network 95.

The output 116 of the "C" register 115 is also connected via lead 121 to one input of the fourth gating logic network 122 whose output is connected via data path 123 to one input of a fourth adding circuit 124. The output of the add circuitry of block 124 is connected via lead 125 to the input of the fourth "D" register 126 whose primary output is connected via lead 127 to one input of an AND gate 128 whose other input is connected via lead 129 to a node 131. Node 131 is connected to another input of the fourth gating logic network 122 via lead 132 and via lead 133 to a node 134. Node 134 is connected directly to the reset input of a standard RS flip-flop 136 via lead 135 and to the common reset node 51 via lead 137.

Another output of the add circuitry of block 124 is connected via lead 138 to the set input of the RS flip-flop 136. The high or "Q" output of the flip-flop 136 is connected through a resistor 139 to a first input node 140 of an operational amplifier 141. The first input node 140 is connected directly to the negative input of the operational amplifier 141 while the positive input is coupled to ground through a resistor 142. The output of the operational amplifier 141 is taken from output node 143 and supplied via lead 144 to the control circuitry of block 46 of FIG. 1 or the like for outputting an EGR valve position control signal as hereinafter described. An integrating capacitor 145 has one plate connected to the input node 140 of the operational amplifier 141 and the opposite plate connected to the output node 143 so as to form a conventional integrator configuration for generating an output pulse proportional to the time duration during which the flip-flop 136 is set. The Q output of flip-flop 136 is coupled to a lead 146 to supply an EGR OUT signal indicative of the duty cycle thereof.

The rate control circuitry of block 147 can be controlled internally or externally via data path 148 which may be coupled to some source of signals indicative of the state of predetermined engine operating parameters or the like. The output of the rate control circuitry of block 147 is connected directly to a rate control output node 149, and note 149 is connected via lead 151 to another input of the third gating logic network 111 and via lead 152 to a predetermined state of the second "B" register 99 for controlling the rate at which EGR valve position corrections or adjustments are made to avoid engine roughness as hereinafter described.

The function generator of block 153 has a timing input coupled to one of the output leads 71 of the timing generator of block 66 and another input coupled via lead 154 to a source of external control signals as hereinafter described. The output of the functon generator 153 is connected via data path 155 to another input of the fourth gating logic network 122 to assist in the generation of the EGR valve control signal and to selectively alter same in a closed loop manner under the influence of external engine operating parameters if desired.

The operation of the closed loop EGR control system of FIGS. 1 and 2 will now be briefly described. The first ROM 74 is pre-programmed with a first schedule or look-up table of EGR values representative of a set of desired positions of the EGR valve as a function of engine speed and throttle angle or position. The second ROM 75 is pre-programmed with a second schedule or lookup table of optimal EGR values representative of a set of desired positions of the EGR valve as a function of engine speed and absolute manifold pressure.

The engine operating parameters, in the preferred embodiment, engine speed, throttle position and absolute manifold pressure are sensed and converted to a first, second and third multi-bit binary numbers which are indicative of engine speed, throttle position and MAP, respectively. The first, second and third multi-bit binary numbers are temporarily stored in the RPM buffer 48, throttle angle buffer 56 and MAP buffer 62, respectively.

Using appropriate timing signals from the timing generator 66, the memory address control circuitry of block 54 selects the MSBs of the first and second words indicative of engine speed and throttle angle from the respective buffers 48, 56 and addresses first and second dimensions of the first memory portion 74 to read out the value stored therein. This value is fed via the output scaling circuitry of block 68, the gating logic of block 78, and the add circuitry of block 81 into the "A" register 83 and it is modified therein by double linear interpolation procedure using the LSBs of the first and second words via data paths 55 and 61 respectively. Adjacent memory locations of the first memory section 74 are sequentially addressed under the influence of the memory address control circuitry of block 54 and commands from the timing generator 66 to provide the values necessary for the interpolation. At the end of the interpolation process, the desired first EGR value representing the desired value corresponding to the actual measured values of engine speed and throttle position is stored in the "B" register 99.

The second pre-programmed memory portion 75 is then addressed with the MSBs of the first and third words stored in buffers 48 and 62 respectively to output the value stored therein to the output scaling circuitry of block 68 to the input of the gating logic of block 78. Successive adjacent values are addressed as required for the interpolation process and a double linear interpolation is performed using the LSBs of the first and third words as previously described until the second EGR value indicative of the desired position of the EGR valve corresponding to the actual measured values of engine speed and MAP are computed and subtracted from the first EGR value with the difference representing an EGR error value being stored in the "B" register 99.

The previously computed EGR error value used to determine the previous EGR valve positional error correction is stored in the "C" register 115. This previously computed and stored EGR error value represents the past history of positional corrections. The gating logic 95, 111, the adding circuitry of blocks 97 and 113 and various timing signals from the timing generator of block 66 are used to subtract the value of the previously computed EGR error value stored in the "C" register 115 from the current EGR error value stored in the "B" register 99 and in the resulting difference, which represents the total change in EGR value required to correct the position of the EGR valve at the next scheduled positional adjustment, is stored in the "B" register 99.

In order to avoid engine roughness and the like, the entire change in positional adjustment is not made all at one but is averaged or spread out by means of a digital filtering technique represented by the rate control logic of block 147. Block 147 multiplies, via a digital filter technique, the change in EGR error values currently stored in the "B" register 99 by a predetermined fractional constant and adds the resulting fractional portion via the gating logic of block 111, and the addition circuitry of block 113 to the "C" register 115 to up-date or provide a new EGR error value upon which the next positional adjustment will be based.

The up-dated EGR value is fed into the gating logic network 122 and added via block 124 to the "D" register 126 as a binary number or count. The function generator 153 establishes a count rate and subtracts a predetermined constant value from the count stored in the "D" register 126 via gating logic 122 and the adding circuitry of block 124. Once the "D" register 126 has been preset with the value stored in the "C" register 115, the contents of the "D" register are decreased by the fixed amount established by the function generator 153 at the predetermined rate until the contents of the register 126 become less than or equal to zero. A flip-flop 136 is initially closed by an ignition reference reset pulse and then set once the binary number or count is entered into the "D" register and the substraction process is begun. As soon as the contents of the "D" register 126 becomes less than or equal to zero, the flip-flop 136 is reset. The output of the flip-flop 136 is integrated via the integrator circuitry of operation amplifier 141 to generate an EGR valve positional control signal whose time duration is proportional to the magnitude of the desired positional correction and this signal is used via control circuitry 46 to regulate the actuator 47 and to position the EGR valve 135 as hereinafter described.

The computation logic of the preferred embodiment of the EGR control system of the present invention operates on a 16 bit digital word in a serial manner. Digital gate signals identify time intervals within a digital word which correspond to the 16 specific data bits thereof. A word counter determines groups of eight words which relate to specific computations and the word counter is synchronized with reset pulses which occur at the cylinder firing rate in the preferred embodiment of the present invention. In general, data are read from the memory means 73 during the initial word MP0 and added to an accumulator 83 during the words MT1-MT6. The digital word MT7 is used for updating the memory address registers of the circuitry of block 54 as hereinafter described.

The timing generator circuitry of block 66 is used to generate the digit gate signals, word intervals, and computation time intervals which will be described with reference to the apparatus of FIG. 3 and the timing diagrams of FIGS. 15 and 16. An oscillator 161, such as a conventional two megahertz oscillator, supplies its output to the input of an inverter 162 via lead 163. The output of the inverter 162 is connected directly to node 164. Node 164 is connected via lead 165 to the clock input of a conventional JK flip-flop 166 whose "J" and "K" inputs are commonly connected to a source of positive potential. The "Q" output of the flip-flop 166 is connected via lead 167 to a node 168. Node 168 is connected via lead 160 to a first input of NAND gate 169 whose opposite input is connected via lead 170 to input node 171. Node 171 is connected to the output of an inverter 172 whose input is directly connected to node 164.

The output of the two megahertz oscillator 161, which appears on lead 163, is shown as the first line of the timing diagram of FIG. 15. Flip-flop 166 divides the pulse output rate of the oscillator by two to generate a one megahertz square wave on lead 167. Since the one megahertz square wave is gated with the oscillator output via NAND gate 169, its output generates the signal CLOCK which is a 1 megahertz, 25 percent duty cycle, negative-going pulse train. The inverse of this signal, CLOCK, is shown as the second line of timing diagram 15.

The CLOCK output of NAND gate 169 is supplied via lead 173 to the input of a conventional four stage, divide-by-sixteen counter. The four outputs of the counter 174 are taken from output nodes 175, 176, 177 and 178 and are connected to the four inputs of a first binary coded decimal (BCD) decoder 179 via leads 180, 181, 182 and 183 respectively. Output nodes 175, 176 and 177 are also connected to the three least significant inputs of a second conventional BCD decoder 184 via leads 185, 186 and 187 respectively, while the fourth output node 179 is connected to the input of an inverter 188 whose output is connected via lead 189 to the fourth or most significant bit input of the BCD decoder 184. As conventionally known, the four bit binary number accumulated in the four stages of the counter 174 is decoded by the BCD decoders 179, 184 to output 16 digit gate signals DG0-DG15 corresponding to the sixteen consecutive counts accumulated in the four stage binary counter 174. The digit gates signals DG0-DG15 are represented generally by the timing diagram of FIG. 15 and are taken from the outputs of the BCD decoders 179, 184 via decoder output leads 190-205 respectively and may be used for various timing purposes as hereinafter described.

The most significant digit output of the BCD decoders 179, 184 is taken via lead 205 and supplied via lead 206 to node 207. Node 207 is connected via lead 208 to the input of a NAND gate 209 whose second input is connected via lead 211 to the source of the last word interval signal MT7 which is generated as hereinafter described. The NAND gate 209 will output the signal MT7CY on lead 212 which will be high except during the generation of the last of the sixteen digits of the last word of a given 8 word computation interval.

Node 168 is connected via lead 213 to another node 214 while node 171 is connected via lead 215 to still another node 216. Node 214 is connected via lead 217 to one input of a NAND gate 218 haing another input connected via lead 219 to node 216 and a third output connected via lead 221 to the node 207. The output of NAND gate 218 is the clock signal MTCL which is supplied via lead 222 to the input of a conventional three stage binary counter with decoded outputs represented by block 223. The output of NAND gate 218 will generate signals to be counted by the three stage counter 223 with the generation of each of the sixteenth and final digits DG15 of a given word interval. The three stage counter 223 is initially reset at the start of each computation sequence by the signal IRES via lead 224 and the source of the reset signal IRES will be hereinafter described. The three stage binary counter 223 is used as a word counter and automatically decodes the three stage binary count to eight outputs representing the consecutive digital words MT0–MT7 which are outputted via leads 230–237 respectively. The digital words MT0–MT7 are shown generally on the timing diagram of FIG. 16 and are used to control the computation sequences as hereinafter described.

Node 214 is also connected via lead 238 to a first input of NAND gate 239 having a second input connected via lead 241 to node 216 and a third input connected via lead 212 to the signal MT7CY at the output of NAND gate 209, as previously described. The output of NAND gate 239 is the signal TM7CL which occurs at the end of each group of eight decimal words and which is supplied via lead 242 to counter stages for generating the timing intervals TM7, TM8, TM9 and TM10 of the timing diagram of FIG. 16 which are used to control the computation sequence of the EGR control system of the present invention.

Lead 242 is connected to the clock input of a first "D"-type flip-flop 243 via node 244 and lead 245; to the clock input of a second "D"-type flip-flop 246 via node 244, lead 247, node 248 and lead 249; and to the count input of a conventional four stage binary cunter configured as a divide-by-four (two stage) counter 251 via lead 252. The "Q" output of flip-flop 243 is taken from node 253 and represents the timing interval signal TM7. This signal is supplied via node 253 directly to other circuit inputs; to the set input of flip-flop 246 via lead 254; and to one input of a NOR gate 255 via lead 256. The output of the second flip-flop 246 is taken from output node 257 and represents the timing interval signal TM8. This signal is supplied via the output node 257 directly to the enabling input of the divide-by-four counter 251 via lead 258; to the second input of NOR gate 255 via lead 259; and directly to other systems circuit inputs. The output of NOR gate 255 is connected to the set input of the first flip-flop 243 via lead 261 and is low unless TM7 and TM8 are simultaneously low as illustrated in the timing diagram of FIG. 16.

The divide-by-four counter 251 also has a reset input connected via lead 260 to the source of the reset pulses IRES which reset the counter at the start of each cycle. The reset pulses IRES are also supplied via lead 260 to the reset inputs of "D" type flip-flops 243 and 246. The first output stage of the counter 251 is the timing interval signal TM9 and this output is connected via lead 262 to both inputs of a NAND gate 263 which output the inverted time interval signal TM9 on lead 264 while the second output stage of the counter 251 supplies the time interval signal TM10 which is connected via lead 265 to the commonly coupled input of a second NAND gate 266 whose output supplies the inverted time interval signal TM10 on output lead 267.

Figure 3:
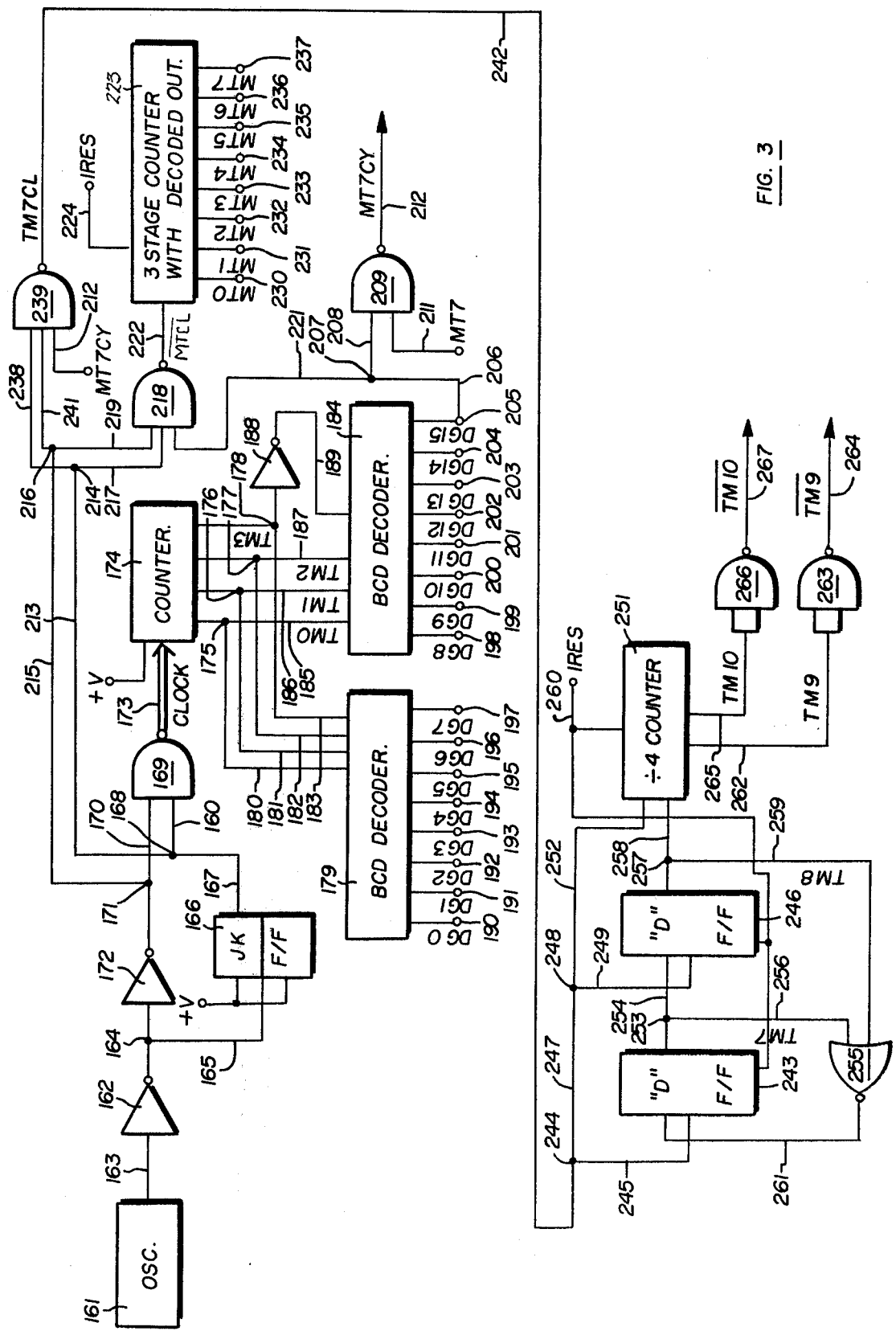
FIG. 3 is a schematic diagram of the circutry used to implement the functions of the timing generator of block 66 of FIG. 2.

The various digit gate signals DG0–DG15, digit word signals or intervals MT0–MT7 and timing signals or intervals described with respect to FIG. 3 are utilized for various timing and sequencing operations to be described hereinafter. For example, data is usually read from the memory means 73 during the word MT0, added to the accumulators for computation purposes during word times MT1–MT6 and then the word time MT7 is used for updating the memory address circuitry of block 54. Furthermore, the time interval TM8 (when the wave form TM8 is a logical 0) and which is illustrated in FIG. 16, is used for performing interpolation calculations using the RPM engine speed values. The first interpolated RPM value is calculated during the time interval TM7 while the second portion is calculated during the time interval TM7. The interpolation of the throttle position or manifold pressure dimension occurs during the time interval TM8 so that one-half of an interpolation, i.e., along one memory address or dimension is accomplished during the timing interval TM9, while the second half is calculated during the time interval TM9. Therefore, the entire double linear interpolation process required for defining the desired first EGR value corresponding to the actual values of measured engine speed and throttle position is performed during the timing interval TM10, while the entire double linear interpolation required for accurately defining the desired second EGR value corresponding to the actual measured values of engine speed and MAP is calculated during the timing interval TM10 as hereinafter described.

Figure 5:
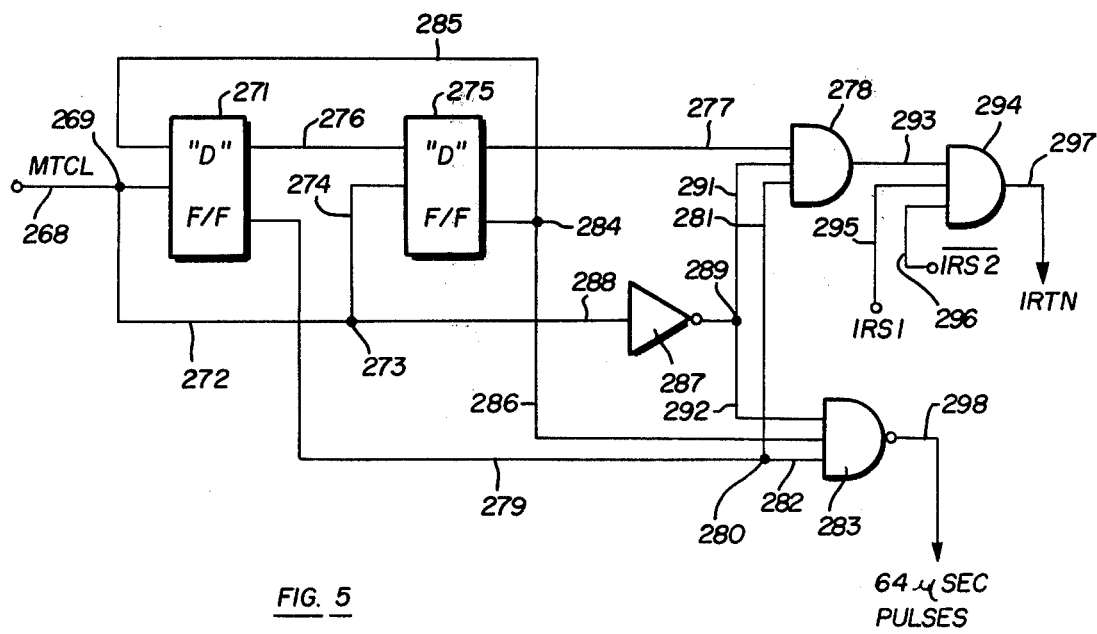
FIG. 5 is a schematic diagram forming an additional portion of the timing generator of block 66 of FIG. 2 for generating the 64 microsecond pulses required by the "RPM" block 36 of FIG. 1 and more specifically by the engine speed sensing circuitry of FIG. 6.

FIG. 5 illustrates another portion of the timing circuitry generally associated with block 66 of FIG. 2. The signal MTCL represents the inverse of the signal generated at the output of NAND gate 218 of FIG. 3 and supplied via lead 222 to the input of the three stage counter 223. The signal MTCL occurs every 16 microseconds and it is supplied via lead 268 to a clock input node 269. Node 269 is connected directly to the clock input of a first "D"-type flip-flop 271 and via lead 272 node 273 and lead 274 to the clock input of a second "D"-type flip-flop 275.

The high or "Q" output of the first flip-flop 271 is connected via lead 276 to the set input of the second flip-flop 275. The "Q" output of flip-flop 275 is connected via lead 277 to a first input of a logical AND gate 278. The low or "Q" output of the first flip-flop 271 is connected via lead 279 to a node 280. Node 280 is connected via lead 281 to a second input of the logical AND gate 278 and via lead 282 to a first input of a NAND gate 283. The low or "Q" output of the second flip-flop 275 is taken from output node 284 which is connected via lead 285 to the set input of the first flip-flop 271 and via lead 286 to a second input of NAND gate 283. The node 273 which receives the signal MTCL is connected via lead 288 to the input of an inverter 287. The output of the inverter 287 is taken from node 289 which is connected via lead 291 to the third input of the logical AND gate 278 and via lead 292 to the third input of NAND gate 283.

The output of the logical AND gate 278 is supplied via lead 293 to a first input of a second logical AND gate 294 whose second input is connected via lead 295 to a source of the signal IRS1, while the third and final input of AND gate 294 is connected via lead 296 to a source of the signal IRS2. The generation of the signals IRS1 and IRS2 will be described hereinafter. The output of logical AND gate 294 is taken from lead 297 and represents the signal IRTN which has a first phase and which is used for data transfers as hereinafter decribed. The output of NAND gate 283 is taken from lead 298 and supplies a source of 64 microsecond pulses which are out of phase with the signal IRTN and which are used for generating reset pulses synchronized with the engine speed as hereinafter described in conjunction with the circuitry of FIG. 6.

Figure 4:
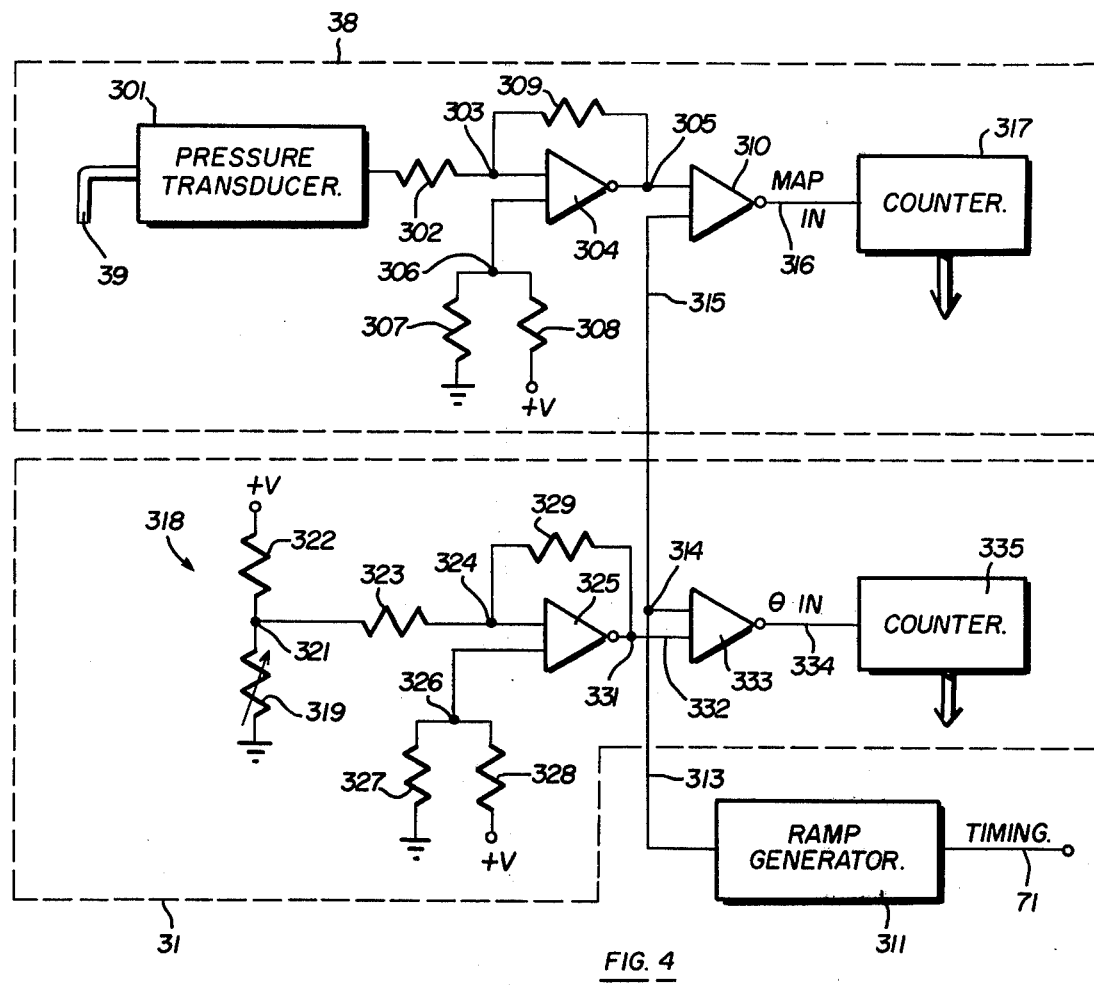
FIG. 4 is a schematic diagram of circuitry for implementing the sensing and A/D conersion functions of the "θ" block 31 and the "MAP" block 38 of the system of FIG. 1.

FIG. 4 illustrates one embodiment of the sensing means and A/D conversion means of blocks 31 and 38 of FIG. 1. Any suitable sensing means and A/D converting means (if required) capable of actually measuring the designated engine operating parameters, for example MAP and throttle position, could also be used.

In FIG. 4, the sensing means and A/D conversion means of the MAP block 38 of FIG. 1 will be further described. A conventional pressure transducer 301 such as a standard strain-gage, diaphram-type absolute pressure transducer or a Gulton pressure transducer is operatively coupled to the intake manifold 25 of the internal combustion engine 21 of FIG. 1 via the vacuum hose or coupling 39. The output of the pressure transducer 301 is an analog voltage signal proportional to the actual absolute manifold pressure existing in the intake system 22 of the internal combustion engine of FIG. 1.

The analog voltage signal outputted by the pressure transducer 301 is supplied via resistor 302 to an amplifier input node 303. Input node 303 is connected dirctly to one input of an operational amplifier 304 whose output is taken from amplifier output node 305. A second input of the operational amplifier 304 is connected directly to a node 306 which is connected to ground through a first resistor 307 and to a source of positive potential through a second resistor 308. A resistor 309 is connected across the operational amplifier 304 with one end being connected to input node 303 and the opposite end of resistor 309 being connected to the output node 305 in a conventional operational amplifier configuration.

The output of the operational amplifier 304 is supplied from output node 305 directly to a first input of a voltage comparator 310. The value of the resistances 302, 307, 308, and 309, which are associated with the operational amplifier 304, serve to condition the output of the transducer 301 so that the output voltages corresponding to the minimum and maximum expected absolute manifold pressures are the same as the minimum and maximum voltages generated by a conventional ramp generator illustrated by block 311. The ramp generator receives timing pulses via lead 71 from the timing generator of block 66 and the output of the ramp generator of block 311 is connected via lead 313, node 314 and lead 315 to the second input of the voltage comparator 310 so that the comparator 310 outputs a high signal MAP IN on output lead 316 so long as the output of the operational amplifier 304 is greater than the output voltage of the ramp generator 311, as conventionally known. The signal MAP IN is supplied via lead 316 to the input of the conventional binary counter 317 whose inputs and outputs will be further described with reference to FIG. 8.

The transducer means and A/D converter means of the throttle position block 31 of FIG. 1 will now be described with reference to FIG. 4. A conventional position transducer 318, such as a conventional one-turn, wire-wound potentiometer electrically connected in a voltage divider circuit for supplying DC voltages proportional to the relative position of the throttle valve 28 of FIG. 1 is shown as including a variable resistor 319 having one end connected directly to ground and the other end connected to a voltage divider node 321. Node 321 is connected to one end of a second resistor 322 whose opposite end is connected to a source of positive potential. Resistance changes caused by variations in the position or angle of the throttle valve 28 of FIG. 1 are sensed by measuring voltage drop across the variable resistor 321 and the output of the transducer 318 is taken from voltage divider node 321 and supplied via resistor 323 to an input node 324 of a second operational amplifier 325. The input node 324 is connected directly to one input of the operational amplifier 325 and the second input of the operational amplifier 325 is taken directly from a node 326 which is coupled to ground through a first resistor 327 and to a source of positive potential through a second resistor 328. A third resistor 329 is connected across the operational amplifier 325 so that one end of resistor 329 is connected to the input node 324 and the opposite end is connected to the output of the operational amplifier 325 which is taken from output node 331 so as to form a conventional operational amplifier configuration as previously described.

The configuration of the operational amplifier 325 and the value of the resistors 323, 327, 328 and 329 conditions the output of the positional transducer 318 so that the voltages corresponding to the minimum and maximum expected positions of the throttle valve 28 correspond to the minimum and maximum voltages generated by the ramp generator 311 as previously described.

The operational amplifier output node 331 is connected via lead 332 to one input of the second voltage comparator 333 whose opposite input is connected directly to the ramp generator output node 314 so that the comparator output signal $\theta$ IN, which is taken from lead 334, will remain high as long as the output signal from the operational amplifier 325 is greater than the ramp voltage generated by the ramp generator circuitry of block 311. The signal $\theta$ IN is supplied or inputted to another conventional binary counter 335 whose inputs and outputs will be further described hereinafter with reference to the circuitry of FIG. 8.

The engine speed measurement circuitry of block 36 of FIG. 1 will now be described with reference to FIG. 6. Engine period or speed (RPM) is determined by measuring the time interval between fixed timing marks which are located on a rotating member of the engine such as the output shaft 24 of the internal combustion engine 21 of FIG. 1 or on a pully or the like affixed thereto. The actual means for sensing the timing marks is indicated by block 341 and may be, for example, a magnetic reluctance pick-up, a photo-optical sensor, or any suitable conventional means for sensing timing marks. The outputs of the timing mark sensor means of block 341 are connected to the inputs of an amplifier 342 for generating the sequence of ignition reference pulses IGN REF indicative of engine period or speed. The engine speed information is obtained by measuring the time interval of the number 2/N of an engine revolution where N is the number of cylinders in the internal combustion engine 21.

The IGN REF pulses which occur every 720/N degrees are supplied via lead 343 to the set input of a "D" type flip-flp 344 whose output is taken from an output node 345. The output node 345 from the first flip-flop 344 is connected via lead 346 to the set input of a second "D" type flip-flop 347. The output of the first flip-flop 345, which appears at output node 345, is the signal IRS1 and this signal is supplied via lead 348 to a node 349 and via lead 295 to the logical AND gate 294 of FIG. 5, as previously described. The high or "Q"

output of the second flip-flip 347 represents the signal IRS2, which appears on lead 351, while the inverse of this signal, IRS2, is taken from the low or "Q" output and supplied via lead 352 to a node 353. The signal IRS2 is also supplied via lead 296 to an input of the logical AND gate 294 of FIG. 2, as previously described.

The 64 microsecond clock pulses generated by the circuit of FIG. 5 are supplied via lead 298 to the 64 microsecond pulse input node 354. Node 354 supplies the pulses to the clock input of the first flip-flop 344 via lead 355; to the clock input of the second flip-flop 347 via lead 356, node 357 and lead 358; and to a node 359 via lead 361.

Node 359 is connected via lead 362 to a first input of logical OR gate 363 and to the input of an inverter 364 via lead 365. The output of inverter 364 is connected via lead 366 to one input of a logical AND gate 367. A second input of the logical AND gate 367 is connected to node 349 via lead 368 while a third input of AND gate 367 is connected via lead 369 to the node 353. The output of the logical AND gate 367 is the reset signal IRES which appears on lead 370 and this signal is used throughout the circuitry of the EGR control system of the present invention for reset purposes.

The reset signal IRES is supplied to the reset node 371 and thence via lead 372 and node 373 to the clear inputs of a pair of JK flip-flops 374, 375. Node 353 is connected via lead 376 to one input of a logical AND gate 377 whose other input is connected via lead 378 to node 349. The output of logical AND gate 377 is connected via lead 380 to the second input of the logical OR gate 363 whose output is taken from node 378. Node 378 is connected via lead 379 to the clock input of JK flip-flop 374 while the "J" and "K" inputs of flip-flop 374 are commonly connected directly to a source of positive potential. Node 378 is also connected via lead 381 to a node 382, and node 382 is connected via lead 383 to the clock input of the second JK flip-flop 375. The "Q" output of JK flip-flop 374 is taken from node 384, and node 384 is connected via lead 385 to the "J" or set input of flip-flop 375 and via lead 386, node 387, and lead 388 to the "K" or reset input of flip-flop 375 as well.

The high or "Q" output of JK flip-flop 375 is connected via lead 389 to one input of a logical AND gate 391. A second logical AND gate 392 has one input connected to a source of the signal RPM6, as hereinafter described, via lead 393, and the "Q" output of the first JK flip-flop 374 is connected to a node 395 via output node 384, lead 386, node 387, and lead 394. Node 395 is commonly connected to the second inputs of logical AND gates 391 and 392 respectively.

The output of AND gate 391 is connected via lead 396 to one input of NOR gate 397 while a second input to NOR gate 397 is connected directly to the output of AND gate 392 via lead 398. The third input to NOR gate 397 is taken from a source of the signal RPM7, as hereinafter described, via lead 399 and the output of NOR gate 397 is connected via lead 401 to a count enable input of the first stage 402 of a dual four stage counter having a second stage 403. The count input of the first counter stage 402 is connected via lead 400 to node 382 and the reset input of the first counter stage 402 and the second counter stage 403 is taken directly from the reset node 404 which is connected via lead 405, node 406 and lead 407 to the IRES reset node 371. The first four stages of the first counter stage 402 contain the four least significant bits (LSB) of the multi-bit count or eight bit binary word indicative of the engine speed. The four least significant bits outputted by the first counter stage 402 are designated RPM0, RPM1, RPM2 and RPM3 which are outputted via leads 410, 411, 412 and 413 respectively. The most significant bits (MSB) of the 8 bit RPM indicative word are outputted from the second stage counter 403 and designated RPM4, RPM5, RPM6, and RPM7 via leads 414, 415, 416, and 417 respectively. Each of the output leads 414, 415, 416 and 417 are connected directly to the inputs of a NAND gate 418 whose output is connected back to the count enable input of the second stage counter 403 via lead 419 so as to prevent counter overflow as conventionally known.

The RPM3 output lead 413 is also connected to an input node 421 which is connected via lead 422 to one input of NAND gate 423. The other input of the NAND gate 423 is connected to rate limiting circuitry via lead 424, as hereinafter described, while the output of NAND gate 423 is connected via lead 425 to the count input of the second stage counter 403 for coupling the two counter stages 402, 403 together to generate a single 8 bit binary count or word indicative of engine speed. For future reference purposes, the four least significant bits of the 8 bit binary word representing engine speed which correspond to the outputs RPM0, RPM1, RPM2 and RPM3 of the first stage of the counter 402 will be referred to as "$\Delta S$" while the four most significant bits of the 8 bit binary word indicative of engine speed which represent the outputs of the second stage counter 403 and are indicated as RPM4, RPM5, RPM6 and RPM7 will be designated as "$S_i$".

Figure 6:
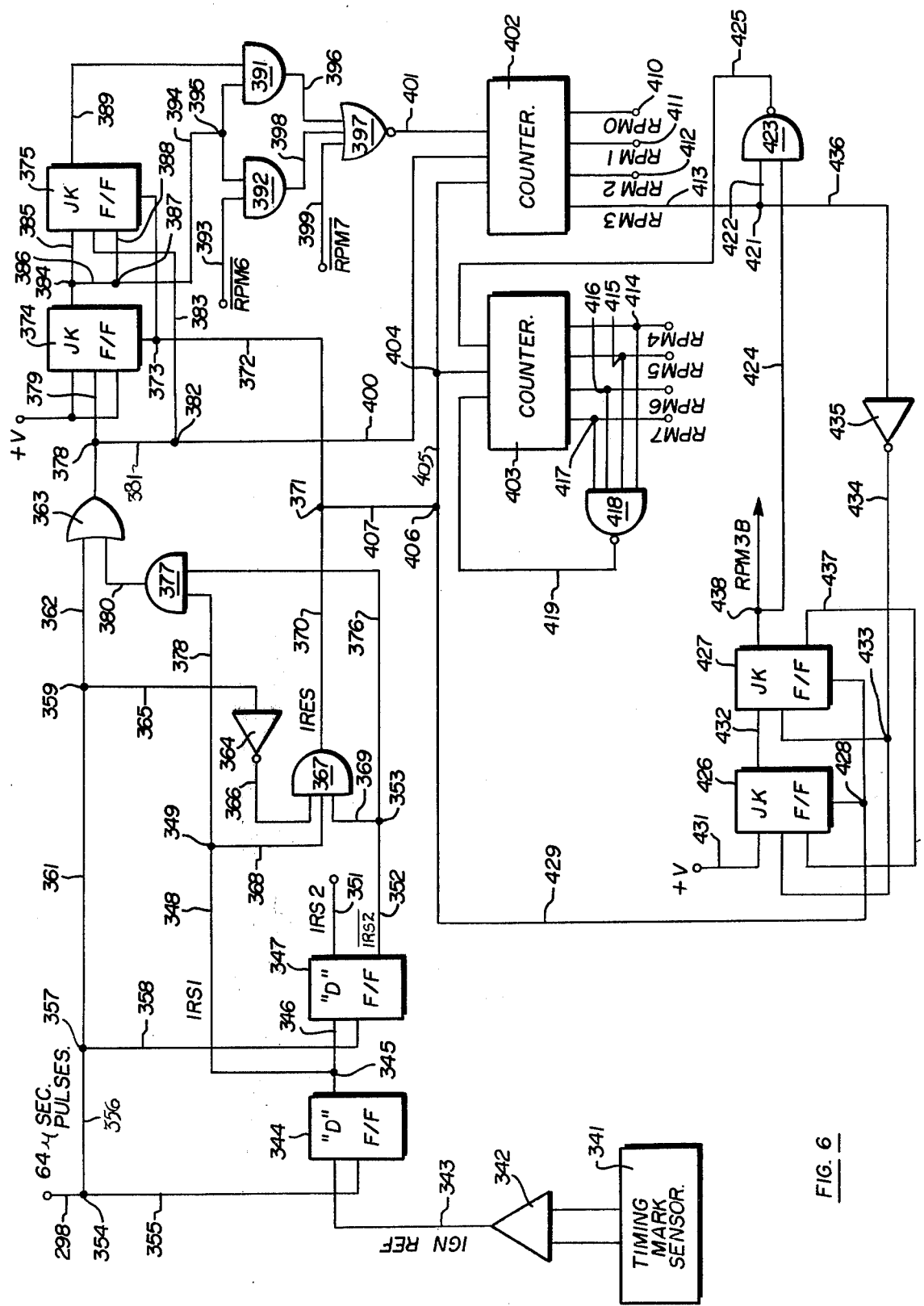
FIG. 6 is a schematic diagram of the circuitry for sensing the timing marks located on a rotating member of the engine, generating ignition reference pulses in response thereto, generating a first number or multi-bit binary word indicative of engine speed, and count rate control means for providing a wide range of measurement flexibility using a fixed length word format.

The rate limiting circuitry of FIG. 6 includes first and second JK-type flip-flops 426 and 427 respectively. The clear input of both of the flip-flops 426 and 427 are directly coupled to node 428 which in turn is connected via lead 429 to the IRES reset node 371 via node 406 and lead 407, as previously described. The set input of the first flip-flop 426 is connected directly to a source of positive potential through lead 431 and the "Q" output of the first flip-flop 426 is connected via lead 432 to the set input of the second flip-flop 427. The clock inputs of flip-flops 426 and 427 are directly coupled to common clock input node 433 which is connected via lead 434 to the output of inverter 435 whose input is connected via lead 436 to node 421 at the RPM3 output of the first counter stage 402. The "Q" output of the second flip-flop 427 is connected via lead 437 to the reset input of the first flip-flop 426 and the "Q" output is taken from node 483 to supply the output signal RPM3B to gate 423 via lead 424 and to other circuit inputs.

In operation, the circuit of FIG. 6 operates substantially as indicated below. The ignition reference pulses IGN REF are obtained by sensing fixed timing marks which are located on a rotating member of the engine, such as on the shaft 24 of engine 21 of FIG. 1 via the timing mark sensor means of block 341. Engine speed information is obtained by measuring the time interval of 2/N of an engine revolution where N is the number of cylinders in the internal combustion engine 21. The two flip-flops 344, 347 are used to synchronize the asynchronous (relative to the fixed 64 microsecond pulses from the timing circuitry of FIGS. 3 and 5) ignition reference pulses IGN REF to the 64 microsecond clock pulses which are used to measure the time interval between predetermined ones of the fixed timing marks.

Outputs from the synchronization circuitry including flip-flops 344, 347 and the gating circuitry associated therewith include the primary reset pulse IRES which is the second 64 microsecond clock pulse occurring after the occurrence of an IGN REF pulse; IRTN which is generated by the circuitry of FIG. 5 and precedes the generation of IRES by 32 microseconds, and a counter signal output taken from output node 378 at the output of the logical OR gate 363 which is a series of 64 microsecond pulses with one pulse deleted, the deleted pulse corresponding to the IRES reset pulse.

The time interval between ignition reference pulses is measured with the dual stage counter comprising counter stages 402 and 403 respectively. The count rate is determined by the logic of the gating configuration comprising AND gates 391, 392 and NOR gate 397. Inputs to this gating configuration are a 128 microsecond square wave taken from the "Q" output node 384 of a first JK flip-flop 374, a 256 microsecond square wave taken from the "Q" output of the second JK flip-flop 375 and the two most significant outputs (inverted) of the second stage counter 403. The counter comprising stages 402, 403 counts at a 64 microsecond rate until the most significant output (RPM7) is set (logical 1) and then at a 128 microsecond rate until the next most significant output (RPM6) is set and finally at a 256 microsecond rate.

A rate limiting function is performed by flip-flops 426, 427 which serve to inhibit the count during the first two milliseconds in the 7000+ RPM range to increase the dynamic range of measurement of the system as hereinafter described. The "Q" output of the second flip-flop 427 is taken from output node 438 and represents the signal RPM3B. This node is connected via lead 424 to an input of NAND gate 423 and the signal RPM3B becomes true or high 2.048 milliseconds after an ignition reference signal IGN REF is received. This establishes approximately 7300 RPMs as the upper speed limit for an eight cylinder engine by virtue of the NAND gate 423 wherein the RPM3B signal is ANDed, with a clock signal RPM3 from the first counter stage 402 being used as the clock input for the four most significant stages of the RPM counter, the second counter stage 403.

The low end of RPM limiting is accomplished by NAND gate 418 whose output goes low to inhibit further counting whenever the counter reaches a predetermined maximum count. The four least significant bits and four most significant bits of the 8 bit binary word generated by the counter stages 402 and 403 are indicative of engine speed over a relatively wide dynamic range of approximately 500 RPMs to 7500 RPMs due to the rate limiting features of flip-flops 374, 375 and gates 391, 392, 397, as previously described. The rate limiting feature of FIG. 6 enables the wide dynamic range of engine speeds to be measured with a variable precision to allow a range of 500 RPMs to 7500 RPMs to be encoded as a fixed length eight bit binary word containing the necessary engine period data. The outputs of the counter stages 402, 403 are coupled to RPM buffer storage means as described hereinafter with respect to FIG. 7.

Figure 7:
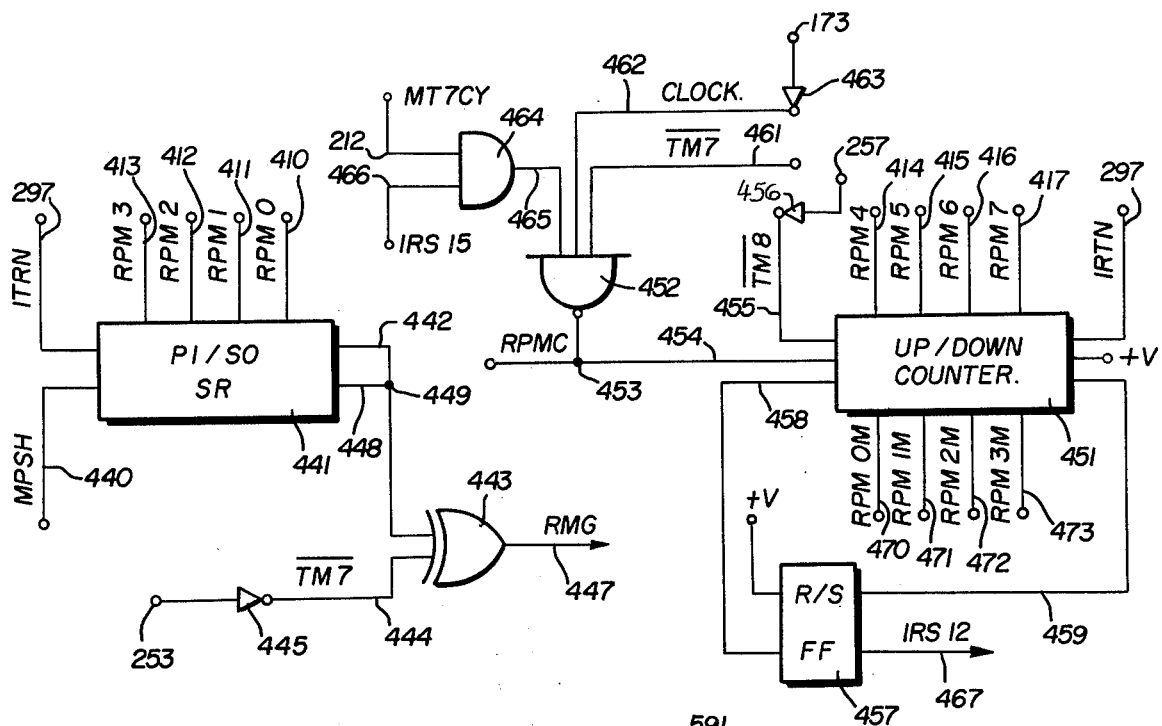
FIG. 7 represents the circuitry of the "RPM" buffer of block 48 of FIG. 2.

FIG. 7 is a schematic diagram of the RPM buffer circuitry of block 48 of FIG. 2 and is used to temporarily store the first eight bit binary number or word indicative of engine period or speed generated by the sensing and A/D conversion circuitry of FIG. 6. The four least significant bits of the binary word representing RPM, i.e., RPM0, RPM1, RPM2 and RPM3 are referred collectively as ΔS and are supplied to the four parallel inputs of a conventional parallel-in/serial-out shift register 441. The RPM0 input is taken from the output lead 410 of the first counter stage 402 of FIG. 6 while the RPM1 lead is taken from output 411, the RPM2 lead is taken from output 412, and the RPM3 lead is taken from output 413 of the first counter stage 402. The parallel-in/serial-out shift register 441 is, therefore, loaded in parallel from the corresponding four outputs of the first counter stage 402 when the signal IRTN is supplied to its low input via lead 297 of FIG. 5. A signal IRTN occurs 32 microseconds prior to the dual four stage counter 402, 403 of FIG. 6 being reset by the IRES signal to start a new count cycle.

The contents of the parallel-in/serial-out shift register 441 are shifted out via lead 442 in time with the clock pulses MPSH received at the clock input via lead 440 which occur after the parallel load. The least significant bits ΔS representing RPM0, RPM1, RPM2 and RPM3 of the first 8 bit binary word representing engine speed are supplied in a serial manner via lead 442 to a first input of exclusive OR gate 443 whose other input is coupled via lead 444 to the output of an inverter 445 whose input is connected directly to node 253 of FIG. 3 so that the exclusive OR gate 443 receives the four serial least significant bit pulses ΔS and the timing interval signal TM7 and outputs the signal RMG on lead 447 for use as hereinafter described. The feedback lead 448 which is connected to lead 442 at node 449 connects the output 442 of the parallel-in/serial-out shift register 441 back to a serial input thereof via lead 448 so that the data ΔS stored within the shift register 441 is recirculated within the shift register during the computation cycle for use as it is needed.

The function of the exclusive OR gate 443 is to invert the data outputted from the parallel-in/serial-out shift register 441 to generate ΔS when the timing signal TM7 is a logical 0 to output the signal RMG which represents the RPM multiply gate signal used for the interpolation calculations as hereinafter described.

A second major portion of the RPM buffer circuitry of block 48 of FIG. 2 includes a conventional up/down counter 451 having four stages. The parallel inputs to the four stages are provided via leads 414, 415, 416 and 417 which are connected directly to the corresponding outputs of the second stage counter 403 of FIG. 6 for receiving the most significant bits RPM4, RPM5, RPM6 and RPM7 respectively, which are collectively designated as $S_i$ representing the most significant four bits of the first 8 bit multi-digit number indicative of RPM. The most significant bits are loaded in parallel from the counter stage 403 to the up/down counter 451 upon receipt of the IRTN shift pulse which is fed to the counter 451 via lead 297 of FIG. 5 approximately 32 microseconds prior to the counter stage 403 being reset by the generation of the signal IRES to start a new count cycle as previously described.

The up/down counter 451 functions as a memory address register for accessing a first dimension of the first memory section 74 and a first dimension of the second memory section 75 of the memory means 73 of FIG. 2. A clock signal RPMC, which is generated as hereinafter described, is supplied from the output of a NAND gate 452 to RPMC node 453 and the RPMC signal is then supplied via lead 454 to the clock input of the up/down counter 451 to advance the count stored therein to change the memory address in order to obtain the next adjacent stored value for interpolation purposes as hereinafter described. The timing interval signal TM8 is supplied via lead 455 from the output of an inverter 456 whose input is connected directly to output node 257 of FIG. 3. The signal TM8 controls the count direction so that the up/down counter 451 counts up to the next adjacent memory location and then back down for the start of the second interpolation along the RPM axis or dimension.

R/S flip-flop 457 prevents the up/down counter 451 from counting whenever it has attained a maximum count. When a maximum count is attained, a signal indicative thereof is supplied via lead 458 to the reset input of the flip-flop 457 so that a disable signal is supplied via lead 459 to the count enable input of the up/down counter 451 to prevent its further counting. The signal IRS12 is outputted from the "Q" output of the RS flip-flop 457 via lead 467 for use as hereinafter described.

The signal used to clock the up/down counter 451, RPMC, is generated as follows. NAND gate 452 has a first input connected via lead 461 to the output of the inverter 445 which generates the signal TM7; a second input connected via lead 462 to the output of an inverter 463 whose input is connected directly to the output lead 173 of NAND gate 169 of FIG. 3 so that the signal CLOCK is fed to the second input of NAND 452; and the third and final input of NAND gate 452 is connected directly to the output of a logical AND gate 464 via lead 465. One input of AND gate 464 is connected to the source of the signal MT7CY at the output of NAND gate 209 of FIG. 3 via lead 212 while the other input to AND gate 464 is connected to the source of the signal IRS15 via lead 466.

The parallel outputs of the four stages of the up/down counter 451 are taken from leads 470, 471, 472 and 473 to output the up or down-counted most significant bits $S_i$ or $S_1 + 1$ as the memory address signals RPM0M, RPM1M, RPM2M, and RPM3M, respectively, for use in addressing the memory means 73 of FIG. 2 as hereinafter described.

The second dimension of the first memory stage 74 of FIG. 1 is addressed by the most significant bits $T_i$ of the second eight bit multi-digit number or word representing throttle position and the second dimension of the second memory stage 75 of FIG. 2 is addressed by the most significant bits $T_i$ of the third eight bit multi-digit number or word indicative of the measured MAP as hereinafter described.

Figure 8:
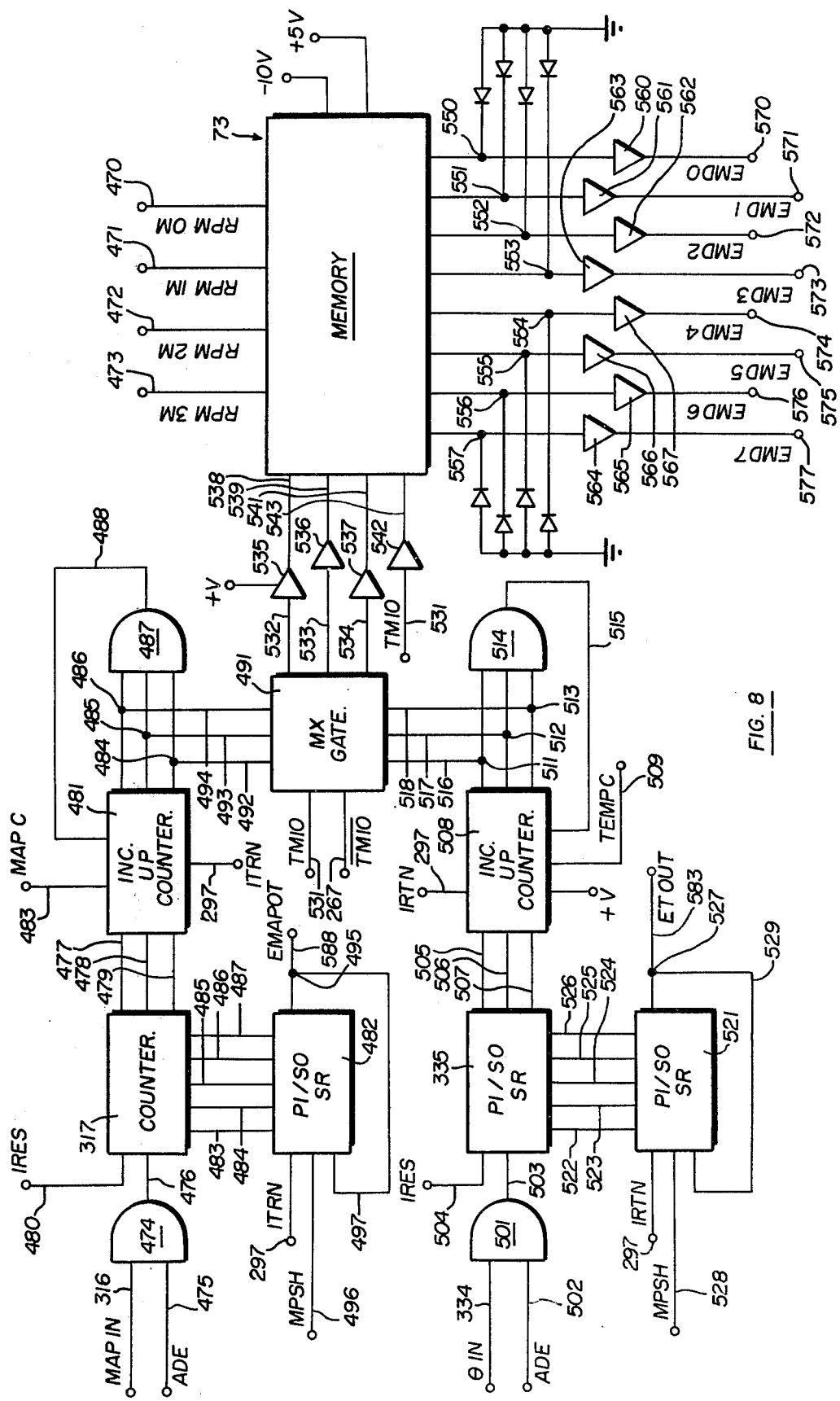
FIG. 8 illustrates the circuitry for implementing a portion of the A/D conversion implemented by counter blocks 317 and 335 of FIG. 4 together with the buffer circuitry of blocks 56 and 62 the memory address control circuitry of block 54 and the memory means of block 73 of FIG. 2.

As shown in FIG. 8, the signal MAP IN which is supplied via lead 316 from the output of comparator 310 of FIG. 5 is supplied to a first input of a logical AND gate 474 whose second input is connected via lead 475 to a source of the signal ADE which is a logically gated signal generated by ANDing the signal CLOCK from lead 462 of FIG. 7 with the signal RESET used to reset the ramp generator 311 of FIG. 4 every eight cycles. The output of AND gate 474 is connected via lead 476 to the clock input of an eight stage binary counter 317 for generating the third eight bit binary number or word indicative of the measured actual value of MAP. The signals occurring on lead 476 and fed into the counter 317 will represent eight bursts of gated clock pulses indicative of eight different measured values of MAP so that the value recorded in the counter 317 represents an average of eight readings for greater accuracy and reliability.

The three most significant bits of the value stored in counter 317 are designated generally as $P_i$ and are outputted in parallel via leads 477, 478 and 479 to the parallel inputs of a conventional binary up counter 481 while the five least significant bits of the values stored in counter 317 and which are generally designated as $\Delta P$ are outputted in parallel to the corresponding five parallel input stages of a parallel-in/serial-out shift register 482 via leads 483, 484, 485, 486 and 487. The parallel transfer of the most significant bits $P_i$ from the counter 317 to the up counter 481 and the parallel transfer of the least significant bits $\Delta P$ from counter 317 to the parallel-in/serial-out shift register 462 are initiated by the generation of the data transfer signal IRTN which is supplied to the counter 481 and to one input of the shift register 482 via lead 297 of the circuit of FIG. 5.

The incremental up counter 481 serves as part of the memory address register of block 54 of FIG. 2 to provide the address for addressing or accessing the second memory dimension of the second memory stage or ROM 75 as hereinafter described. The memory address count representing $P_i$ which is stored in the Counter 481 may be incremented by the signal MAPC which is supplied thereto via lead 483. This changes the memory address used to obtain the next data point needed for the interpolation process by incrementing the value stored in the counter 481. The parallel outputs of the up counter 481 are taken via output nodes 484, 485 and 486. These output nodes are connected directly to the three inputs of a logical AND gate 487 whose output is connected via lead 488 back to the count inhibit input of the counter 481 to prevent further counting once the maximum count has been attained. The output nodes 484, 485 and 486 of the Counter 481 are also connected directly to one set of inputs of a conventional multiplexer gate 491 via leads 492, 493 and 494 respectively.

The parallel-in/serial-out shift register 482 is loaded with the least significant bits $\Delta P$ upon generation of the transfer pulse IRTN via lead 297 and the parallely loaded contents are serially transferred out of the shift register 482 from output node 495 as the signal EMAPOT in time with the clock pulse MPSH supplied to the clock input of the shift register 482 via lead 496. The contents of the shift register 482, the signal EMAPOT, is recirculated from the output node 495 to the serial input via lead 497 for recirculating the data stored therein until it is required for the interpolation calculations along the manifold axis of ROM 75.

The second memory dimension of the first memory section, ROM 74 of FIG. 2, is addressed by the most significant bits $T_i$ of the second 8 bit binary number indicative of the throttle position. The signal $\theta$ IN is taken from the output of the comparator 333 of FIG. 4 and supplied via lead 334 to one input of the logical AND gate 501 whose other input is supplied with the signal ADE via lead 502. The signal ADE, as previously described, is the ANDed signal CLOCK with the signal used to reset the ramp generator 311 of FIG. 4 so as to allow the eight stage binary counter 335 to receive its count input via lead 503 from the output of logical AND gate 501 as a series of eight bursts of pulses indicative of throttle position for accumulating a count indicative of an average of eight actual readings of throttle position made by the circuitry of block 31 of FIG. 4 as previously described. The counter 335 is reset at the beginning of each count cycle by the signal IRES supplied thereto via lead 504.

The three most significant bits of the count stored in the counter 335 are designated generally as $P_i$ and are outputted in parallel via leads 505, 506, and 507 to the parallel inputs of a second binary up counter 508 and the parallel transfer is initiated upon the generation of the transfer signal IRTN supplied to the counter 508 via lead 297 as previously described. The value $T_i$ stored in the up counter 508 is used to address the second dimension of the first memory section or ROM 74 and the value of the count stored in the counter 508 may be incremented or increased by the signal TEMPC supplied via lead 509 thereto. The incremented count may then be used to address the next successive data address of the second dimension of the memory section 74 as required in the interpolation process.

The parallel outputs of the up counter 508 are taken from nodes 511, 512 and 513. Nodes 511, 512, and 513 are connected directly to the inputs of a logical AND gate 514 whose output is connected back to the count enable input of the binary counter 508 via lead 515 so as to disable the counter from further counting whenever it has reached its maximum count to prevent data overflow, as conventionally known. The parallel outputs from the counter 508 are also supplied via output nodes 511, 512 and 513 to the second set of inputs of the multiplexer gate 491 via leads 516, 517 and 518 respectively for transferring the contents of the counter 408, which represents a portion of the memory address register of block 54 of FIG. 2 to the multiplexer gate 491, which also forms a portion of the memory address control circuitry of block 54, for addressing a preselected second memory dimension of either the first memory section 74 or the second memory section 75 as hereinafter explained.

The five least significant bits of the second eight bit binary number stored in the register 335 which is indicative of the throttle position and which are designated generally by the symbol $\Delta T$ are transferred in parallel from the outputs of the counter 335 to the corresponding five inputs of a parallel-in/serial-out shift register 521 via leads 522, 523, 524, 525, and 526 respectively. The parallel transfer is initiated upon generation of the transfer signal IRTN supplied to the shift register 521 via lead 297 as previously described. The serial output of the parallel-in/serial-out shift register 521 is the pulse train or signal ETOUT outputted via output node 527. The five least significant bits stored in the shift register 521 are outputted in a serial manner via node 527 in synchronization with the clock pulses MPSH supplied to the clock input of the shift register 521 via lead 528. The least significant bit pulses ETOUT are recirculated from the output node 527 back to a serial input of the shift register 521 via recirculation lead 529 to keep the individual pulses available as they are needed in the interpolation process along the throttle position axis.

As previously described, the multiplexer gate 491 is capable of receiving the most significant bits $T_i$ for addressing the second dimension of the first memory Section 74 or the most significant bits $P_1$ for addressing the second memory dimension of the second memory section 75, as desired. Which of the addresses $T_i$ or $P_i$ is selected is determined by the stage of the interpolation cycle as determined by the timing interval signal TM10 which is supplied to the multiplexer gate 491 via lead 531 from the second stage output of the divide-by-two counter 251, i.e., lead 265, of FIG. 3 or via the signal TM10 which is supplied to the multiplexer gate 491 via output lead 267 of FIG. 3.

If the signal TM10 is low, corresponding to the signal TM10 being high or a logical one, then the multiplexer gate 491 selects the most significant bits of the second multi-bit word indicative of throttle position, $T_i$ and outputs these signals via leads 532, 533 and 534 to the inputs of amplifiers 535, 536, and 537 respectively whose outputs are connected via leads 538, 539 and 541 respectively to address the second dimension of the first memory section, ROM 74 of memory means 73. Since the signal TM10 is also supplied via lead 531 to the input of an amplifier 542 whose output is connected via lead 543 to an input to the memory means 73 for selecting the first memory section 74 instead of the second memory section 75 as conventionally known.

Whenever the signal TM10 goes high, indicating that the new interpolation cycle has begun, the multiplexer gate 491 will supply the most significant bits of the third multi-bit word indicative of the actual measured value of MAP to the second memory dimension of the second memory section, ROM 75 of memory means 73 since the signal TM10 supplied to the memory means 73 via lead 531, amplifier 542 and lead 543 will now select ROM 75.

The memory means 73 may be a conventional read only memory such as an INTEL1702A capable of storing the previously described 8 bit binary numbers or EGR values indicative of desired EGR valve positions for predetermined values of engine speed and throttle position. In the described embodiment, the first memory section 74 has 16 by 8 or 128 memory locations for storing the desired EGR values as a function of engine speed and throttle position while the second ROM section 75 contains 16 by 8 or 128 memory locations each storing an 8 bit EGR value indicative of a desired valve position for given values of engine speed and MAP, as previously described.

The first dimension of either one of the memory sections 74 or 75 are addressed by the values RPM0M, RPM1M, RPM2M and RPM3M via leads 470, 471, 472 and 473 respectively from the up/down counter 451 of FIG. 7. The eight bit word or stored EGR value addressed along the first memory dimension by the values RPM0M, RPM1M, RPM2M, and RPM3M and along the second memory dimension of either the first memory section 74 by the three most significant bits $T_i$ indicative of throttle position or the second memory dimension of the second memory section 75 by the three most significant bits $P_i$ indicative of MAP are outputted via memory output nodes 550, 551, 552, 553, 554, 555, 556, and 557 respectively. Each of the output nodes 550-557 are connected to the cathode of a corresponding diode and each of the anodes of the diodes are commonly coupled to ground to clamp the outputs from becoming too negative. Each of the output nodes 550-557 are coupled to the inputs of amplifiers 560-567 respectively whose outputs are taken via leads 570-577 respectively to supply the signals or bits EMD0, EMD1, EMD2, EMD3, EMD4, EMD5, EMD6, and EMD7 respectively, which represent the 8 bits of the multi-bit word representing the addressed or accessed desired EGR value and this value is used for computation and control purposes as hereinafter described.

Figure 9:
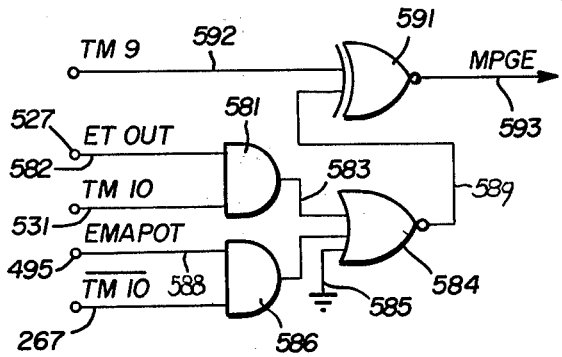
FIG. 9 illustrates a logic circuit for selecting which of the first and second memory portions are addressed during a particular computation cycle and for performing the inversion or complement function required in the interpolation implementation.

The logic circuit of FIG. 9 is used to determine whether the least significant bits $\Delta T$ or $\Delta P$ are selected for a given computation cycle and to generate the inverse or one's compliment thereof required for the interpolation computation. A logical AND gate 581 has one input connected to the output node 527 of the parallel-in/serial-out shift register 521 of FIG. 8 for receiving the signal ETOUT representing the five least significant bits $\Delta T$ of the second eight bit word indicative of throttle position and supplying the signal ETOUT via lead 582 to a first input of the logical AND gate 581. The second input of the logical AND gate 581 is connected to the source of timing interval signals TM10 via lead 531 so that AND gate 581 will output a true signal via lead 583 whenever we are in the second interpolation interval as indicated by the timing diagram of FIG. 16 and the sequence of pulses indicative of ΔT and represented by the signal ETOUT is outputted from shift register 521.

Lead 583 is connected to one input of a NOR gate 584 which has another input connected directly to ground via lead 585 and a third and final input connected to the output of logical AND gate 586 via lead 587. AND gate 586 has one input connected to node 495 at the output of the parallel-in/serial-out shift register 482 of FIG. 8 for receiving the five least significant bits P of the third multi-bit word indicative of the actual measured value of MAP and the signal EMAPOT is supplied via output node 595 to a first input of AND gate 586 via lead 588. The second input of AND gate 586 is connected to the source of the timing interval signal TM10 via lead 267 of FIG. 3 so that it outputs a signal indicative of the least significant bits ΔP, the signal EMAPOT, whenever the signal TM10 is high indicating that we are in the first timing interval and the signal EMAPOT is being generated.

The output of the logical NOR gate 584 carries a signal indicative of whether the least significant bit values ΔT of throttle position or the least significant values ΔP of MAP are supplied via lead 589 back to a first input of an exclusive OR gate 591 whose opposite input is connected via lead 592 to the first output stage of the counter 251, lead 262, of FIG. 3 for receiving the timing interval signal TM9 therefrom. The output of the exclusive OR gate 591 is the signal MPGE which is taken from lead 593 and which performs the one's compliment function on the selected value of ΔT or ΔP for use in the interpolation computations hereinafter described.

Figure 10:
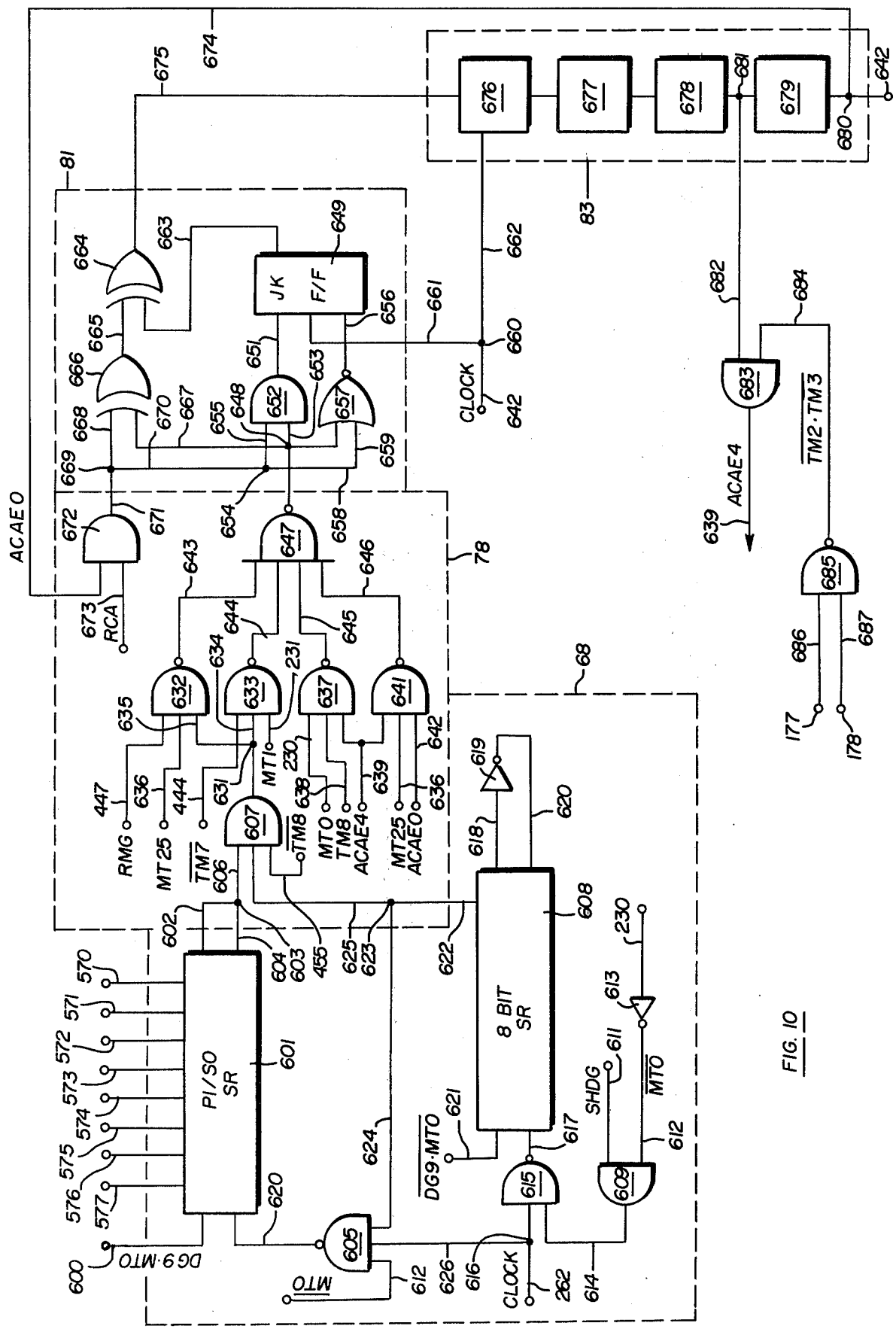
FIG. 10 is a schematic diagram of the output scaling of block 68, the gating logic of block 78, the add circuitry of block 81, and the "A" register of block 83 of FIG. 2.

FIG. 10 is a schematic diagram illustrating the circuitry of the output scaling block 68, the gating logic network 78, the add block 81 and the "A" register 83 of FIG. 2. The eight stage parallel-in/serial-out shift register 601 of block 68 of FIG. 2 is the memory output register and it is parallel loaded from the output of the read only memory means 73 of FIG. 8 with the eight bits of the stored EGR value, EMD0, EMD1, EMD2, EMD3, EMD4, EMD5, EMD6 and EMD7 via output leads 570-577 respectively. The transfer of the accessed EGR value from the memory means 73 to the parallel-in/serial-out shift register 601 is triggered by the ANDed combination of the digit gate signal DG9 with the first word interval signal MT0 via lead 600 so that the memory has had time to settle and the EGR control system is just beginning a new measurement cycle.

The serial output of the shift register 601 is taken from lead 602 and supplied to serial output node 603. Serial output node 603 is connected back to a serial input of the shift register 601 via recirculation lead 604 for recirculating the contents of the shift register 601 at the clock rate established by the output of NAND gate 605 until the stored contents are needed for the various computations. The clock output of NAND gate 605 controls the rate of serial transfer out of the register 601 and therefore, the output scaling as hereinafter described. The recirculation configuration of leads 602, node 603 and lead 604 forms a conventional end around shift register configuration. The serial output of the shift register 601 is also supplied via node 603 and lead 606 to a first input of logical AND gate 607.

The timing of the serial output of the shift register 601 is determined by the output of NAND gate 605 which in turn is controlled by the operation of the eight bit shift register 608 and the output of the logical AND gate 609 as hereinafter described. By controlling the rate at which the shift register 601 outputs the values stored therein, scaling of the data is accomplished as it is added into the "A" register 83 and the gating of the scaled data as it is added into the register 83 is controlled by operation of the gating logic network of block 78.

A first input of logical AND gate 609 is the signal SHDG supplied thereto via lead 611 and the second input receives the signal MT0 via lead 612 which is connected to an output of an inverter 613 whose input is connected directly to the output lead 230 from the word register 223 of the timing circuitry of FIG. 3. The output of AND gate 609 operates to delete clock pulses each time it is desirable to scale a memory output data by a factor of two and this output is connected via lead 614 to one input of NAND gate 615 whose opposite input is taken from clock input node 616. Clock input node 616 is connected to the source of the signal CLOCK via lead 262 of FIG. 7 and is directly connected to the second input of NAND gate 615. The output of NAND gate 615 is connected via lead 617 to the clock input of the eight bit shift register 608.

The output of the last stage of the shift register 608 is connected via lead 618 to the input of an inverter 619 and the output of inverter 619 is connected back to a serial input via lead 620. The operation of the shift register 608 is initiated by the generation of the gated signal DG9.MT0 supplied to the enable input via lead 621. The output of the eight bit shift register 608 is supplied via lead 622 to output node 623 and output node 623 is connected via lead 624 to a first input of NAND gate 605 and via lead 625 to a second input of logical AND gate 607. Node 623 supplies a movable or shiftable eight bit window to one input of NAND gate 605 and to one input of the AND gate 607 and the eight bit window may be shifted in increments of two as determined by the output of the AND gate 609 for scaling purposes.

By varying the value of SHDG present on lead 611 of AND gate 609, which represents a shift digit gate signal, we are able to slide the eight window present at output node 623 of the shift register 608 across the various digit gate times outputted by the BCD decoders 179, 184 of FIG. 3 as desired for scaling purposes. The second input of NAND gate 605 is taken from the clock input node 616 via lead 626 and the third input to NAND gate 605 is the signal MT0 taken from lead 612 as previously described. The output of NAND gate 605 represents a burst of eight bits shifted as determined by the output of gate 609 and shift register 608 and supplied to the clock input of the parallel-in/serial-out shift register 601 via lead 620 to step the stored contents out of the register 601 via node 603 and into the first input of AND gate 607.

As previously described, the first input of logical AND gate 607 of the gating logic network 78 of FIG. 2 is taken from the output node 603 of the parallel-in/serial-out shift register 601 via lead 606; the second input is taken from the output of the eight bit shift register 608 via output node 623 and lead 625 to supply the eight bit sequence of shiftable pulses thereto; and the third input of AND gate 607 is connected to the source of the signal TM8 via lead 455 of FIG. 7. The output of AND gate 607 is taken from output node 631 and output node 631 is connected to one input of a first NAND gate 633 via lead 634 and to one input of a second NAND gate 632 via lead 635. A second input of NAND gate 632 is connected via lead 447 to the output of the exclusive OR gate 443 of FIG. 7 which outputs the RPM multiply gate signal RMG and the final input to NAND gate 632 is supplied via lead 636 to the source of the signal MT25. A second input of NAND gate 633 is connected via lead 231 to the MT1 output of the word counter 223 of FIG. 3 while the final input of NAND gate 633 is connected via lead 444 of FIG. 7 to the source of the signal TM7.

The first input of a third NAND gate 637 in the gating logic network of block 78 is taken via lead 230 from the MT0 output of word counter 223 of FIG. 3, the second input is taken from output node 257 of the circuit of FIG. 3 via lead 638 to supply the timing interval signal TM8 thereto; and the third and final input to NAND gate 337 is taken via lead 639 from the source of the signal ACAE4 as hereinafter described. The fourth and final NAND gate 641 of the logical gating network 78 of FIG. 2 has one input coupled to the source of the signal ACAE4 via lead 639; a second input coupled to the signal MT25 via lead 636 as previously described, and a third input connected to the output of the "A" shift register 83 via lead 642 to supply the recirculation signal ACAE0 thereto. The outputs of the first, second, third, and fourth NAND gates 632, 633, 637 and 641 of the gating logic network of block 78 are connected via leads 643–646 respectively to the four inputs of a NAND gate 647 whose output is taken from the output node 648 of the gating logic network of block 78 which represents the one input to the add circuitry of block 81 of FIG. 2.

The adding circuitry of block 81 includes a JK flip-flop 649 having its "J" input connected via lead 651 to the output of a logical AND gate 652 which has one input connected to the node 648 via lead 653 and its second input connected to a node 654 via lead 655. The "K" input to flip-flop 649 is connected via lead 656 to the output of a NOR gate 657 having one input connected via lead 658 to node 648 and its other input connected via lead 659 to the node 654. The clock input of flip-flop 649 is connected to the clock input node 660 via lead 661 and the clock input node 660 is connected to the source of clock signal CLOCK via lead 642 of FIG. 7. Clock node 660 is also connected via lead 662 to the clock input of the first stage 676 of the four stage binary shift register or "A" shift register 83 of FIG. 2.

The "Q" output of flip-flop 649 is connected via lead 663 to one input of an exclusive OR gate 664 whose other input is connected via lead 665 to the output of a second exclusive OR gate 666. Exclusive OR gate 666 has its first input connected via lead 667 to node 648 and its second input connected via lead 668 to an input node 669. Node 669 is connected via lead 670 to the node 654 and via lead 671 to the output of a logical AND gate 672. One input of logical AND gate 672 receives the recirculate "A" register command RCA via lead 673 and the signal ACAE0 via lead 674.

The output of the add circuitry of block 81 is supplied from the output of the exclusive OR gate 664 via lead 675 to the counter input of the first stage 676 of the "A" shift register 83. The "A" shift register 83 has four stages 676, 677, 678 and 679 configured such that the input of the first stage 676 is connected to the output of the add circuitry of block 81 via lead 675 and its output is connected to the input of the second stage 677 whose output is connected to the input of the third stage 678 whose output is connected to the input of the fourth and final stage 679 whose output is taken from node 680 and supplied via lead 642 to the one input of the fourth NAND gate 641 of the gating logic network of block 78 and via lead 674 to one input of the AND gate 672 to supply the signal ACAE0 thereto which represents the output or contents of the "A" register 83.

The output of the third stage 678 and the input of the fourth stage 679 is represented by node 681 which is connected via lead 682 to one input of a logical AND gate 683 whose other input is connected via lead 684 to the output of a NAND gate 685 which outputs the signal TM2.TM3. The first input of NAND gate 685 is taken via lead 686 from output node 177 of counter 174 of FIG. 3 while the other input of NAND gate 685 is connected via lead 686 to counter output node 178 of counter 174. The output of the logical AND gate 683 is the signal ACAE4 which is supplied via lead 639 as inputs to the third and fourth NAND gates 647, 641 of the logical gating network 78 of FIG. 2 as previously described.

The operation of the circuitry of FIGS. 10, 11 and 12 will be briefly described with reference to the computational sequences outlined in FIG. 17 hereinafter explained.

The rate control logic of block 147, gating logic network of block 95, add circuitry of block 97 and the four stage "B" shift register or accumulator 99 of FIG. 2 will now be described with reference to FIG. 11. The gating logic network of block 95 includes a logical AND gate 691 having a first input connected to output node 257 of flip-flop 246 of FIG. 3 for receiving the time interval signal TM8 via lead 692 and a second input for receiving the output of the "A" register 83, ACAE0 from lead 642 of FIG. 10. The output of AND gate 691 is taken directly from Node 693 and connected directly to one input of a first NAND gate 696 via lead 694 and to the first input of a second NAND gate 697 via lead 695. The second input to the first NAND gate 696 is taken directly from the MT1 output lead 231 of the word counter 223 of FIG. 3 and the third input of NAND gate 696 is connected to the first stage output of the counter 251 of FIG. 3 via lead 262 for receiving the time interval signal TM9.

The second input of NAND gate 697 is connected to the source of the signal MT26 via lead 701 while the third input is connected to the output of the circuit of FIG. 9 for receiving the signal MPGE via lead 593. The first input of the third NAND gate 698 is connected to the output of the "C" register 115 of FIG. 2 for receiving the output ACCE0 therefrom via node 116, lead 117, node 118 and lead 120 of FIG. 2. The second input of NAND gate 698 is connected directly to the MT1 word output lead 231 of the word counter 223 of FIG. 3 and the third input is connected via lead 703 to a node 704. Node 704 is connected via lead 705 to input node 706 which is connected to the source of the signal TM11A. Node 704 is also connected via lead 707 to the first input of the fourth NAND gate 699 whose second input is connected to the output of the "B" shift register 99 via lead 106 node 107 and lead 108 for receiving the contents, ACBE0 thereof. The third and final input of the fourth NAND gate 699 is connected to the MT0 output of the word counter 223 of FIG. 3 via lead 230.

The outputs of the first, second and third NAND gates 296-299 respectively, are connected via leads 708-711 respectively to the inputs of a fifth NAND gate 712 whose output is taken from node 713 which represents the output of the logical gating network of block 95 of FIG. 2 and one input of the add circuitry of block 97. Output node 713 is connected via lead 714 to one input of an exclusive OR gate 715 whose second input is connected via lead 716 to an input node 717. Node 717 is also connected via lead 718 to a first input of a second exclusive OR gate 719 whose second input is connected via lead 721 to the source of the signal BSUB which turns the adding circuitry of FIG. 97 into a subtractor for certain interpolation computations. The output of the exclusive OR gate 719 is connected via lead 722 to node 723, and node 723 is connected via lead 724 to a first input of a logical AND gate 725. The second input of AND gate 725 is connected via lead 726 to input node 727. Node 727 is connected via lead 728 to the output node 713 of the gating logic circuit 95 and via lead 729 to the first input of a logical NOR gate 731 whose opposite input is connected via lead 732 to node 723.

The output of AND gate 725 is connected via lead 733 to the "J" or set input of a JK flip-flop 734 whose "K" or reset input is connected to the output of the NOR gate 731 via lead 735. Clock pulses to the clock input of JK flip-flop 734 are generated as follows. A first NAND gate 736 has its first input connected to the source of the timing signal TM11A via lead 737 and node 706 as previously described, and its second input connected directly to the MT3 word signal via lead 233 from the output of the word counter 232 of the timing circuit of FIG. 3. The output of NAND gate 736 is connected via lead 738 to one input of NAND gate 739 whose other input is connected to the source of the CLOCK signals via lead 462 as described with reference to FIG. 7. The output NAND gate 739 represents the clock signal BCYCL which is supplied via lead 741 to the clock input of JK flip-flop 734.

The high or "Q" output of JK flip-flop 734 is taken from output node 742 and outputs the signal BECY via lead 743 while the low or "Q" output is taken from node 744 and outputs the signal BECY via lead 745. The signal BECY is supplied via node 742 to one input of a third exclusive OR gate 746 via lead 747 and the other input of the exclusive OR gate 746 is taken from the output of the first exclusive OR gate 715 via lead 748. The output of the exclusive OR gate 746 is taken from lead 749 which represents the input to the first stage 750 of the "B" shift register of block 99. The output of the first shift register stage 750 is connected to the input of the second shift register stage 751 whose output is connected to the input of the third shift register stage 752 whose output is connected to the input of the fourth and last shift register stage 753 whose output is taken from the node 101 as previously described.

The JK flip-flop 734 has its clear input connected via lead 754 to the output of the logical AND gate 756 having its first input connected directly to the MT4 word output of word counter 223 of FIG. 3 via output lead 234 and its other input connected to the source of the timing signal TM11A via lead 757 and node 706 as previously described The output of the "B" shift register 99 is taken from node 101 and is represented by the serial sequence of pulses designated ACBE0 which is supplied via lead 758 to one input of a logical AND gate 759 whose second input is connected via lead 761 to the signal RCB which is generated when it is desired to recirculate the contents of the "B" shift register. The output of AND gate 759 is connected via lead 762 to node 717 to complete the recirculation loop to the add circuitry of block 97.

The rate control circuitry represented generally by block 147 will now be described. In essence, the rate control logic to be hereinafter described utilizes a digital filter technique to multiply a value stored in the "B" shift register 99 by preselected fractional constants so that the resulting fractional portion is then added to the contents of the "C" register 115 for updating the value stored therein to insure that the entire valve position correction is not made in a single adjustment but is averaged out over a series of adjustments to avoid engine roughness and the like. The rate control logic shifts the contents of the "B" register 99 by 0, 1, 2, 3, 4, 5, or 6 places to divide the incremental change stored therein by 1, 2, 4, 8, 16, 32 or 64 respectively, as hereinafter described.

The circuitry of block 147 is illustrated in the preferred embodiment of the present invention as including a plurality of manually selectible binary switches 763-768 each of which may be manually preset to a desired value for selecting the value of the shift or, in the alternative, the value of the fractional constant by which the value stored in the "B" register 99 is multiplied. It will, of course, be recognized, that for many operational purposes, the binary values represented by the switches 763-768 could be pre-programmed into a read only memory addressed by one or more engine operating parameters, as previously described herein or computed as a function of a single engine operating parameter by A/D converter means and conventional logic known in the art or the like.

Figure 11:
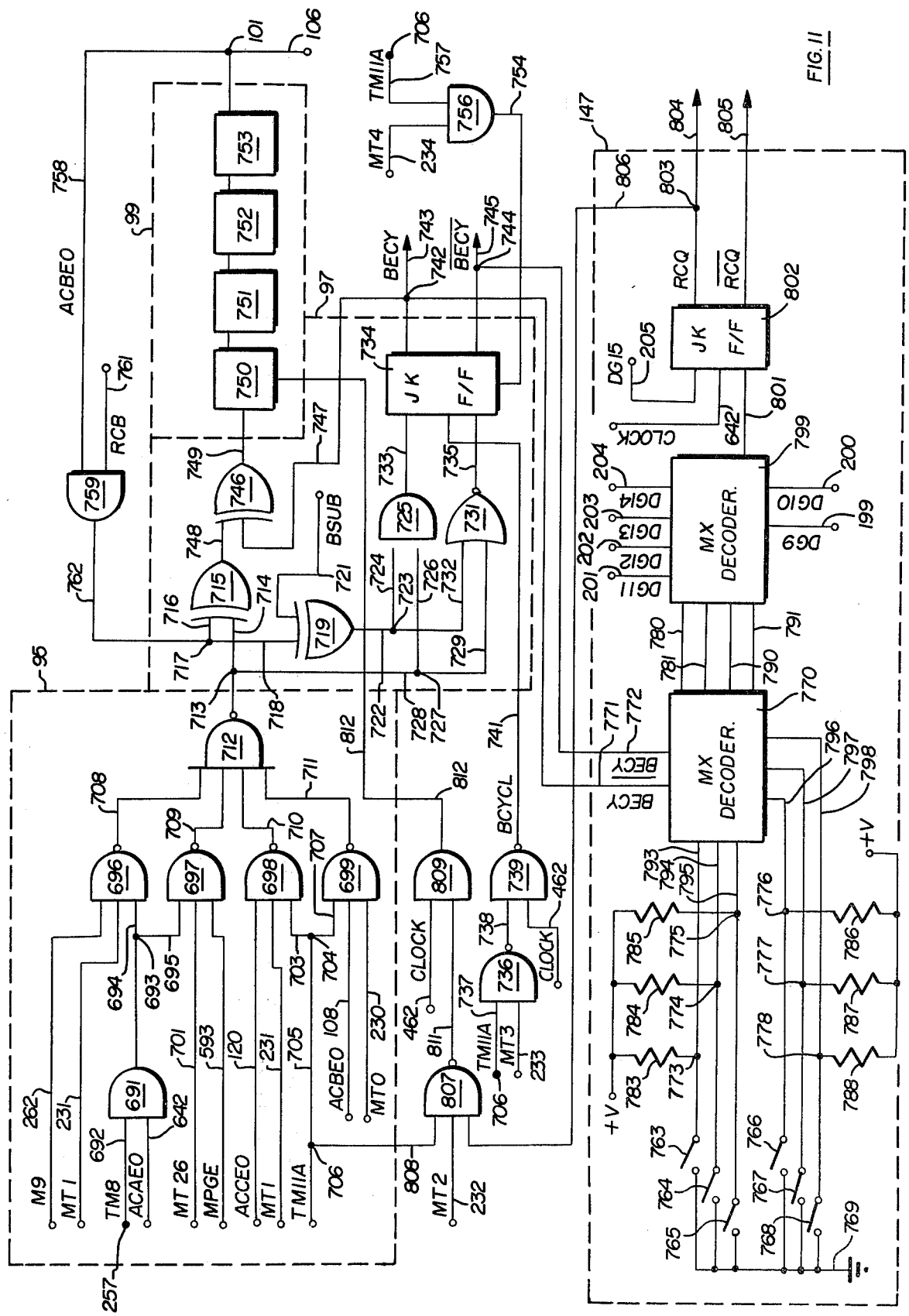
FIG. 11 is a schematic diagram illustrating the rate control circuitry of block 147, the gating logic of block 95, the add circuitry of block and the "B" register of block 99 of FIG. 2.

In the circuit of FIG. 11, one pole of each of the switches 763-768 is connected directly to ground via lead 769 and each has an opposite pole connected directly to corresponding nodes 773-778 respectively. Each of the nodes 773-778 respectively are connected through resistors 783-788 respectively to a source of positive potential and simultaneously through leads 793-798 to six inputs of a first conventional multiplex decoder 770. The multiplexer decoder 770 has a first input connected to the signal BECY via lead 771 whose opposite end is connected to node 742 for receiving a signal to determine that the fractional constant determined by the switch settings is to be added to the contents of the "C" register and the second input for receiving the signal BECY via lead 772 from node 744 for directing that the fractional constant be subtracted from the contents of the "C" register 115 as hereinafter described.

The outputs of the multiplex decoder 770 are supplied via leads 780, 781, 790, 791 to the four inputs of a second conventional multiplex decoder 799. The multiplex decoder 799 receives the digit gate signals DG9-DG14 directly from the output leads 199-204 respectively of the BCD decoder 184 of the timing circuit of FIG. 3. The output of the multiplex decoder 799 is connected via lead 801 to the "K" or reset input of a JK flip-flop 802 whose "J" or set input is connected directly to the DG15 output lead 205 of the decoder 184 of FIG. 3 while the clock input receives the CLOCK pulses via lead 642 as previously explained.

The high or "Q" output of JK flip-flop 802 is the signal RCQ which is outputted via node 803 and supplied elsewhere to the system via lead 804 while the low or "Q" output supplies the signal RCQ to the remainder of the circuitry via lead 805. The signal RCQ is also supplied from the node 803 to one input of a NAND gate 807 via lead 806. A second input to NAND gate 807 is connected directly to the MT2 lead 232 and from the output of the word counter 223 of FIG. 3 and the final input is connected via lead 808 to the source of the timing interval signal TM11A via node 706 as previously described. The output of NAND gate 807 is connected directly to one input of a logical AND gate 809 via lead 811 and the second input of AND gate 809 is connected to the source of the CLOCK pulses via lead 462 as previously described. The output of AND gate 809 is connected via lead 812 to the clock input of the first stage 750 of the "B" shift register 99 to control the clock rate or logical shifts therein for rate control purposes.

As previously described, the function of the rate control circuitry of block 147 is to insure that the entire positional correction of the EGR valve 35 is not made as a single adjustment but rather that the correction is spread out over a series of adjustments to avoid engine roughness and the like for improving drivability, etc. This is accomplished as hereinafter described by applying only a fractional portion of the positional error correction signal to the previously computed error correction signal so that only a portion of the positional correction is made at each positional adjustment.

The logic of block 147 accomplishes rate limiting of the EGR control signal by a low pass digital filter technique. The operation of the filter may be described by the linear first order difference equation $$x(KT) = ax(KT - T) + (1 - a)u(KT)$$

where "T" is the rate at which the computations are made, which in the preferred embodiment of the present invention is at the cylinder firing rate of the internal combustion engine 21 of FIG. 1; where "K" is a running index of integers; where $u(KT)$ is the input to the digital filter during the Kth T interval; where $x(KT - T)$ is the output of the digital filter during the (K-1)th T interval; and where "a" is a programmable constant.

The value of the programmable constant "a" may be determined by manually selecting the position of the binary switches 763–768 as previously described; by a pre-programmed look-up table of stored values under the closed loop control of any of several measured actual values of engine operating parameters such as MAP, engine speed, air flow, throttle position, coolant temperature, etc.; or by conversion of a single actually measured parameter to a binary number indicative of the required shifts by conventional digital logic techniques.

The filter time constant is determined by the input data rate and the value of the programmable constant "a". For example, let the input be a unit step function at K=0. Assume that the constant "a" equals ¼. Then, successive values of the filter output are ¼, ¼ + ¾ (¼), ¼(¾) + ¼(1-¾), .... In this case, the programmable constant "a" equals $2^{-n}$ where "n" is the integer 2. Different values of the programmable constant "a" are achieved by varying the value of the exponent "n" to achieve different fractional constants by which the filter input is multiplied as previously described. As previously indicated, the time-controlled, gated clock signals BECY and BECY inputs to the multiplex decoder 770 determine whether the filter output is added to or subtracted from the previous value stored in the "C" register 115.

The implementation of this function is performed in the "C" and "B" registers 115 and 99 respectively as hereinafter described. Briefly, we initially have the current EGR error value computed after two complete interpolation cycles stored in the "B" register 99 and the previously computed EGR error value used to determine the last positional correction stored in the "C" register 115. A timing signal TM11A is generated to indicate that the second interpolation cycle is complete, for example, by counting two positive TM9 outputs, as conventionally known, or the like, for generating the signal TM11A to indicate that the two interpolation computations have been made. This signal is generated after TM10 and lasts for eight word intervals TM0–TM7.

Functionally, during the word interval MT0, the contents of the "B" shift register are moved one place to the right. Then, during the word interval MT1, the contents of the "C" shift register 115 are subtracted from the contents of the "B" shift register 99 and stored therein. During the word time MT2, the contents of the "B" shift register 99 are shifted "a" places as determined by the output of the rate control logic of block 147 and during the word time MT3, the rate control contents of the "B" shift register 99 are added to the EGR error value previously computed and stored in the "C" shift register 115 to update same and store the updated or new EGR error value upon which the next valve positional adjustment correction will be made in the "C" register. FIG. 12 represents the gating logic networks 111, 122, add circuitry networks 113, 124, "C" shift register 115, "D" shift register 126, function generator 153 and the circuitry for outputting an EGR control signal proportional to the desired correction to be used for the next positional adjustment of the EGR valve 35.

The gating logic network of block 111 includes a first NAND gate 813 having one input connected to the signal BECY via lead 743 of FIG. 11 and its second input connected to the time control gated clock signal RCQ via lead 805 of FIG. 11. A second NAND gate 814 has its first input connected via lead 106 to the output node 101 of the "B" shift register 99 for receiving the signal ACBEO therefrom while the second input of NAND gate 814 receives the time control gated clock signal RCQ from output lead 804 of FIG. 11. The output of NAND gate 813 is connected to a first input of NAND gate 815 via lead 816 and the second input of NAND gate 815 is connected to the output of NAND gate 814 via lead 817. The output of NAND GATE 815 is connected via lead 818 to the first input of a logical AND gate 819. The second input of logical AND gate 819 is connected directly to the MT3 output lead 233 from the word counter 223 of the timing circuit of FIG. 3 and the third and final input of AND gate 819 is connected via lead 820 to the source of the timing interval signal TM11A at node 706 as previously described. The output of NAND gate 819 is taken from node 821 which represents the output of the logic gating network 111 and one input of the add circuitry of block 113 of FIG. 2.

Node 821 is connected via lead 822 to the first input of a first exclusive OR gate 823 whose second input is connected via lead 824 to an input node 825. Node 825 is connected via lead 826 to a node 827, and node 827 is connected via lead 828 to a first input of the logical AND gate 829 and via lead 831 to a first input of NOR gate 832. The second input to AND gate 829 is connected via lead 833 to node 834. Node 834 is connected via lead 835 to the output node 821 of the logic gating network of block 111 and via lead 836 to the second input of NOR gate 832.

The output of AND gate 829 is connected via lead 837 to the "J" or set input of a JK flip-flop 838 and the "K" or reset input is connected to the output of NOR gate 832 via lead 839. The clock input of JK flip-flop 838 is connected to the source of signals CLOCK via lead 173 taken from the output of NAND gate 169 from the timing circuit of FIG. 3. The clear input of JK flip-flip 838 is connected directly to the MT4 word output lead 234 from the word counter 223 of the timing circuit of FIG. 3 and the "Q" output of the flip-flop 838 is connected via lead 841 to one input of a second exclusive OR gate 842. The other input to the exclusive OR gate 842 is connected via lead 843 to the output of the first exclusive OR gate 823 and the output of gate 842 is connected via lead 844 to the input of the "C" shift register 115 as hereinafter described.

Lead 844 supplies the input to the first shift register stage 845 of the "C" register 115. The output of the first shift register stage 845 is connected directly to the input of the second shift register stage 846 whose output is connected directly to the input of the third shift register stage 847 whose output is connected directly to the fourth and final shift register stage 848. The output of the fourth and final shift register stage 848 represents the output of the "C" shift register 115 and is taken from node 116. Node 116 is connected via lead 117 to node 825 to recirculate the contents of the "C" shift register ACCE0 as required.

The output of the "C" shift register, ACCE0, is also connected via output node 116 and lead 121 to a first input of NAND gate 849 of the gating logic network of block 122 of FIG. 2 for supplying the contents of the "C" shift register 115, the sequence of signals ACCE0, thereto. The second input of the NAND gate 849 is connected to the source of the signal IRS12 via lead 467 of FIG. 7. The output of NAND gate 849 is connected via lead 851 to the first input of NAND gate 852. The second input of NAND gate 852 is connected to the output of NAND gate 853 via lead 854. One input of NAND gate 853 is connected to the source of the signal IRS12, which is taken from the "Q" output of RS flip-flop 457 of FIG. 7 via lead 459 while the second input to NAND gate 853 is connected via lead 855 to an input node 856. Node 856 may be supplied from a source of clock pulses CLK at a fixed predetermined rate via the dotted lead 857 by any conventional means, if desired; but in the preferred embodiment of the present invention, input node 856 receives its input from the output of a conventional presetable counter 858 forming a portion of the function generator circuitry of block 153 of FIG. 7 via lead 859. The lead 859 supplies a serial word which is a pre-programmed count or number to the input of NAND gate 853 so as to preselect a programmable constant or value to be subtracted from the value stored in the "D" register 126 as hereinafter described.

The values preset into the counter 858 may be determined by selectively positioning manually positionable binary switches 861-867 each having one end or switch pole directly connected to ground and its opposite end connected directly to a series of corresponding input nodes 871-877 respectively. The input nodes 871-877 respectively are each resistively coupled to a source of positive potential via resistors 881-887 respectively and to corresponding inputs of the presetable counter 858 via preset input leads 891-897 respectively.

It will, of course, be realized that the value of the presetable constant stored within the counter 858 may be controlled by external means, such as through the manually operable binary switches 861-867; or through some other type of external circuitry for generating a binary number indicative of a presetable constant via external input 870; such as, for example, via a ROM preprogrammed with values of presetable constants which can be addressed by actual measured values of various engine operating parameters as previously described or, alternatively, by some type of A/D converter and counter used to measure a single operating parameter, or by some other conventional means, if desired.

The presetable counter 858 outputs the preset count or value stored therein via output lead 859 in time to the CLOCK pulses received at the clock input via lead 173 as previously described and the output timing is controlled by the digit gate pulse DG15 which is connected directly to a control input of the presetable counter 859 from the DG15 output lead 205 from the BCD decoder 184 of the timing circuitry of FIG. 3. Alternatively, instead of increasing or decreasing the value stored in the presetable counter 858 to determine the EGR control pulse output as hereinafter described, the rate at which the presetable count is subtracted could also be increased or decreased for varying the output under closed loop controls or the like, if desired.

The output of NAND gate 852 is taken from node 868 and represents the output of the gating logic network 122 and the input of the adding circuitry of block 124 of FIG. 2. Node 868 is connected via lead 869 to the input of NAND gate 880; via lead 878 to a first input of a first exclusive OR gate 879; and via lead 888 to one input of a second NAND gate 889. The second input of NAND gate 880 is taken via lead 890 from input node 898. Node 898 is also connected via lead 899 to the first input of a third NAND gate 900 and via lead 901 to a node 902. The second input to the second NAND gate 889 is taken via lead 903 from an input node 904 which is connected via lead 905 to the second input of the third NAND gate 900.

The output of NAND gate 880 is connected via lead 906 to a first input of a NAND gate 907 whose second input is connected via lead 908 to the output of the second NAND gate 889 and whose third and final input is connected to the output of NAND gate 900 via lead 909. The output of NAND gate 907 is taken from output node 910 and output node 910 is connected via lead 911 to the "J" or set input to a JK flip-flop 912 whose "K" or reset input is connected via lead 913 to the output of an inverter 914 whose input is connected via lead 915 to a node 916. Node 916 is connected via lead 917 to the output node 910 and via lead 918 to the first input of a NOR gate 919 whose other input is connected via lead 467 to the signal IRS12 from flip-flop 457 of FIG. 7.

The output of NOR gate 919 is connected via lead 920 to the "K" or rest input of a second JK flip-flop 921. The clock input of JK flip-flop 921 is connected to the source of the clock signal CL15 via lead 922 and the "J" or set input is connected via lead 923 to node 924. Node 924 receives the signal IRS12 from lead 467 of FIG. 7 and is also connected via lead 925 to the clear input of the first JK flip-flop 912. The "Q" output of the first JK flip-flop 912 is connected via lead 926 to node 927, and node 927 is connected via lead 928 to the input node 904 to the third NAND gate 900 and via lead 929 to the first input of a second exclusive OR gate 930. The second input of the exclusive OR gate 930 is taken from the output of the first exclusive OR gate 879 via lead 931, and the output of exclusive OR gate 930 is connected via lead 932 to the input of a first shift register stage 933 of the "D" shift register 126.

The output of the first shift register stage 933 is connected to the input of the second shift register stage 934 whose output is directly connected to the input of the third shift register stage 935 whose output is directly connected to the input of the fourth and final shift register stage 936. The output of the fourth and final shift register stage 936 represents the output of the "D" shift register 126, which is represented by the signal ACDE0 and which is supplied via lead 127 back to the first input of a logical AND gate 937 whose second input is connected to the source of the signal IRS12 which is supplied from the "Q" output of the RS flip-flop 457 of FIG. 7 via lead 459.

The source of CLOCK pulses is supplied via lead 642 to node 938 and node 938 supplies the CLOCK pulses to the clock input of the first stage 933 of the shift register 126 via lead 939 and to the input of an inverter 940 which supplies the signal CLOCK to the clock input of the first JK flip-flop 912 via lead 941. The "Q" output of the second JK flip-flop 921 outputs the EGR control signal EGR OUT via lead 942 and the pulse width or duration of EGR OUT is proportional to the magnitude of the EGR valve positional adjustment dictated by the contents of the updated "C" register 126 and whose value, logic 1 or logic 0, may be used to control the direction of adjustment. Alternatively, a configuration such as that shown in FIG. 2 may also be used. Regardless, the EGR OUT signal is supplied via lead 942, or in the generalized version of the circuit in FIG. 2 via lead 144, to the control block 46 of FIG. 1 for operating the actuator means of block 47 to accurately position the EGR valve 35 in response thereto.

Figure 13:
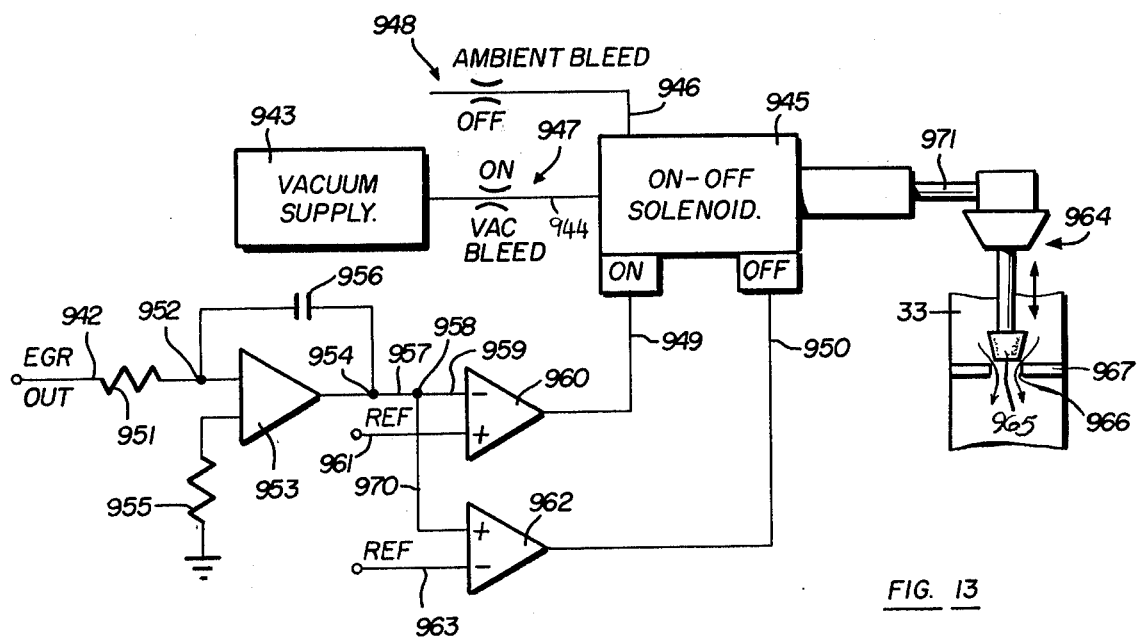
FIG. 13 is a partially schematic, partially block diagram illustrating one embodiment of the control circuitry, actuator and EGR valve of blocks 46, 47, and 35, respectively of FIG. 1.

FIG. 13 represents one embodiment of the control circuitry of block 46, the actuator of block 47 and the EGR valve of block 35 of FIG. 1 although any suitable means for accurately positioning an EGR control valve 35 in response to a generated control signal could also be used, as known in the art. In FIG. 13, a vacuum supply 943, such as is conventionally provided in a motor vehicle, is connected via vacuum hose or conduit 944 to the input of a standard on/off solenoid 945 which includes an ambient bleed conduit or vacuum hose 946 connected thereto. The conduit 944 includes a first solenoid-operated vacuum bleed valve 947 which bleeds vacuum into the system when the solenoid 945 is "on" and a second ambient bleed valve 948 located in the ambient bleed conduit 946 for bleeding off vacuum when the solenoid 945 is "off" so as to provide a controlled on/off solenoid with calibrated bleeds. The on/off solenoid 945 is turned on when a first EGR control signal is supplied thereto via input lead 949 and is turned off when a second EGR control signal is supplied thereto via lead 950.

The first and second solenoid control signals may be generated as follows. The EGR OUT signal is supplied via lead 942 from the output of the JK flip-flop 921 of FIG. 12 through a resistor 951 to the input node 952. The input node 952 is directly connected to the negative input of an operational amplifier 953 whose positive input is connected to ground through a resistor 955. The output of the operational amplifier 953 is taken from output node 954 and an integrating capacitor 956 is connected across the operational amplifier 953 such that one plate of the capacitor 956 connected to the input node 952 and the opposite plate is connected to the output node 954 so as to achieve a conventional integrator configuration. The integrated EGR OUT signal, EGR OUT PROP, corresponds to that signal outputted via lead 144 from the circuit of FIG. 2 and is supplied via lead 957 to an input node 958. The integrated EGR output signal is proportional to the magnitude of the positional adjustment dictated by the updated value stored in the "C" register 115 as hereinafter described and is used to control the operation of the on/off solenoid 945. Node 958 is connected via lead 959 to the negative input of a first comparator 960 whose positive input is connected to a "less than" reference via lead 961. Similarly, node 958 is connected via lead 970 to the positive input of a second comparator 962 whose negative input is connected to the source of a "greater than" reference via lead 963. The references are selected such that the output of the first comparator 960 outputs a first EGR control signal proportional to the magnitude of the positional adjustment required via lead 949 whenever the EGR valve 35 is to be opened and the output of the second comparator 962 outputs a second EGR control signal whose magnitude is indicative of the amount of positional change required whenever the EGR valve 35 is to be closed.

The actuator means of block 47 generally corresponds to the conventional solenoid positioning member 971 which can be used, as conventionaly known, to raise or lower a standard EGR valve 964 so that a valve closure element 965 moves out of or into an opening 966 for increasing or decreasing the spacing between the valve closure element 965 and an annular flange or restriction 967 disposed within the conduit 33 so as to selectively allow more exhaust gas to pass from the exhaust gas manifold 34 of the exhaust system 23 back to the intake system 22 of FIG. 1 as the EGR valve 964 is lifted in response to the solenoid 945 being turned on via the first EGR control signal on lead 949 and the flow of EGR being lessened or decreased as the element 965 is lowered into the passage 966 to further restrict the EGR flow as the valve 964 is lowered or closed in response to the solenoid 945 being turned off in response to the receipt of a second EGR control signal via lead 950.

The exact nature of the on/off solenoid 945 is not critical to an understanding of the present invention and it will be understood that the exact means by which the updated EGR error value stored in the "C" register is converted into a positional adjustment command signal and the means whereby this signal is used to control the EGR flow in response thereto does not restrict the present invention. The signal indicative of the updated EGR error value signal stored in the "C" register can be used to control, for example, a "bang-bang" or a proportional type of feedback loop. Furthermore, servo motor means may be used to control the positional adjustment as described in the above-identified co-pending application or any means of continuously or incrementally adjusting the position of the EGR valve 35 in response to a control signal indicative of the updated EGR error value stored in the "C" register could also be used. These alternate positioning means are described more fully in co-pending U.S. patent application (Bendix Disclosure No. REL 76-1) which is incorporated by reference herein.

FIG. 14 is a graphic illustration of a pre-programmed surface of EGR values indicative of a desired position of the EGR valve 35 in response to experimentally determined, or perhaps mathematically derived, values of engine speed used to address a first memory dimension of the look-up table storing the EGR surface and a second engine operating parameter such as throttle position (or in the second memory portion 75, MAP) for addressing the second memory dimension and this graphic illustration may be referred to while briefly describing the memory look-up and interpolation process discussed with reference to the table of FIG. 17A and B.

The method of operation of the EGR control system of the present invention will be briefly described with reference to the block diagrams of FIGS. 1 and 2, the graphic illustration of FIG. 14, the timing diagrams of FIGS. 15 and 16, and the table of computational sequences in FIGS. 17A and B. A first set of optimal EGR values indicative of a predetermined desired EGR valve position experimentally determined or computed as a function of engine speed and throttle position are stored in the first portion 74 of a memory means 73. Similarly, a second set of EGR values indicative of desired EGR valve positions are experimentally computed or determined as a function of engine speed and MAP and are stored in a second memory section 75. Actual values of engine speed, throttle position and MAP are measured by the circuitry of blocks 26, 31 and 38 respectively and first, second and third 8 bit digital words indicative of the measured parameter are generated.

The measured value of engine speed or period, the word RPM, includes four most significant bits, designated generally by the symbol $S_i$, and four least significant bits, designated generally by the symbol $\Delta S$. The throttle position or $\theta$ has its three most significant bits designated $T_j$ and its five least significant bits designated $\Delta T$; and the MAP word has its three most significant bits designated $P_k$ and its five least significant bits designated $\Delta P$.

These words are stored in buffer registers or storage means 48, 56 and 62 respectively of FIG. 2 and used for a table look-up and interpolate procedure as hereinafter described.

In the preferred embodiment of the present invention, a new EGR valve position adjustment signal is generated at the cylinder firing rate of the internal combustion engine 21 being controlled. A first EGR value indicative of a desired valve position is determined by addressing the first memory section 74 by the most significant bits $S_i$ of the engine speed word and the three most significant $T_i$ bits of the throttle position word. A double linear interpolation procedure, to be described hereinafter, is then used to accurately determine the first EGR value corresponding to the actually measured values of engine speed and throttle position.

The second memory section 75 is then addressed using the four most significant bits $S_i$ of the engine speed word and the three most significant bits $P_k$ of the MAP word and a double linear interpolation procedure is again performed to determine the second EGR value indicative of a desired valve position for the given measured values of engine speed and MAP. The first and second EGR values are then compared and the difference represents an EGR error value indicative of the current or presently existing positional error of the EGR valve 35. This current error value is compared with the previously computed and stored EGR error value indicative of the prior history of valve position adjustments to determine the change in EGR requirement or positional adjustment required to perform the total positional correction at the next scheduled valve adjustment.

A programmed fraction of this change in EGR error is then added to the previously used EGR error value to determine a new or updated EGR error value. This new value is then converted into a pulse width proportional to the desired positional adjustment or EGR flow and is used to make the desired correction at the next positional adjustment so as to avoid engine roughness and the like.

As set forth hereinabove, the data representing the RPM, throttle position and MAP data words are stored in the buffer registers 48, 56 and 62 of FIG. 2 and their most significant bits $S_i$, $T_j$, and $P_k$ are used to provide addresses for accessing the pre-programmed EGR value stored in the first and second memory section 74 and 75 respectively. As set forth in the detailed circuit of FIGS. 10, 11 and 12 and in the table of FIGS. 17A and B, the addresses are modified by timing generator signals to provide sequential access to all of the EGR flow values stored in the memory sections 74 and 75 as they are required for performing a given computation. The timing generator of block 66 also provides shift pulses and the like to the output scaling network of block 68 for multiplying the output of the memory means 72 by powers of two as required for the interpolation function and scaling.

The MSBs $S_i$ of the RPM word and th MSBs $T_j$ of the throttle position word are used to initially address a first memory portion 74 to obtain one of the 128 EGR values initially stored therein. The memory output is multiplied by powers of two depending on the values of the LSBs $\Delta S$ and $\Delta T$ to interpolate between the stored time delay values.

A double linear interpolation process is used wherein the memory address control logic of block 54 modifies the memory addresses $S_i$ and $T_j$, as required for performing the interpolation. The memory output scaling of block 68 provides time shifts which are used to multiply the memory outputs according to the contents of the LSBs $\Delta S$ and $\Delta T$. A similar table look-up and interpolation is performed using engine speed and MAP to access the second portion 75 of the memory 73 and the computer EGR values are subtracted from one another in the "B" register 99.

Specifically, the computation logic of shift registers, gating logic networks and adding circuits computes the first and second desired EGR values corresponding to the actual measured values of the selected engine operating parameters of engine speed, throttle position and MAP and circuitry of the present invention performs the table look-up and double linear interpolation operations and the comparison of the first and second EGR values by implementing the equation: Current EGR error value=

$$(32-\Delta T)[(16-\Delta S)\cdot f(S_i,T_j) + \Delta S \cdot f(S_i+1,T_j)] +$$
$$\Delta T[(16-\Delta S)\cdot f(S_j,T_j+1) + \Delta S \cdot f(S_i+1, T_j+1)]$$
$$-(32-\Delta P)[(16-\Delta S)\cdot f(S_i,P_k) + \Delta S \cdot f(S_i+1,P_k)]$$
$$-\Delta P[(16-\Delta S)\cdot f(S_i,P_k+1) + \Delta S \cdot$$
$$f(S_i+1,P_k+1)]$$

The inputs to this equation are the most significant bits $S_i$ and least significant bits $\Delta S$ of the engine speed or period word; the most significant bits $T_j$ and least significant bits $\Delta T$ of the throttle position word and the most significant bits $P_k$ and least significant bits $\Delta P$ of the MAP word.

The computation process is started by reading out one of the preprogrammed stored EGR values $f(S_i,T_j)$ from the first memory section or ROM 74. As previously described, the four most significant bits $S_i$ of the RPM word and the three most significant bits $T_j$ of the throttle position word are used to address the first memory portion 74 to read out this pre-programmed value. The memory contents, $f(S_i, T_j)$, are transferred in parallel to the memory data register 601 of FIG. 10 and then added from the MDR 601 to the "A" accumulator or register 83. This is the first step in obtaining the first portion of the above-identified equation, namely $(16-\Delta S) \cdot f(S_i, T_j)$. The quantity $(16-\Delta S)$ will range from 16 to 1 as $\Delta S$ varies between 0 and 15.

The next four operations set forth in the table of FIG. 17 consists of multiplying $f(S_i, T_j)$ by the one's compliment of $\Delta S$. This is done in a serial fashion by shifting $f(S_i, T_j)$ by the appropriate power of two and then adding the shifted value to the value previously stored in the "A" register 83.

Figure 12:
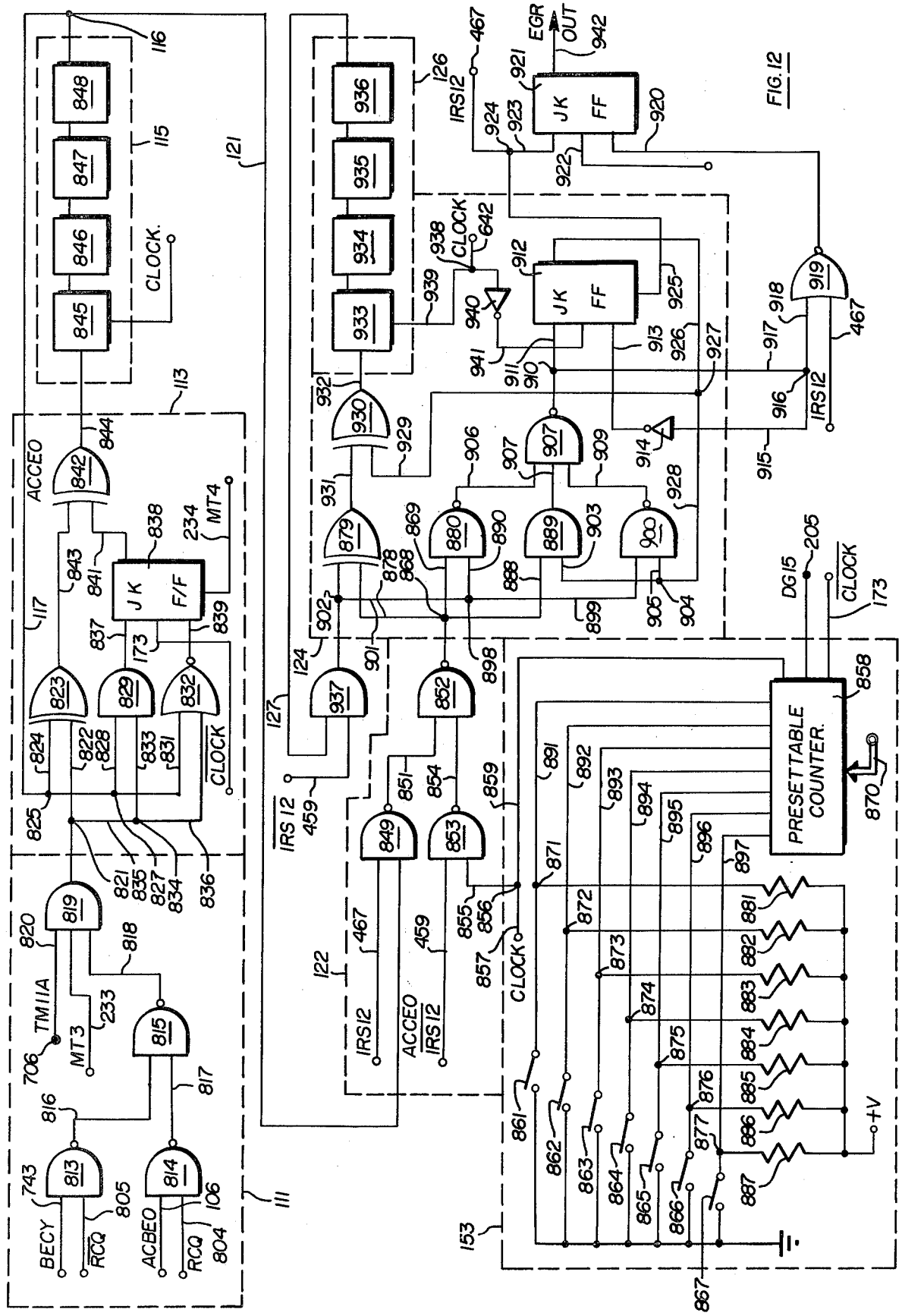
FIG. 12 is a schematic diagram of the gating logic of blocks 111 and 122, the add circuitry of blocks 113 and 124 of the "C" register and "D" registers of blocks 115 and 126 respectively, the function generator circuit of block 153 and the output signal generating circuitry of FIG. 2.

It is believed that the entire sequence of specific logic operations will be readily understood by reference to the table of FIGS. 17A and B and the logic diagrams of FIGS. 10-12. The signal RCA, RCB, RCC, and RCD indicate the commands to recirculate the contents of the designated A, B, C or D register so that it is added to some new input or to zero. The command ADD A dictates that the contents of the "A" register are to be added to itself and the command ADD 4A signifies adding four bits of the "A" register to zero and then storing the result in the "A" register so as to divide the contents of "A" by 16. The remainder of the commands are self explanatory or previously described and should pose no problem to understanding the operation of the method and apparatus of the present invention.

The computation of $\Delta S \cdot f(S_i+1, T_j)$ follows in a similar manner. First, the $S_i$ part of the address word is incremented to obtain the EGR value $f(S_i+1, T_j)$ from the memory output. The multiplication by $\Delta S$ takes place as a series of shifts in the add operations and the shifted values of $f(S_i+1, T_j)$ are added to the previously computed $(16-\Delta S) \cdot f(S_i, T_j)$ already stored in the "A" accumulator. At this point, we have performed a first interpolation along the RPM axis of the first memory 74 at a constant throttle position value $T_j$.

The third step in the computation is concerned with the multiplication of the contents of the "A" register, i.e., $(16-\Delta S) \cdot f(S_i, T_j) + \Delta S f(S_i+1, T_j)$ by the lower ordered part of the value of throttle position $(32-\Delta T)$ this multiplication is implemented by shifting and then adding the contents of the "A" register to the contents of the "B" register so that interpolation in the throttle position dimension is performed as the time interval data is transferred from the "A" to the "B" register. The "A" register contents are shifted four places prior to the "B" register operation and this shift is implemented by using the $2^4$ tap from the "A" register as an input into the "A" register. The four lower order "A" register outputs are masked (set to zero) during the shift operation so that the four high order "A" register bits will be zero when the shift if completed. This dropping of the lower ordered bits is done to allow a 16 bit word size to be used throughout.

The multiplication of the "A" register contents by $(32-\Delta T)$ is carried out in six add operations. First, the contents of the "A" register are added to the contents of the "B" register (actually A + 0 is put into B) and then the next five operations consist of multiplying "A" register contents by the one's compliment of $\Delta T$ and adding the result to the "B" register. The "A" register contents are shifted left (multiplied by 2) at the conclusion of each add operation to get the correct scale factor for the corresponding $\Delta T$ bit. This shift is mechanized by adding "A" to itself and storing the result in the "A" register.

At the end of this step, we have the quantity, $$(32 - \Delta T)[(16 - \Delta S)f(S_i, T_j) + \Delta S f(S_i+1, T_j)]$$

stored in the "B" register. The sixth step consists of multiplying the "A" register contents by $\Delta T$ and adding the result to the "B" register. First, the "A" register is shifted four places and then the multiply occurs as a series of shift and add operations with the shift implemented by doubling "A" after each add cycle. At this point, we have performed the entire interpolation in the RPM dimension for a first constant value of throttle position $T_j$ and one-half of the interpolation along the throttle position dimension.

The timing controls then modify the $S_i$ and $T_j$ addresses to output a first EGR value $f(S_i, T_j+1)$ and the complete interpolation process is repeated for the RPM dimension along a second or modified constant value of throttle position $T_j+1$ and then the second half of the throttle position interpolation is performed and the final computed first EGR value corresponding to the actual measured parameters of engine speed and throttle position is stored in the "B" register.

The above procedure is repeated in its entirety, as indicated in FIG. 17B as the second memory portions 75 is accessed by the most significant bits $S_i$ of the engine speed and the most significant bits $P_k$ of the absolute manifold pressure word so that after the entire second double linear interpolation is complete, the second EGR value has been computed and subtracted from the first EGR value with the difference, representing the current EGR error being stored in the "B" register 99.

The "C" register stores the past history of correctional values and contains the EGR error value used to make the last or most recent cylinder firing positional correction. The contents of the "C" register, the previously computed EGR error value, is then subtracted from the contents of the "B" register, the current EGR error value, to find the total incremental change in the EGR error value indicative of the total valve position adjustment required for totally correcting the positional error at the next cylinder firing adjustment. Since abrupt or large changes in the position of the EGR valve 35 lead to engine roughness and reduced drivability, the rate control logic of block 147 is used as previously described.

The total incremental change in EGR error value computed by subtracting the contents of the "C" register from the contents of the "B" register is then multiplied by a predetermined fractional constant implemented by digital filtering techniques. The rate control logic shifts the "B" register contents by 0, 1, 2, 3, 4, 5 or 6 places to divide the incremental change in EGR error by 1, 2, 4, 8, 16, 32 or 64 respectively and a fractional result is stored in the "B" register. This fractional result, which represents some fractional portion of the total change in EGR error correction required for immediately restoring the desired flow is then added to the previously computed EGR error value stored in the "C" register for updating the same to produce a new EGR error value.

The updated or new EGR error value stored in the "C" register now has the sum of the previous corrections and a fraction of the difference between the current and previous error. The rate control circuit may use the sign of the incremental change to permit a different grade limiting for each EGR increases and EGR decreases and the rate control input which determine the fraction of incremental change to be applied can be selected by switches during engine testing or by measured input parameters such as speed, manifold pressure, coolant temperature, etc. during actual operations.

The new or updated EGR value stored in the "C" register is converted to a time period by the "D" register 126 and circuitry associated therewith as previously described. The "D" register is preset with the values stored in the "C" register when an ignition reference pulse is received and the "D" register contents are decreased by a fixed amount every 16 microseconds by repeatedly subtracting a programmable number therefrom. The elapsed time between presetting the "D" register and obtaining a zero or negative output therefrom is the time interval which determines the magnitude of the next EGR valve positional adjustment. The programmable number is provided as another means of varying EGR flow with an external input for closed loop control or modification by some other engine variable or the like.

Having described the preferred embodiment of the method and apparatus of the closed loop EGR control system of the present invention, and having shown circuit details, timing diagrams and operational tables descriptive thereof, it will be understood that the specific examples given are employed in a descriptive sense only and are not for the purpose of limitation. Other embodiments, circuit implementations and variations and modifications thereof and alternates thereto will be obvious to those skilled in the art and may be made without departing from the spirit and scope of the invention which is limited only by the appended claims.

We claim:

1. In an internal combustion engine having an intake system, an exhaust system, a conduit operatively coupling said exhaust system to said intake system for recirculating exhaust gases back to the intake system to reduce noxious emissions, and a valve means for regulating the exhaust gas recirculation (EGR) flow in said conduit, a closed loop EGR control system comprising:
    means for measuring a first actual engine operating parameter and generating a first number indicative thereof;
    means for measuring a second actual engine operating parameter and generating a second number indicative thereof;
    means for measuring a third actual engine operating parameter and generating a third number indicative thereof;
    a first memory means for storing a look-up table of EGR values indicative of the desired position of said EGR valve means as a function of said first and second engine parameters, each memory location in said first memory means storing one of said desired EGR values and each memory location being accessed by a first dimension address and a second dimension address for reading the EGR value stored therein;
    a second memory means for storing the look-up table of EGR values indicative of the desired position of said EGR valve means as a function of said first and third engine operating parameters, each memory location in said second memory means storing one of said EGR values, and each memory location being accessed by a first dimension address and a second dimension address for reading the EGR value stored therein;
    means responsive to said first and second numbers for addressing said first and second memory dimensions of said first memory means and computing a first desired EGR value corresponding to said first and second actual measured engine operating parameters, and responsive to said first and third numbers for addressing said first and second memory dimensions of said second memory means and computing a second desired EGR value corresponding to said first and third actual measured engine operating parameters respectively;
    logic means for comparing said first and second computed EGR values to determine a current EGR error value indicative of the positional error of said EGR valve means;
    means for comparing said current EGR error value with a previously computed EGR error value used to determine the last positional adjustment of said EGR valve means to obtain the change in EGR error value required for correcting the position of said valve means at the next scheduled positional adjustment;
    means for adding only a predetermined portion of said change in EGR error value to said previously computed EGR error value to update same so as to insure that the rate at which positional corrections are made to said valve means does not produce engine roughness and the like;
    means responsive to said updated EGR error value for generating an EGR valve means positional control signal; and
    control means responsive to said EGR valve means positional control signal for adjusting the position of said valve means so as to obtain optimal drivability while simultaneously insuring that noxious emissions are maintained below a predetermined acceptable level.

2. The closed loop EGR control system of claim 1 wherein said first engine operating parameter is engine speed or period and wherein said means for measuring same includes means for sensing fixed timing marks located on a rotating member of said internal combustion engine, means responsive to the sensing of said timing marks for generating ignition reference pulses, means for generating clock pulses, means for counting said clock pulses to measure engine period which is a function of engine speed, between predetermined ones of said ignition reference pulses used to reset said counting means, and register means for temporarily storing the count attained in said counter which is indicative of engine speed just prior to reset.

3. The closed loop EGR control system of claim 2 further including means for controlling the rate at which said counted clock pulses are generated for permitting a wide range of engine speeds from approximately 500 to 7,500 RPMs to be encoded as a fixed length multi-bit binary word indicative of engine speed.

4. The closed loop EGR control system of claim 1 wherein said first and second engine operating parameters are engine speed and throttle position and wherein said first memory means stores a look-up table of experimentally determined optimal EGR values pre-computed to represent the desired position of said EGR valve means as a function of actual values of engine speed and throttle angle and wherein said third engine operating parameter is absolute manifold pressure and said second memory means stores a look-up table of experimentally determined optimal EGR values indicative of the desired position of said EGR valve means as a function of actual operating values of engine speed and absolute manifold pressure.

5. The closed loop EGR control system of claim 1 wherein said first, second and third numbers are multi-bit binary numbers indicative of engine speed, throttle position and absolute manifold pressure respectively.

6. The closed loop EGR control system of claim 5 wherein said means for addressing said first and second memory means and computing said first and second EGR values includes:

means responsive to the "$m$" most significant bits (MSB) of said first multi-bit binary number indicative of engine speed for addressing said first memory dimension of said first memory means and responsive to the "$n$" MSB of said second multi-bit binary number indicative of throttle position for addressing said second memory dimension of said first memory means for accessing the EGR value stored therein, said memory address means further including means responsive to the "$m$" MSB of said first multi-bit binary number indicative of engine speed for addressing said first memory dimension of said second memory means and responsive to the "$r$" MSB of said third multi-bit binary number indicative of absolute manifold pressure for addressing said second memory dimension of said second memory means for accessing the EGR value stored therein;

interpolating means responsive to the "$p$" least significant bits (LSB) of said first multi-bit binary number indicative of engine speed and the "$q$" LSB of said second multi-bit binary number indicative of throttle position for performing a first double linear interpolation to accurately compute said first EGR value corresponding to the actual measured values of engine speed and throttle position and responsive to the "$p$" LSB of said first multi-bit binary number indicative of engine speed and the "$s$" LSB of said third multi-bit binary number indicative of absolute manifold pressure for performing a second double linear interpolation to accurately compute said second EGR value corresponding to the actual measured values of engine speed and absolute manifold pressure;

timing means for sequentially increasing and decreasing the value of said most significant bits by one for accessing all stored EGR values needed for said first and second double linear interpolation computations; and means for controlling the order in which said first and second memory means are accessed and the order in which said first and second EGR values are computed.

7. The closed loop EGR control system of claim 6 wherein said interpolating means includes register means, adding means, and logical gating means for implementing the equation $$EGR = (32-\Delta T)[(16-\Delta S) \cdot f(S_i, T_j) + \Delta S \cdot f(S_{i+1}, T_j)] + \Delta T[(16-\Delta S) \cdot f(S_i, T_{j+1}) + \Delta S \cdot f(S_{i+1}, T_{j+1})] - (32-\Delta P)[(16-\Delta S) \cdot f(S_i, P_k) + \Delta S \cdot f(S_{i+1}, P_k)] - \Delta P[(16-\Delta S) \cdot f(S_i, P_{k+1}) + \Delta S \cdot f(S_{i+1}, P_{k+1})]$$

wherein $S_i$ equals the MSB of said first multi-bit binary number; $\Delta S$ equals the LSB of said first multi-bit binary number; $T_j$ equal the MSB of said second multi-bit binary number; $\Delta T$ equal the LSB of said second multi-bit binary number; $P_k$ equals the MSB of said third multi-bit binary number; and $\Delta P$ equals the LSB of said third multi-bit binary number.

8. The closed loop EGR control system of claim 1 wherein said means for addressing and computing includes a register means for temporarily storing said computed first EGR value and said logic means includes means for subtracting said computed second EGR value from said temporarily stored first EGR value to determine a difference representing the current EGR error value indicative of the positional error of said EGR valve means and for storing said current EGR error value in said register means.

9. The closed loop EGR control system of claim 8 wherein said means for comparing said current EGR error value with a previously computed EGR error value used to determine the last positional adjustment of said EGR valve means includes a second register means for storing the previously computed EGR error value representing the prior history of positional error corrections and logic means for subtracting the previously computed EGR error value stored in said second register means from the current EGR error value stored in said first register means for obtaining a difference representing the total change in EGR error value required for completely eliminating the error in the position of said valve means in the next scheduled positional adjustment, and means for storing said difference representing said change in EGR error value in said first register means.

10. The closed loop EGR control system of claim 9 wherein said adding means includes digital filter means responsive to the change in EGR error value stored in said first register means for multiplying same by a predetermined fractional constant to generate a fractional portion of said EGR error value and logic means for adding said fractional portion of said change in EGR error value to the previously computed value of EGR error value stored in said second register means for updating same.

11. The closed loop EGR control system of claim 10 wherein said fractional constant is $2^{-n}$, where "$n$" is any non-negative integer.

12. The closed loop EGR control system of claim 10 wherein said digital filter means includes means for implementing the linear first order difference equation $$x(KT) = ax(KT-T) + (1-a)u(KT),$$

where "$T$" is the rate at which computations are made, such as the cylinder firing rate of said internal combustion engine, where "$K$" is a running index of integers, where $u(KT)$ is the input to the digital filter using the $K^{th}$ T interval, where $x(KT-T)$ is the output of the digital filter during the $(K-1)^{th}$ T interval, and where "$a$" is a programmable constant.

13. The closed loop EGR control system of claim 12 wherein $a = 2^{-n}$, where "$n$" is any non-negative integer and wherein said digital filter means includes means for selectively determining the value of "$n$" so as to selectively alter the value of the programmable constant "$a$".

14. The closed loop EGR control system of claim 10 wherein said digital filter means further includes means for selectively altering the value of said predetermined fractional constant.

15. The closed loop EGR control system of claim 10 wherein said digital filter means further includes means responsive to at least one actually measured engine operating parameter for selectively varying the value of said predetermined fractional constant to further optimize drivability and avoid engine roughness.

16. The closed loop EGR control system of claim 1 wherein said means for adding only a predetermined portion of said change in error value to said previously computed EGR error value to update same includes means for multiplying said change in EGR error value by a predetermined fractional constant so that the total computed positional error correction is not made during a single positional adjustment of said valve means.

17. The closed loop EGR control system of claim 16 wherein said adding means further includes means for selectively varying the value of said predetermined fractional constant.

18. The closed loop EGR control system of claim 16 wherein said adding means further includes means responsive to at least one actual engine operating parameter for selectively varying the value of said predetermined fractional constant for further optimizing drivability and avoiding engine roughness.

19. The closed loop EGR control system of claim 1 wherein said means for generating said EGR valve means positional control signal includes register means for initially storing said updated EGR error value and initiating the generation of said EGR value means positional correction signal, means for downcounting said stored value by a predetermined constant amount at a fixed clock rate, and means responsive to the value stored in said register means becoming non-positive for terminating the output of said EGR valve means positional control signal such that said control signal which is proportional to the amount of positional adjustment of said EGR valve means dictated by said updated EGR error value for effecting the desired EGR flow while avoiding engine roughness and the like.

20. The closed loop EGR control system of claim 19 wherein said means for generating said EGR valve means positional control signal further includes means for selectively altering the value of said predetermined constant amount by which said stored updated EGR error value is downcounted.

21. The closed loop EGR control system of claim 19 wherein said means for generating said EGR valve means positional control signal includes means responsive to one or more actual measured engine operating parameters for selectively altering said predetermined constant amount by which said stored updated EGR error value is downcounted to provide further means for varying EGR flow with an external input for further closed loop control or modification.

22. The closed loop EGR control system of claim 19 wherein said means for generating said EGR valve means positional correction signal includes means for selectively varying said fixed clock rate.

23. A closed loop exhaust gas recirculation (EGR) control system in which the exhaust system and intake system of an internal combustion engine are operatively coupled to each other by a conduit so as to recirculate part of the exhaust gas from the exhaust system to the intake system for inhibiting the generation and emission of oxides of nitrogen and for regulating drivability and the like by selectively adjusting the position of an EGR valve disposed at least partially within said conduit, said closed loop EGR control system comprising:

a first memory means pre-programmed for storing a predetermined optimal set of EGR values for a particular set of conditions representing the desired positions of said EGR valve as a function of engine speed and throttle position, one of each set of EGR values being accessible by addressing a first memory dimension with a first address word indicative of engine speed and a second memory dimension with a second address word indicative of throttle position;

a second memory means pre-programmed for storing a predetermined optimal set of EGR values for said particular set of conditions representing the desired positions of said EGR valve as a function of engine speed and absolute manifold pressure, one of each set of EGR values being accessible by addressing a first memory dimension with said first address word indicative of engine speed and a second memory dimension with a third address word indicative of absolute manifold pressure;

means associated with said engine for measuring an actual engine speed operating parameter and for generating a first multi-bit binary word indicative thereof, said first multi-bit binary word having "$m$" most significant bits (MSB) and "$p$" least significant bits (LSB);

the intake system of said internal combustion engine including the throttle for regulating the air flow therein and said control system further including means responsive to the relative position of said throttle for generating a second multi-bit binary word indicative of the actual throttle position, said second multi-bit binary word having "$n$" MSB and "$q$" LSB;

means coupled to said intake system of said internal combustion engine and responsive to the actual absolute manifold pressure existing therein for generating a third multi-bit binary word indicative thereof, said third multi-bit binary word having "$r$" MSB and "$s$" LSB;

means for temporarily storing said first, second and third multi-bit binary words;

timing means for controlling the sequence of operation of said EGR control system;

memory address means responsive to the most significant bits of a selected first pair of the words contained in said temporary storage means and to said timing means and then to a selected second pair of the stored words and said timing means for addressing said first memory dimension and said second memory dimension of a selected one of said first and second memory means for accessing the EGR values stored therein;

means for performing a double linear interpolation between stored EGR values by sequentially addressing adjacent EGR values stored in a selected one of said first and second memory means and using the least significant bits of said first and second stored words for first computing a first EGR value accurately corresponding to the actual measured values of engine speed and throttle position and for then computing the second EGR value accurately corresponding to the actuall measured values of engine speed and absolute manifold pressure;

means responsive to said interpolation means and said timing means for modifying the most significant bits of said selected temporarily stored multi-bit binary words for sequentially addressing adjacent stored EGR values required for said interpolation computations;

said memory means and said interpolation means being responsive to said timing means for initially selecting said first and second multi-bit binary words and utilizing the MSB thereof for addressing said first memory means and the LSB thereof for performing said interpolation computations to determine said first EGR value and then selecting said first and third multi-bit binary words utilizing the MSB thereof for addressing said second memory means and the LSB thereof for performing said interpolation computations to determine said second EGR value;

means for subtracting said second EGR value from said first EGR value to determine a current EGR error value indicative of the current deviation in the position of said EGR valve from the desired pre-programmed position;

means for storing the prior EGR error value used to perform the last EGR valve position adjustment;

means for subtracting said prior EGR error value from said current EGR error value for computing the difference therebetween which is representative of the total EGR valve position correction required for restoring said pre-programmed EGR at the next valve position adjustment;

means for algebraically adding only a predetermined fractional portion of said computed difference to said previously stored EGR error value for updating same so as to avoid rapid valve position changes which tend to cause engine roughness and the like;

means for converting said updated EGR error value into an EGR valve position control signal; and means responsive to said EGR valve position control signal for adjusting the position of said EGR valve to increase or decrease EGR flow in a smooth and gradual manner conducive to optimal drivability.

24. The closed loop EGR control system of claim 23 wherein said means for measuring the actual engine speed operating parameter includes:

means for sensing fixed timing marks such as may be located on a rotating member of said internal combustion engine;

means responsive to the sensing of said timing marks for generating ignition reference pulses indicative thereof;

a source of clock pulses;

binary counter means reset by predetermined ones of said ignition reference pulses for counting said clock pulses and accumulating a running count therein until the occurrence of the next predetermined one of said ignition reference pulses indicating counter reset, the accumulated count stored in said binary counter means at reset corresponding to said first multi-bit binary word indicative of engine period which is representative of the engine speed operating parameter; and said binary counter means being responsive to said reset for transferring said first multi-bit binary word into said temporary storage means.

25. The closed loop EGR control system of claim 24 further including means for selectively increasing and decreasing the rate at which said clock pulses are generated to enable said binary counter means to dynamically measure engine periods with a variable precision over a wide range of approximately 500 to 7,500 RPMs while enabling any such measured value to be encoded as a fixed length multi-bit binary word.

26. The closed loop EGR control system of claim 23 wherein said first, second and third multi-bit binary words each contain eight bits; and wherein said first word contains four most significant bits and four least significant bits while said second and third words contain three most significant bits and five least significant bits for limiting the number of memory locations required to store the desired EGR values.

27. The closed loop EGR control system of claim 23 wherein said timing means generates a first time signal indicative of a first predetermined computation period during which said memory address means selects the most significant bits of said first and second temporarily stored words for addressing said first memory means and the least significant bits of said first and second words for performing said double linear interpolation to compute said first desired EGR value and a second timing signal indicative of a second predetermined computation period during which said memory address means selects the most significant bits of said first and third temporarily stored words for addressing said second memory means and the least significant bits of said first and third words for performing said double linear interpolation to compute said second desired EGR value.

28. The closed loop EGR control system of claim 23 wherein said means for performing said double linear interpolation includes a first logic circuit including a first logical gating circuit, adding means coupled to the output of said first logical gating circuit, and a first register means coupled to the output of said adding means and a second logic circuit including second logical gating means, second adding means coupled to the output of said second logical gating means, and a second register means coupled to the output of said second adding means, and first and second logic circuit performing the double linear interpolation required by simple sequential additions and subtractions, register shifts and the like so as to solve the equation $$EGR = (32-\Delta T)[(16-\Delta S) \cdot f(S_i, T_j) + \Delta S \cdot f(S_{i+1}, T_j)] + \Delta T[(16-\Delta S) \cdot f(S_i, T_{j+1}) + \Delta S \cdot f(S_{i+1}, T_{j+1})] - (32-\Delta P)[(16-\Delta S) \cdot f(S_i, P_k) + \Delta S \cdot f(S_{i+1}, P_k)] - \Delta P[(16-\Delta S) \cdot f(S_i, P_{k+1}) + \Delta S \cdot f(S_{i+1} P_{k+1})]$$

where $S_i$ equals the MSB of said first word; $\Delta S$ equals the LSB of said first word; $T_j$ equals the MSB of said second word, $\Delta T$ equals the LSB of said second word;

$P_k$ equals the MSB of said third word; and $\Delta P$ equals the LSB of said third word.

29. The closed loop EGR control system of claim 23 wherein said means for algebraically adding a predetermined fractional portion of said computed difference to said previously computed EGR error value includes means for selectively varying said predetermined fractional portion to be algebraically added to said previously computed EGR error value.

30. The closed loop EGR control system of claim 23 wherein said means for algebraically adding only a predetermined fractional portion of said computed difference includes a digital filter means for multiplying said computed difference by a programmable fraction which is less than or equal to one and then adding the result of the multiplication to said previously stored EGR error valve for updating same.

31. The closed loop EGR control system of claim 30 wherein said digital filter means includes circuitry for implementing the linear first order difference equation $$x(KT) = ax(KT-T) + (1-a)u(KT),$$

where "T" is the rate at which computations are made which is equal to the cylinder firing rate of the internal combustion engine; "K" is a running index of integers; $u(KT)$ is the input to the digital filter means using the Kth T interval; $x(KT-T)$ is the filter output during the (K−1)th T interval; and "a" is a programmable constant.

32. The closed loop EGR control system of claim 31 wherein the value of said programmable constant "a" is equal to the number $2^{-i}$, where "i" is a non-negative integer.

33. The closed loop EGR control system of claim 31 wherein said digital filter means further includes means responsive to an actual measured value of at least one engine operating parameter for varying the value of the programmable constant "a" between EGR valve positional adjustments, if desired.

34. The closed loop EGR control system of claim 23 wherein said means for coverting said updated EGR error voltage into an EGR valve position control signal includes means for storing a count indicative of said updated EGR error value, means for subtracting a programmable constant from said stored count at a predetermined rate, and means responsive to time interval between the storing of said count and the time at which said stored count becomes less than or equal to zero for outputting an EGR valve position control signal indicative of the next valve position adjustment required for maintaining said predetermined low level of noxious emissions while maintaining optimal drivability.

35. The closed loop EGR control system of claim 34 wherein said converting means further includes means for selectively varying the value of said programmable constant which is selectively subtracted from said stored count.

36. The closed loop EGR control system of claim 35 wherein said means for selectively varying the value of said programmed constant includes means for manually adjusting same.

37. The closed loop EGR control system of claim 35 wherein said means for selectively varying the value of said programmable constant includes means responsive to at least one actual engine operating parameter for varying the value of said programmable constant to be subtracted from said stored count for providing still another means for closed loop control or modification of EGR flow.

38. The closed loop EGR control system of claim 34 wherein said converting means further includes means for varying the rate at which said preprogrammable constant is subtracted from said stored count to provide still another means for closed loop control or modification of EGR flow using one or more other engine operating parameters.

39. In an internal combustion engine having an intake system, an exhaust system, a conduit coupling the exhaust system to the intake system and an exhaust gas recirculation (EGR) valve associated with said conduit for controlling the quantity of exhaust gases fed back to said intake system, a closed loop method of accurately controlling the position of said EGR valve for regulating EGR flow to obtain optimal drivability while simultaneously reducing noxious emissions below some predetermined acceptable level comprising the steps of:

determining a first EGR value indicative of a desired EGR valve position for actual values of first and second engine operating parameters;

determining a second EGR value indicative of a desired EGR valve position for actual values of third and fourth engine operating parameters;

subtracting one of said first and second EGR values from the other of said first and second EGR values to obtain a current EGR correction for valve position error;

comparing said current EGR correction with a previously computed EGR correction used to make the last EGR valve position adjustment to determine the change in EGR correction required for the next EGR valve position adjustment;

alebraically adding a predetermined portion of said change in EGR correction for valve position error to said previously computed EGR correction to generate a new rate-limited EGR correction for controlling the rate at which EGR valve position corrections are made; and adjusting the position of said EGR valve in response to said new EGR correction for maintaining a desired EGR flow while avoiding engine roughness and the like.

40. The closed loop method of controlling exhaust gas recirculation of claim 39 wherein said step of determining a first EGR value includes the steps of:

preprogramming a first schedule of EGR values representative of the desired position of said EGR valve determined as a function of first and second engine operating parameters, corresponding to engine speed and throttle position respectively, into a first memory section;

measuring the actual value of engine speed and the actual value of throttle position; and generating said first EGR value by utilizing the actual measured value of engine speed and the actual measured value of throttle angle to address said first memory section and modify the EGR values stored therein such that said generated first EGR value corresponds to the desired EGR value dictated by said actual measured values of engine speed and throttle position.

41. The closed loop method of controlling exhaust gas recirculation of claim 40 wherein said step of measuring includes the step of generating a first multi-bit binary number indicative of engine speed and a second multi-bit binary number indicative of throttle position and wherein said generating step includes addressing said first memory section with the "*m*" most significant bits (MSB) of said first multi-bit binary number and the "*n*" MSB of said second multi-bit binary number to output an accessed EGR value stored therein, interpolating between addressable EGR values using the "*p*" least significant bits (LSB) of said first multi-bit binary number and the "*q*" LSB of said second multi-bit binary number while modifying said most significant bits for sequentially addressing appropriate adjacent memory locations in said first memory section whose stored EGR values are needed for said interpolation process, and temporarily storing said addressed and interpolated first EGR value corresponding to the actual measured values of engine speed and throttle position.

42. The closed loop method of controlling exhaust gas recirculation of claim 40 wherein said step of determining a second EGR value includes the steps of:
preprogramming a second schedule of desired EGR values representing the desired position of said EGR valve determined as a function of third and fourth engine operating parameters, corresponding to engine speed and absolute manifold pressure respectively, into a second memory section;
measuring the actual value of engine speed and the actual value of manifold absolute pressure; and
generating said second EGR value by utilizing said actual measured values of engine speed and absolute manifold pressure to address said second memory section and modify the values stored therein such that said second EGR value corresponds to the desired EGR value dictated by the actual measured values of engine speed and manifold absolute pressure.

43. The closed loop method of controlling exhaust gas recirculation of claim 42 wherein said step of measuring includes generating a first multi-bit binary number indicative of engine speed and a third multi-bit binary number indicative of absolute manifold pressure and wherein said generating step includes addressing said second memory section with the "*m*" MSB of said first multi-bit binary number and the "*r*" MSB of said third multi-bit binary number to output the accessed EGR value stored therein, interpolating between addressable EGR values using the "*p*" LSB of said multi-bit binary number and the "*s*" LSB of said third multi-bit binary number while modifying said most significant bits for sequentially addressing the other appropriate adjacent memory locations storing EGR values needed for said interpolation process, and temporarily storing said addressed and interpolated second EGR value corresponding to the actual measured values of engine speed and absolute manifold pressure.

44. The closed loop method of controlling exhaust gas recirculation of claim 39 wherein said step of algebraically adding a predetermined portion of said change in EGR correction for value position error includes digitally filtering the change in EGR correction for value position error to multiply same by a fraction which is a programmable constant and then algebraically adding that portion of the change in EGR correction resulting from said multiplication to said previously computed EGR correction to generate said new rate-limited EGR correction for controlling the rate at which EGR valve position corrections are made to avoid engine roughness and the like.

45. The closed loop method of controlling exhaust gas recirculation of claim 44 further including the step of preprogramming said fractional constant by selectively positioning a series of switching elements.

46. The closed loop method of controlling exhaust gas recirculation of claim 44 further including the step of selectively varying said programmable constant as a function of at least one engine operating parameter such as engine speed, absolute manifold pressure, coolant temperature, and the like.

47. The closed loop method of controlling exhaust gas recirculation of claim 39 wherein said step of adjusting the position of said EGR valve includes the step of converting new rate-limited EGR correction into an EGR valve position adjustment signal and selectively adjusting the position of said valve in accordance with the value of said signal.

48. In an internal combustion engine having an intake system, an exhaust system, a conduit coupling the exhaust system to the intake system and an EGR valve disposed at least partially within said conduit for controlling the amount of exhaust gas fed back to said intake system, a closed loop method for controlling the positioning of said valve means for regulating exhaust gas recirculation (EGR) to obtain optimal drivability while simultaneously reducing noxious emissions below some predetermined acceptable level comprising the steps of:
preprogramming a first schedule of EGR values representing the desired position of said EGR valve as a function of first and second engine operating parameters into a first memory section;
programming a second schedule of desired EGR values representing the desired position of said EGR valve as a function of third and fourth engine operating parameters into a second memory section;
measuring the actual operating values of said first, second, third and fourth engine operating parameters at least one between each valve position adjustment;
generating a first desired EGR value corresponding to said first and second actual measured values of engine operating parameters utilizing said first and second values of engine operating parameters and the values stored in said first memory section;
generating a second desired EGR value corresponding to said third and fourth actual measured values of engine operating parameters utilizing said third and fourth actual measured values of engine operating parameters and the value stored in said second memory section;
comparing said first generated EGR value with said second generated EGR value for obtaining a current EGR error value indicative of the present actual error in the position of said EGR valve;
subtracting a previously stored EGR error value representing the past history of positional error corrections used to perform the previous positional adjustment of said EGR valve from said currently obtained EGR error value to obtain the change in EGR error value required for correcting the position of said EGR valve at the next positional adjustment of said EGR valve;
selectively adding only a predetermined portion of said change in EGR error value to said previously stored EGR error value to obtain an updated EGR error value to control the rate at which EGR corrections are made to the position of the EGR valve at said next positional adjustment so as to avoid engine roughness and the like;

generating an EGR valve position adjustment signal from said updated EGR error value; and adjusting the position of said EGR valve in response to said EGR valve position adjustment signal so that only a predetermined portion of the desired correction is applied with each positional adjustment to improve drivability while simultaneously reducing noxious emissions to below said predetermined acceptable level.

49. The closed loop EGR control method of claim 48 wherein said step of preprogramming a first schedule of EGR values includes experimentally measuring a set of desired EGR values for a given set of conditions as a function of engine speed and throttle angle and storing said desired set of EGR values in a first read only memory addressable by actual measured values of engine speed and throttle position and wherein said step of preprogramming said second schedule of EGR values includes experimentally measuring a second set of desired EGR values for said given set of conditions as a function of engine speed and absolute manifold pressure and storing said second set of desired EGR values in a second read only memory addressable by the actual measured values of engine speed and absolute manifold pressure.

50. The closed loop EGR control method of claim 48 wherein said step of measuring the actual operating values includes the step of measuring the actual engine speed, the actual throttle position, and the actual absolute manifold pressure at least once between each valve position adjustment, said first and third engine operating parameters being identical and corresponding to said engine speed measurements.

51. The closed loop EGR control method of claim 50 wherein said step of measuring engine speed includes sensing timing marks located on a rotating member of the engine, measuring the time interval between said timing marks and converting said measured time interval into a first multi-bit binary number indicative of engine speed and temporarily storing said first multi-bit binary number.

52. The closed loop EGR control method of claim 51 wherein said step of measuring the time interval between timing marks includes generating reset pulses every 720/N degrees of engine revolution, where N is the number of engine cylinders, and operating a binary counter to accumulate a count at a predetermined clock rate between resets, the multi-bit binary number present in said counter when it is reset representing said first multi-bit binary number indicative of engine speed, and additionally including the step of variably adjusting said clock rate so as to enable a measurement of engine period which is a function of engine speed with the variable precision to allow a speed range of approximately 500 to 7,500 RPMs to be encoded as a fixed length first multi-bit binary number.

53. The closed loop EGR control method of claim 51 wherein said step of measuring the actual value of throttle position includes sensing the relative position of said throttle, generating an analog signal indicative thereof, converting said analog signal indicative of the actual throttle position into a second multi-bit binary number indicative thereof and temporarily storing said second multi-bit binary number and wherein said step of measuring the actual value of absolute manifold pressure includes the steps of sensing the actual manifold absolute pressure, generating an analog signal indicative thereof, converting said analog signal indicative of the actual measured absolute manifold pressure into a third multi-bit binary number indicative thereof and temporarily storing said third multi-bit digital number.

54. The closed loop EGR control method of claim 53 wherein said step of generating said first desired EGR value includes the steps of addressing said first memory section with the "$m$" most significant bits (MSB) of said first multi-bit binary number and the "$n$" MSB of said second multi-bit binary number, interpolating between stored values using the "$p$" least significant bits (LSB) of said first multi-bit binary number and the "$Q$" LSB of said second multi-bit binary number, while adjusting the most significant bits of said first and second multi-bit binary numbers to address all adjacently stored values of EGR needed for said interpolation, and temporarily storing said generated first EGR value corresponding to the actual measured values of engine speed and throttle position.

55. The closed loop EGR control method of claim 54 wherein said step of interpolating between stored values includes the steps of solving the equation $$EGR = (32-\Delta T)[(16-\Delta S)\cdot f(S_i, T_j) + \Delta S \cdot f(S_{i+1}, T_j)] + \Delta T[(16-\Delta S)\cdot f(S_i, T_{j+1}) + \Delta S \cdot f(S_i, T_{j+1})]$$

where $S_i$ equals the most significant bits of said first multi-bit binary number, $\Delta S$ equals the least significant bits of said first multi-bit binary number, $T_j$ equals the most significant bits of said second multi-bit binary number and $\Delta T$ equals the least significant bits of said multi-digit binary number.

56. The closed loop EGR control method of claim 54 wherein said step of generating said second desired EGR value includes the steps of addressing said second memory section with the "$m$" MSB of said first multi-bit binary number and the "$r$" MSB of said third multi-bit binary number, interpolating between stored values of EGR using the "$p$" LSB of said first multi-bit binary number and the "$s$" LSB of said third multi-bit binary number while adjusting the most significant bits of said first and third multi-bit binary numbers to address all adjacently stored values of EGR needed for said interpolation, and temporarily storing said generated second EGR value corresponding to the actual measured values of engine speed and absolute manifold pressure.

57. The closed loop EGR control method of claim 54 wherein said step of interpolating includes solving the equation $$EGR = (32-\Delta P)[(16-\Delta S)\cdot f(S_i, P_k) + \Delta S \cdot f(S_{i+1}, P_k)] + \Delta P[(16-\Delta S)\cdot f(S_i, P_{k+1}) + \Delta S] f(S_{i+1}, P_{k+1})]$$

where $S_i$ equal the most significant bits of said first multi-bit binary number; $\Delta S$ equal the least significant bits of said first multi-bit binary number; $P_k$ equal the most significant bits of said third multi-bit binary number; and $\Delta P$ equal the least significant bits of said third multi-bit binary number.

58. The closed loop EGR control method of claim 48 wherein said step of comparing said first EGR value with said second EGR value includes subtracting said second EGR from said first EGR value to obtain a difference indicative of said EGR error value.

59. The closed loop EGR control method of claim 48 wherein said step of selectively adding only a predetermined portion of said change in EGR error value includes digitally filtering said change in EGR error value and multiplying it by a predetermined fractional constant to obtain a portion thereof to be added to said previously generated EGR error value so as to selectively control the rate at which the EGR valve position corrections are made to avoid engine roughness and the like.

60. The closed loop EGR control method of claim 59 wherein said step of digtally filtering includes solving the linear first order difference equation $$x(KT) = ax(KT-T) + (1-a)(u)(KT)$$

where $T$ is the rate at which the computations are made such as the cylinder firing rate of the engine, $K$ is a running index of integers, $u(KT)$ is the input to the digital filter during the Kth T interval, $x(KT-T)$ is the filter output during the (k−1)th T interval and "$a$" is a programmable constant.

61. The closed loop EGR control method of claim 60 wherein the time constant of said digital filter is determined by the input data rate and the programmable constant "$a$" and where the programmable constant "$a$" may be selectively varied in accordance with other engine operating parameters such as engine speed, absolute manifold pressure, coolant temperature, and the like.

62. The closed loop EGR control method of claim 48 wherein said step of generating an EGR valve position adjustment signal from said updated EGR error value includes presetting a register with the updated EGR error value, decreasing the value preset into said register by a fixed amount at a predetermined rate by repeatedly subtracting a programmable number therefrom and outputting said EGR valve position adjustment signal indicative of the elapsed time between presetting said register and obtaining a non-positive output.

63. The closed loop EGR control method of claim 62 wherein said step of repeatedly subtracting a programmable number from the value stored in said register includes the additional step of selectively varying said programmable number to further selectively vary EGR flow.

64. The closed loop EGR control method of claim 63 wherein said step of selectively varying said programmable number includes measuring one or more actual engine operating parameters and adjusting the value of said programmable number in accordance with a predetermined relation to said measured engine operating parameter.

65. The closed loop EGR control method of claim 62 wherein said step of decreasing the value present into said register includes the step of selectively varying said predetermined rate at which said programmable number is subtracted to effect when further closed loop EGR control.

* * * * *